(12) United States Patent
Nagumo et al.

(10) Patent No.: US 7,158,570 B2
(45) Date of Patent: Jan. 2, 2007

(54) MOTION PICTURE ENCODING APPARATUS

(75) Inventors: Takefumi Nagumo, Tokyo (JP);
Hiroyuki Yasuda, Saitama (JP);
Satoshi Mitsuhashi, Tokyo (JP); Yuji Ando, Kanagawa (JP); Takashi Kojima, Tokyo (JP); Yiwen Zhu, Kanagawa (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 10/312,555

(22) PCT Filed: May 9, 2002

(86) PCT No.: PCT/JP02/04530

§ 371 (c)(1),
(2), (4) Date: Jan. 9, 2003

(87) PCT Pub. No.: WO02/093936

PCT Pub. Date: Nov. 21, 2002

(65) Prior Publication Data

US 2003/0174769 A1    Sep. 18, 2003

(30) Foreign Application Priority Data

May 10, 2001  (JP)  ............................. 2001-140217

(51) Int. Cl.
*H04B 1/66* (2006.01)

(52) U.S. Cl. ................................. 375/240.16

(58) Field of Classification Search ........... 375/240.16, 375/240.12; H04B 1/66
See application file for complete search history.

(56) References Cited

U.S. PATENT DOCUMENTS

| 5,557,684 | A | * | 9/1996 | Wang et al. ................. 382/107 |
| 5,812,200 | A | * | 9/1998 | Normile ................. 375/240.12 |
| 6,028,965 | A | * | 2/2000 | Normile ..................... 382/250 |
| 6,377,623 | B1 | * | 4/2002 | Ra et al. ..................... 375/240 |
| 6,421,466 | B1 | * | 7/2002 | Lin ........................... 382/236 |
| 6,690,730 | B1 | * | 2/2004 | Choi ..................... 375/240.16 |
| 6,785,427 | B1 | * | 8/2004 | Zhou ......................... 382/294 |
| 6,968,010 | B1 | * | 11/2005 | Chelladurai et al. ... 375/240.16 |
| 2002/0085636 | A1 | * | 7/2002 | Uenoyama et al. .... 375/240.12 |
| 2002/0172287 | A1 | * | 11/2002 | Kim ..................... 375/240.16 |

FOREIGN PATENT DOCUMENTS

JP    7-203456    8/1995

(Continued)

*Primary Examiner*—Tung Vo
(74) *Attorney, Agent, or Firm*—Oblon, Spivak, McClelland, Maier & Neustadt, P.C.

(57) ABSTRACT

Motion picture data is compression-encoded by a compression encoder with the frame rate changing according to the amount of accumulated data of the buffer, which can adequately change the number of pieces of frame image data to be compression-encoded per unit time, according to the change in the picture of the motion picture. In addition, tracing is done to trace extract image data in the frame image data by using a simple motion vector detected for the frame image data of the motion picture data, a higher layer motion vector detector detects a motion vector of the frame image data by using the simple motion vector in common, and a compression encoder extracts the extract image data based on the results of tracing and compression-encodes it by using the motion vector.

9 Claims, 24 Drawing Sheets

FOREIGN PATENT DOCUMENTS

| | | |
|---|---|---|
| JP | 8-335269 | 12/1996 |
| JP | 8-336140 | 12/1996 |
| JP | 9-261638 | 10/1997 |
| JP | 11-18085 | 1/1999 |
| JP | 11-32301 | 2/1999 |
| JP | 2000-78588 | 3/2000 |
| JP | 2000-184379 | 6/2000 |

\* cited by examiner

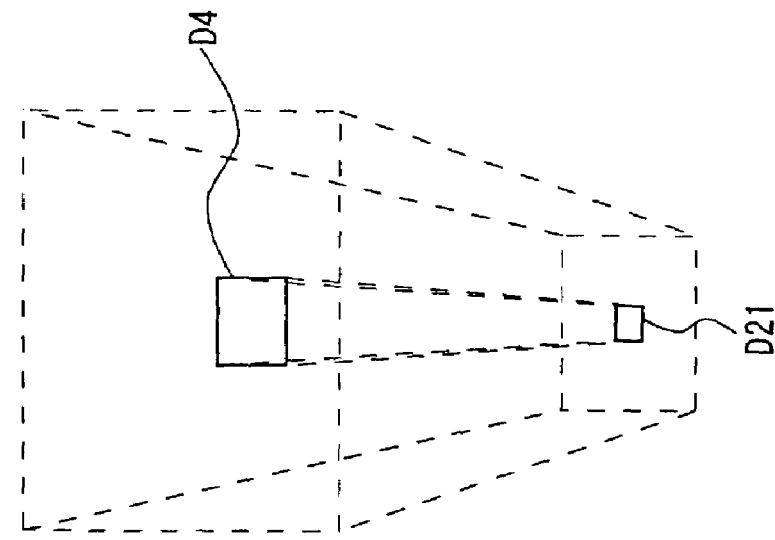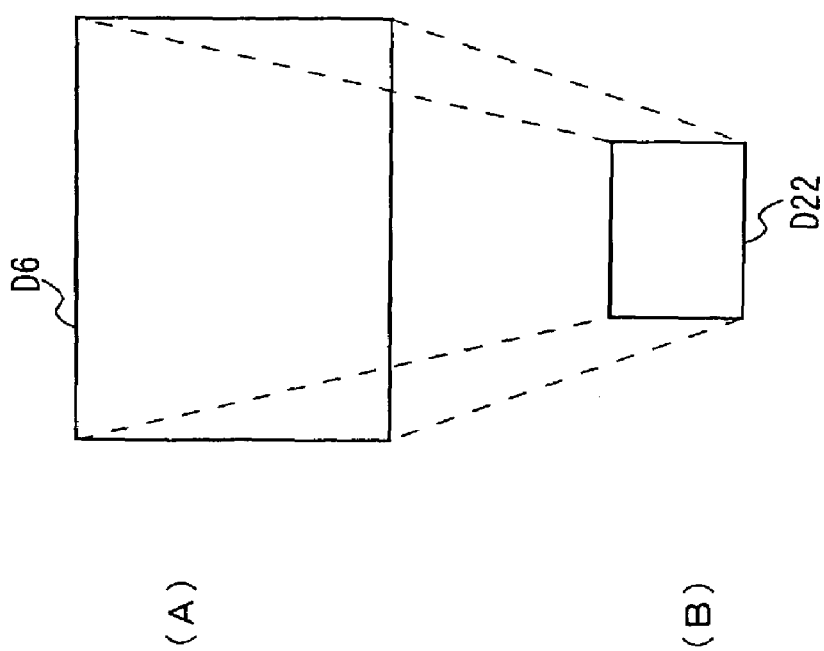
FIG. 11

81 FRAME (D) PROCESSING PROCEDURE AT FRAME RATE CHANGE PROCESSING DIVISION

MOTION PICTURE ENCODING APPARATUS

TECHNICAL FIELD

The present invention relates to a motion picture encoding apparatus, and is suitably applied to, for instance, a motion picture encoding apparatus for compression-encoding motion picture data when distributing the motion picture data by using the Internet.

BACKGROUND ART

In recent years, a distribution method generally called streaming has started to spread as a method of distributing motion picture data by using the Internet, wherein motion picture data which is obtained while an object is shot with a video camera or the like is sent to a user's personal computer or the like via the Internet so as to show motion picture based on the motion picture data in real time.

As for such a distribution method by streaming, a data transfer rate of the Internet is relatively low, and so a motion picture encoding apparatus to which a compression encoding method called MPEG2 (Moving Picture Experts Group phase 2) is applied, for instance, is provided on a sender side.

Now, the MPEG2 standard is standardized by organizations such as ISO/IEC JTC1/SC2/WG11 (International Organization for Standardization/International Electrotechnical Commission Joint Technical Committee/Sub Committee 2/Working Group 11), that is, standardized by adopting a hybrid encoding method which is a combination of motion compensation predictive encoding and discrete cosine transformation (DCT).

And the MPEG2 standard prescribes three picture types, that is, an in-frame encoded image (intra-encoded image) called an I (Intra)-picture, an inter-frame forward predictive encoded image called a P (Predictive)-picture, and a bidirectionally predictive encoded image called a B (Bidirectionally predictive)-picture, so as to sequentially assign any of the I-picture, P-picture and B-picture to frame image data constituting motion picture data in a predetermined order and then perform compression encoding.

Actually, the MPEG2 standard prescribes four types of predictive modes, that is, in-frame encoding, forward predictive encoding, backward predictive encoding and bidirectionally predictive encoding, where it is prescribed that a frame image to which the I-picture is assigned is compression-encoded by the in-frame encoding on a unit of a macro-block of 16 pixels×16 lines basis, a frame image to which the P-picture is assigned is compression-encoded by one of the in-frame encoding or the forward predictive encoding on the macro-block basis, and furthermore, a frame image to which the B-picture is assigned is compression-encoded by any one of the in-frame encoding, the forward predictive encoding, the backward predictive encoding and the bidirectionally predictive encoding on the macro-block basis.

Incidentally, as shown in FIG. 26, a motion picture encoding apparatus 1 to which the MPEG2 standard is applied captures the motion picture data supplied from the outside on the frame image data basis into a frame memory for inputting 2 having recording capacity of a plurality of frames, and sequentially assigns any of the I-picture, P-picture and B-picture to the frame image data captured into the frame memory for inputting 2 in a predetermined order, and also records picture type information representing the I-picture, P-picture and B-picture by associating it with the frame image data in the frame memory for inputting 2.

An operator 3 sequentially reads the frame image data to which the I-picture has been assigned in the frame memory for inputting 2 (hereafter, referred to as first frame image data) as data in a unit of the macro-block (hereafter, referred to as first macro-block data).

Every time the operator 3 reads the first macro-block data from the frame memory for inputting 2, a motion vector detector 4 reads the picture type information (that is, representing the I-picture) corresponding to the first macro-block data, and generates predictive mode data representing that the first macro-block data is compression-encoded by the in-frame encoding, based on that picture type information, and then sends it to a motion compensator 5 and a variable length coder 6.

The motion compensator 5 thereby stops a motion compensation process for the corresponding first macro-block data based on the predictive mode data (representing the in-frame encoding) given from the motion vector detector 4.

Accordingly, the operator 3 reads the first macro-block data from the frame memory for inputting 2, and sends the first macro-block data as it is to a discrete cosine transformer 7 since no data is given from the motion compensator 5 at this point.

The discrete cosine transformer 7 performs discrete cosine transformation on the first macro-block data given from the operator 3, and sends the obtained discrete cosine transformation coefficient to a quantizer 8.

The quantizer 8 detects the amount of the encoded data accumulated in a buffer 9 provided on an output stage (hereafter, referred to as the amount of accumulated data) in a predetermined cycle, and selects a quantization step according to the detected amount of accumulated data.

The quantizer 8 thereby quantizes the discrete cosine transformation coefficient given from the discrete cosine transformer 7, based on a corresponding quantization step, and sends the obtained quantization coefficient to the variable length coder 6 and a dequantizer 10 together with the quantization step.

The variable length coder 6 performs the variable length coding (VLC) on the quantization coefficient given from the quantizer 8, with a Huffman code or the like, and also performs the variable length coding on the quantization step given from the quantizer 8 and the predictive mode data given from the motion vector detector 4, and then outputs the obtained encoded data to the outside via the buffer 9.

Thus, the motion picture encoding apparatus 1 sequentially compression-encodes the first frame image data in the frame memory for inputting 2 on the first macro-block data basis by the in-frame encoding, and outputs the obtained encoded data to the outside.

In addition, the dequantizer 10 dequantizes the quantization coefficient given from the quantizer 8, based on the quantization step likewise given from the quantizer 8, and sends the obtained discrete cosine transformation coefficient to an inverse-discrete cosine transformer 11.

The inverse-discrete cosine transformer 11 performs the inverse discrete cosine transformation (IDCT) on the discrete cosine transformation coefficient given from the dequantizer 10, and sends the obtained first macro-block data to an adder 12.

The adder 12, when the first macro-block data is given from the inverse-discrete cosine transformer 11, sends the first macro-block data as it is to a frame memory for reference 13 having recording capacity of a plurality of frames to store it therein, since no data is given from the motion compensator 5 at this point, and thus the first frame image data is reconstructed in the frame memory for reference 13.

On the other hand, the operator 3 sequentially reads the frame image data (hereafter, referred to as second frame image data) to which the P-picture is assigned in the frame memory for inputting 2 as data in a unit of the macro-block (hereafter, referred to as second macro-block data).

In this case, every time the second macro-block data is read from the frame memory for inputting 2 by the operator 3, the motion vector detector 4 reads the same second macro-block data and the picture type information corresponding thereto (that is, representing the P-picture) from the frame memory for inputting 2, and also reads the first or second frame image data on a more forward side (in the past time-wise) than the second macro-block data for reference purposes in forward prediction, based on that picture type information.

And while the motion vector detector 4 sequentially associates the second macro-block data with a plurality of block data for comparison by a block matching method in the first or second frame image data, it calculates a sum of absolute values of differences between the pixel values of the pixels in the second macro-block data and the pixel values of the pixels of the block data for comparison corresponding thereto respectively (hereafter, referred to as a predictive error).

Thus, the motion vector detector 4 selects the predictive error having the smallest value (hereafter, especially referred to as a minimum predictive error) out of the predictive errors sequentially calculated between the second macro-block data and the respectively corresponding block data for comparison, and also detects the block data for comparison which was used when the minimum predictive error is obtained (hereafter, referred to as forward approximate block data), as the best match data with the second macro-block data, and then detects a forward motion vector of the second macro-block data based on the amount of motion between the detected forward approximate block data and the second macro-block data.

In addition, the motion vector detector 4 calculates an average of the pixel values of the pixels in the second macro-block data, and then calculates the sum of absolute values of differences between the calculated average and the pixel values (hereafter, referred to as a distribution value), and then compares the calculated distribution value to the minimum predictive error.

As a result of this, the motion vector detector 4 determines that, if the distribution value is smaller than the minimum predictive error, distribution of the pixels (variation in pixel values) is small as to the second macro-block data, and so the data amount of the encoded data (hereafter, referred to as an encoded data amount) could be comparatively small even if the second macro-block data is compression-encoded as it is, so that it generates the predictive mode data representing that the second macro-block data is compression-encoded by the in-frame encoding, and then sends it to the motion compensator 5 and the variable length coder 6.

As opposed to this, the motion vector detector 4 determines that, if the distribution value is larger than the minimum predictive error, the distribution of the pixels (variation in pixel values) is large as to the second macro-block data, and so the encoded data amount could hardly be rendered small unless the second macro-block data is compression-encoded by the forward predictive encoding, so that it generates the predictive mode data representing that the second macro-block data is compression-encoded by the forward predictive encoding, and then sends it together with the motion vector of the second macro-block data to the motion compensator 5 and the variable length coder 6.

Then, the motion compensator 5 stops the motion compensation process for the second macro-block data when the predictive mode data representing that the in-frame encoding is applied to the second macro-block data is given from the motion vector detector 4.

In addition, when the motion vector to the second macro-block data and the predictive mode data representing the forward predictive encoding are given from the motion vector detector 4, the motion compensator 5 performs the motion compensation process and reads the first or second frame image data on the more forward side (in the past time-wise) than the second macro-block data, for reference purposes from the frame memory for reference 13.

And then, the motion compensator 5 extracts the block data for operation which is the best match with the second macro-block data, from the first or second frame image data based on the motion vector, and then sends it to the operator 3 and the adder 12.

When the in-frame encoding is selected as the predictive mode for the second macro-block data read from the frame memory for inputting 2, the operator 3 sends the second macro-block data as it is to the discrete cosine transformer 7 since no block data for operation is given from the motion compensator 5.

Thus, when the in-frame encoding is selected as the predictive mode for the second macro-block data, the motion picture encoding apparatus 1 has each of the discrete cosine transformer 7, the quantizer 8, the variable length coder 6, the buffer 9, the dequantizer 10, the inverse-discrete cosine transformer 11, the adder 12 and the frame memory for reference 13 operate just as in the case of compression-encoding the above-mentioned first macro-block data.

Thus, the motion picture encoding apparatus 1 performs the variable length coding on the second macro-block data together with the quantization step and the predictive mode data, and then outputs the obtained encoded data to the outside, and also decodes the compressed second macro-block data and stores it in the frame memory for reference 13.

In addition, when the forward predictive encoding is selected as the predictive mode for the second macro-block data read from the frame memory for inputting 2, the operator 3 subtracts the block data for operation given from the motion compensator 5, from the second macro-block data, and then sends the obtained difference data to the discrete cosine transformer 7.

In this case, the discrete cosine transformer 7 performs the discrete cosine transformation on the difference data given from the operator 3, and sends the obtained discrete cosine transformation coefficient to the quantizer 8.

In addition, the quantizer 8 quantizes the discrete cosine transformation coefficient based on the corresponding quantization step selected just as in the above-mentioned case of processing the first macro-block data, and sends the obtained quantization coefficient together with the quantization step to the variable length coder 6 and the dequantizer 10.

And then, the variable length coder 6 performs the variable length coding on that quantization coefficient with the Huffman code or the like, and also performs the variable length coding on the corresponding quantization step, the predictive mode data (representing the forward predictive encoding) and the motion vector, and then outputs the encoded data thus obtained to the outside via the buffer 9.

At this point, the dequantizer 10 dequantizes the quantization coefficient given from the quantizer 8, based on the quantization step given likewise from the quantizer 8, and sends the obtained discrete cosine transformation coefficient to the inverse-discrete cosine transformer 11.

In addition, the inverse-discrete cosine transformer 11 performs the inverse-discrete cosine transformation on the discrete cosine transformation coefficient given from the dequantizer 10, and sends the obtained difference data to the adder 12.

The adder 12 adds the difference data given from the inverse-discrete cosine transformer 11 and the block data for operation given from the motion compensator 5 at this point, and sends the obtained second macro-block data to the frame memory for reference 13 to store it therein.

Thus, the motion picture encoding apparatus 1 also reconstructs the second frame image data in the frame memory for reference 13 when sequentially compression-encoding the second frame image data on the second macro-block data basis.

In addition to it, as for the frame image data to which the B-picture is assigned in the frame memory for inputting 2 (hereafter, referred to as third frame image data), the operator 3 sequentially reads it as the data in a unit of the macro-block (hereafter, referred to as third macro-block data).

In this case, every time the third macro-block data is read from the frame memory for inputting 2 by the operator 3, the motion vector detector 4 reads the same third macro-block data and the picture type information corresponding thereto (that is, representing the B-picture) from the frame memory for inputting 2, and also reads the first or second frame image data on the more forward side (in the past time-wise) and the first or second frame image data on the more backward side (in the future time-wise) than the third macro-block data for reference purposes in the forward prediction, backward prediction and bidirectional prediction, based on that picture type information.

And the motion vector detector 4 detects the forward approximate block data having the minimum predictive error (hereinafter, especially referred to as the forward minimum predictive error) in the first or second frame image data on the forward side by the block matching method and thereby detects the forward motion vector to the third macro-block data, as with the above-mentioned second macro-block data.

Likewise, the motion vector detector 4 detects the block data for comparison (hereinafter, referred to as backward approximate block data) having the minimum predictive error (hereinafter, especially referred to as backward minimum predictive error) in the first or second frame image data on the backward side by the block matching method and then detects a backward motion vector to the third macro-block data.

Furthermore, the motion vector detector 4 generates average approximate block data by averaging the forward approximate block data and backward approximate block data thus detected, so as to then calculate the predictive error between the generated average approximate block data and the third macro-block data (hereafter, referred to as bidirectional predictive error).

Thus, the motion vector detector 4 selects one forward minimum predictive error, backward minimum predictive error or bidirectional predictive error which has the smallest value, out of the forward minimum predictive error, the backward minimum predictive error and the bidirectional predictive error, and also calculates the distribution value as to the third macro-block data, as with the above-mentioned second macro-block data, and then compares the calculated distribution value to the selected one forward minimum predictive error, backward minimum predictive error or bidirectional predictive error (hereafter, especially referred to as selected predictive error).

As a result of this, the motion vector detector 4 determines that, if the distribution value is smaller than the selected predictive error, distribution of the pixels (variation) is small as to the third macro-block data, and so the encoded data amount could be relatively small even if the third macro-block data is compression-encoded as it is, so that it generates the predictive mode data representing that the third macro-block data is compression-encoded by the in-frame encoding, and then sends it to the motion compensator 5 and the variable length coder 6.

As opposed to this, the motion vector detector 4 determines that, if the distribution value is larger than the selected predictive error, the distribution of the pixels (variation) is large as to the third macro-block data, and so the encoded data amount could hardly be rendered small unless the third macro-block data is compression-encoded by a predictive mode other than the in-frame encoding.

In this case, when the selected predictive error is the forward minimum predictive error, the motion vector detector 4 generates predictive mode data representing that the third macro-block data is compression-encoded by the forward predictive encoding, and then sends it together with the forward motion vector of the third macro-block data to the motion compensator 5 and the variable length coder 6.

In addition, when the selected predictive error is the backward minimum predictive error, the motion vector detector 4 generates predictive mode data representing that the third macro-block data is compression-encoded by the backward predictive encoding, and then sends it together with the backward motion vector of the third macro-block data to the motion compensator 5 and the variable length coder 6.

Furthermore, when the selected predictive error is the bidirectional predictive error, the motion vector detector 4 generates predictive mode data representing that the third macro-block data is compression-encoded by the bidirectional predictive encoding, and then sends it together with both the forward and backward motion vectors of the third macro-block data to the motion compensator 5 and the variable length coder 6.

The motion compensator 5 stops the motion compensation process for the third macro-block data when the predictive mode data representing that the in-frame encoding is applied to the third macro-block data is given from the motion vector detector 4.

In addition, when the forward motion vector to the third macro-block data and the predictive mode data representing the forward predictive encoding are given from the motion vector detector 4, the motion compensator 5 performs the motion compensation process and reads the first or second frame image data on the more forward side (in the past time-wise) than the third macro-block data, for reference purposes from the frame memory for reference 13, and extracts the block data for operation which is the best match with the third macro-block data, from the read first or second frame image data, based on the forward motion vector, and then sends it to the operator 3 and the adder 12.

Furthermore, when the backward motion vector to the third macro-block data and the predictive mode data representing the backward predictive encoding are given from the motion vector detector 4, the motion compensator 5 also performs the motion compensation process and reads the first or second frame image data on the more backward side (in the future time-wise) than the third macro-block data, for reference purposes from the frame memory for reference 13, and extracts the block data for operation which is the best match with the third macro-block data, from the read first or second frame image data based on the backward motion vector, and then sends it to the operator 3 and the adder 12.

In addition to this, when both the forward and backward motion vectors to the third macro-block data and the predictive mode data representing the bidirectional predictive encoding are given from the motion vector detector 4, the motion compensator 5 also performs the motion compensation process and reads the first or second frame image data on the more forward side (in the past time-wise) and the first or second frame image data on the more backward side (in the future time-wise) than the third macro-block data, for reference purposes from the frame memory for reference 13.

And then, the motion compensator 5 extracts the block data for operation which is the best match with the third macro-block data, from the first or second frame image data on the forward side, based on the forward motion vector and also extracts the block data for operation which is the best match with the third macro-block data, from the first or second frame image data on the backward side, based on the backward motion vector, and then generates the average block data for operation by averaging the extracted two pieces of block data for operation, and sends it to the operator 3 and the adder 12.

When the in-frame encoding is selected as the predictive mode for the third macro-block data read from the frame memory for inputting 2, the operator 3 sends the third macro-block data as it is to the discrete cosine transformer 7 since no data is given from the motion compensator 5.

Thus, when the in-frame encoding is selected as the predictive mode for the third macro-block data, the motion picture encoding apparatus 1 has each of the discrete cosine transformer 7, the quantizer 8, the variable length coder 6, the buffer 9, the dequantizer 10, the inverse-discrete cosine transformer 11, the adder 12 and the frame memory for reference 13 operate, just as when the above-mentioned first macro-block data is compression-encoded, and thus performs the variable length coding on the third macro-block data together with the quantization step and the predictive mode data, and then outputs the obtained encoded data to the outside, and also decodes the compressed third macro-block data and store it in the frame memory for reference 13.

In addition, when the forward predictive encoding, the backward predictive encoding and the bidirectional predictive encoding are selected as the predictive modes for the third macro-block data read from the frame memory for inputting 2, the operator 3 subtracts the block data for operation or the average block data for operation given from the motion compensator 5, from the third macro-block data, and then sends the obtained difference data to the discrete cosine transformer 7.

In this case, the discrete cosine transformer 7 performs the discrete cosine transformation on the difference data given from the operator 3, and sends the obtained discrete cosine transformation coefficient to the quantizer 8.

The quantizer 8 quantizes the discrete cosine transformation coefficient based on the corresponding quantization step selected just as in the above-mentioned case of processing the first macro-block data, and sends the obtained quantization coefficient together with the quantization step to the variable length coder 6 and the dequantizer 10.

And when the forward predictive encoding is selected as the predictive mode of the third macro-block data which is to be a basis of the quantization coefficient, the variable length coder 6 performs the variable length coding on that quantization coefficient with the Huffman code or the like, and also performs the variable length coding on the corresponding quantization step, the predictive mode data (representing the forward predictive encoding) and the forward motion vector, and then outputs the encoded data thus obtained to the outside via the buffer 9.

In addition, when the backward predictive encoding is selected as the predictive mode for the third macro-block data which is to be the basis of the quantization coefficient, the variable length coder 6 performs the variable length coding on the quantization coefficient with the Huffman code or the like, and also performs the variable length coding on the corresponding quantization step, the predictive mode data (representing the backward predictive encoding) and the backward motion vector, and then outputs the encoded data thus obtained to the outside via the buffer 9.

Furthermore, when the bidirectional predictive encoding is selected as the predictive mode for the third macro-block data which is to be the basis of the quantization coefficient, the variable length coder 6 performs the variable length coding on the quantization coefficient with the Huffman code or the like, and also performs the variable length coding on the corresponding quantization step, the predictive mode data (representing the bidirectional predictive encoding) and both the forward and backward motion vectors, and then outputs the encoded data thus obtained to the outside via the buffer 9.

At this time, the dequantizer 10 dequantizes the quantization coefficient given from the quantizer 8, based on the quantization step given likewise from the quantizer 8, and sends the obtained discrete cosine transformation coefficient to the inverse-discrete cosine transformer 11.

In addition, the inverse-discrete cosine transformer 11 performs the inverse-discrete cosine transformation on the discrete cosine transformation coefficient given from the dequantizer 10, and sends the obtained difference data to the adder 12.

Then, the adder 12 adds the difference data given from the inverse-discrete cosine transformer 11 and the block data for operation or the average block data for operation given from the motion compensator 5 at this point, and sends the obtained third macro-block data to the frame memory for reference 13 to store it therein.

Thus, the motion picture encoding apparatus 1 also reconstructs the third frame image data in the frame memory for reference 13 when sequentially compression-encoding the third frame image data on the third macro-block data basis.

Thus, the motion picture encoding apparatus 1 sequentially compression-encodes the motion picture data on the frame image data basis by repeating the order of the I-picture, the P-picture, and the B-picture located between the I-picture and P-picture or between two P-pictures, and then outputs the obtained encoded data to the outside.

Incidentally, as for such distribution of motion picture data by using the motion picture encoding apparatus 1, the motion picture data is compression-encoded by the motion picture encoding apparatus 1 at relatively high compressibility in compliance with the data transfer rate of the Internet, and so the image quality (a degree representing whether or not there is noise) of the motion picture provided to a user deteriorates, so that a request for making the image quality for the distributed motion picture higher is increasingly voiced.

Thus, as for such distribution of the motion picture data, there is such a proposed method that the frame image data is previously excluded from the motion picture data to be provided to the motion picture encoding apparatus 1 at predetermined intervals to change the frame rate (that is, the number of frame images in the motion picture per unit time) and then is compression-encoded.

According to this method, it is considered that, as the number of pieces of the frame image data to be compression-encoded per unit time is reduced by lowering the frame rate of the motion picture data, the remaining frame image data can be sequentially compression-encoded at relatively low compressibility and thus the image quality of the motion picture provided to the user can be made higher.

According to this method, however, the frame image data is merely excluded from the motion picture data at the predetermined intervals, irrespective of change in the picture of the motion picture, which has a problem that, if the picture of the motion picture remarkably changes between the frame image data remaining after the exclusion, the compressibility changes accordingly and so the image quality of the motion picture provided to the user consequently changes.

Further, in such distribution of motion picture data, such method has been proposed that the motion picture encoding apparatus 1 sequentially traces and extracts the data of an image in an arbitrary shape from successive frame image data of the motion picture data and compression-encodes the extracted data of the image (hereinafter, referred to as extract image data).

By this method, because successive extract image data are extracted from the motion picture data and so the data amount of data to be compression-encoded can be reduced, the successive extract image data can be sequentially compression-encoded at relatively low compressibility, and as a result, the successive extract image which are a part of the motion picture can be provided to users with making its image quality higher.

In this method, the motion vector of each piece of macro-block data is detected every frame image data, and the extract image data in the arbitrary shape is sequentially traced in the frame image data by using the detected motion vector.

Further, in this method, the motion vector of each piece of macro-block data is detected every frame image data, and the detected motion vector is compression-encoded together with the extract image data sequentially extracted from the frame image data based on the results of tracing the extract image data.

Thus, this method has a problem in that, because the motion vector of the macro-block data is detected for each the tracing and compression encoding of the extract image data, the amount of operation for detecting the motion vector increases and as a result, the compression encoding of the extract image data needs a lot of processing time.

DESCRIPTION OF THE INVENTION

The present invention has been implemented in consideration of the above points, and intends to provide a motion picture encoding apparatus capable of adequately providing motion picture with desired image quality.

In order to solve the above problem, in the present invention, the motion picture data is sequentially compression-encoded on the frame image data basis by a compression encoding means, and while the obtained encoded data is once accumulated in a buffer and outputted, the frame rate of the motion picture data is changed by a frame rate changing means according to the amount of accumulated data of the buffer.

Accordingly, it is possible to adequately change the number of pieces of the frame image data to be compression-encoded per unit time, according to the change in the picture of the motion picture based on the motion picture data and thereby stabilize the compressibility, which can consequently stabilize the image quality of the motion picture and thus adequately provide the motion picture with desired image quality.

In addition, this invention has been implemented in consideration of the above point, and intends to a motion picture encoding apparatus capable of speeding up the compression encoding processing of extract image data in an arbitrary shape.

In order to solve the above problem, in this invention, a lower motion vector detection means detects a simple motion vector between successive frame image data of motion picture data in a layer lower than a prescribed layer, a tracing means traces extract image data in an arbitrary shape in the successive frame image data of the motion picture data by using the simple motion vector, a higher layer motion vector detection means shares the simple motion vector to detect the motion vector of the original image level between the successive frame image data of the motion picture data in a layer higher than the prescribed layer, and a compression encoding means compression-encodes extracted extract image data by a motion compensation predictive encoding using the motion vector while sequentially extracting the extract image data from the successive frame image data of the motion picture data based on the results of tracing the extract image data.

Accordingly, the amount of operation for detecting motion vector can be significantly reduced, as compared with the case of separately detecting a motion vector for the tracing of extract image data and the compression encoding of the extract image data, thus making it possible to speed up the compression encoding processing of the extract image data in the arbitrary shape.

BRIEF DESCRIPTION OF THE DRAWINGS

FIG. 11 is a schematic diagram explaining the generation of hierarchical macro-block data and hierarchical frame image data.

BEST MODE FOR CARRYING OUT THE INVENTION

Figure 1:
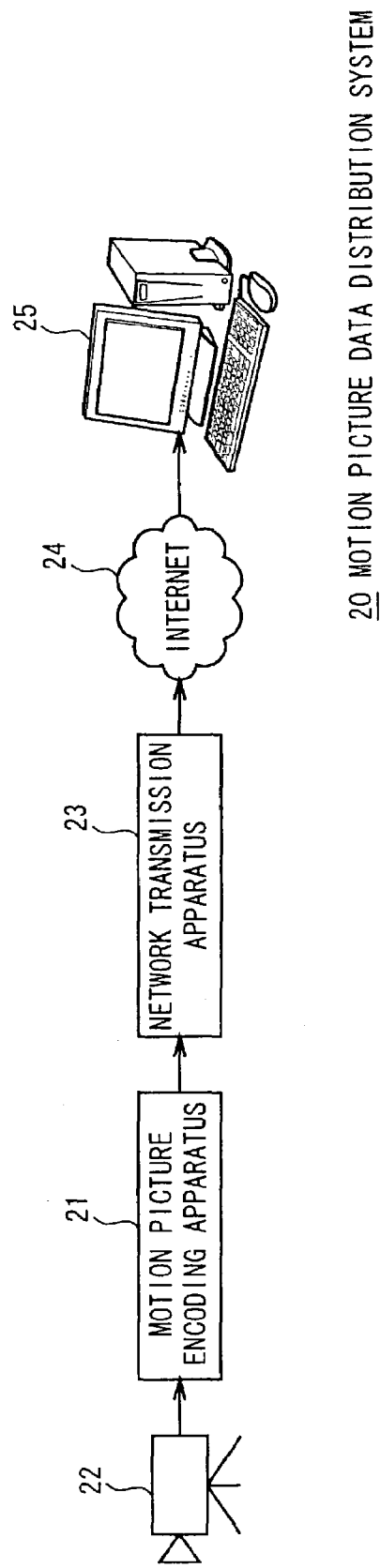
FIG. 1 is a conceptual illustration showing a distribution form of motion picture data in a motion picture data distribution system.

Hereafter, embodiments of the present invention will be described in detail by referring to the drawings.

(1) MOTION PICTURE DATA DISTRIBUTION FORM IN A MOTION PICTURE DATA DISTRIBUTION SYSTEM

As shown in FIG. 1, a motion picture data distribution system 20 has a motion picture encoding apparatus 21 to which a compression encoding method called MPEG4 (Moving Picture Experts Group phase 4) standardized by organizations such as ISO/IEC (International Organization for Standardization/International Electrotechnical Commission) is applied, on a sender side.

This MPEG4 standard is so prescribed as to sequentially compression-encode motion picture data on a frame image data basis almost in the same way as the MPEG2 standard, and in addition, to be capable of changing the frame rate (that is, the number of frame images in the motion picture per unit time) of the motion picture data.

In addition, this MPEG4 standard is so prescribed as to be capable of tracing and extracting an image in an arbitrary shape from successive frame images of motion picture, and sequentially compression encoding data (hereafter, referred to as extract image data) of the extracted images (hereafter, referred to as extract image).

Accordingly, in this motion picture data distribution system 20, the motion picture data obtained by shooting an object with a video camera 22 on a sender side is captured into the motion picture encoding apparatus 21 which then compression-encodes the motion picture data while changing its frame rate as appropriate, or extracts the extract image data from the motion picture data and compression-encodes it while changing its frame rate as appropriate, and then the obtained encoded bit stream is sent from a network transmission apparatus 23 to a personal computer 25 on a receiver side via the Internet 24.

On receipt of the encoded bit stream sent from the network transmission apparatus 23 via the Internet 24, the personal computer 25 decodes the received encoded bit stream and sends it to a display so as to display the motion picture of which the frame rate has been changed or the extract image of the motion picture of which the frame rate has been changed on the display.

Thus, this motion picture data distribution system 20 is capable of distributing motion picture data while changing its frame rate as appropriate, or extracting the extract image data from the motion picture data of which the frame rate has been changed and distributing it, so as to show a user the motion picture with higher image quality or the extract images with higher image quality likewise via the personal computer 25.

(2) FIRST EMBODIMENT

Figure 2:
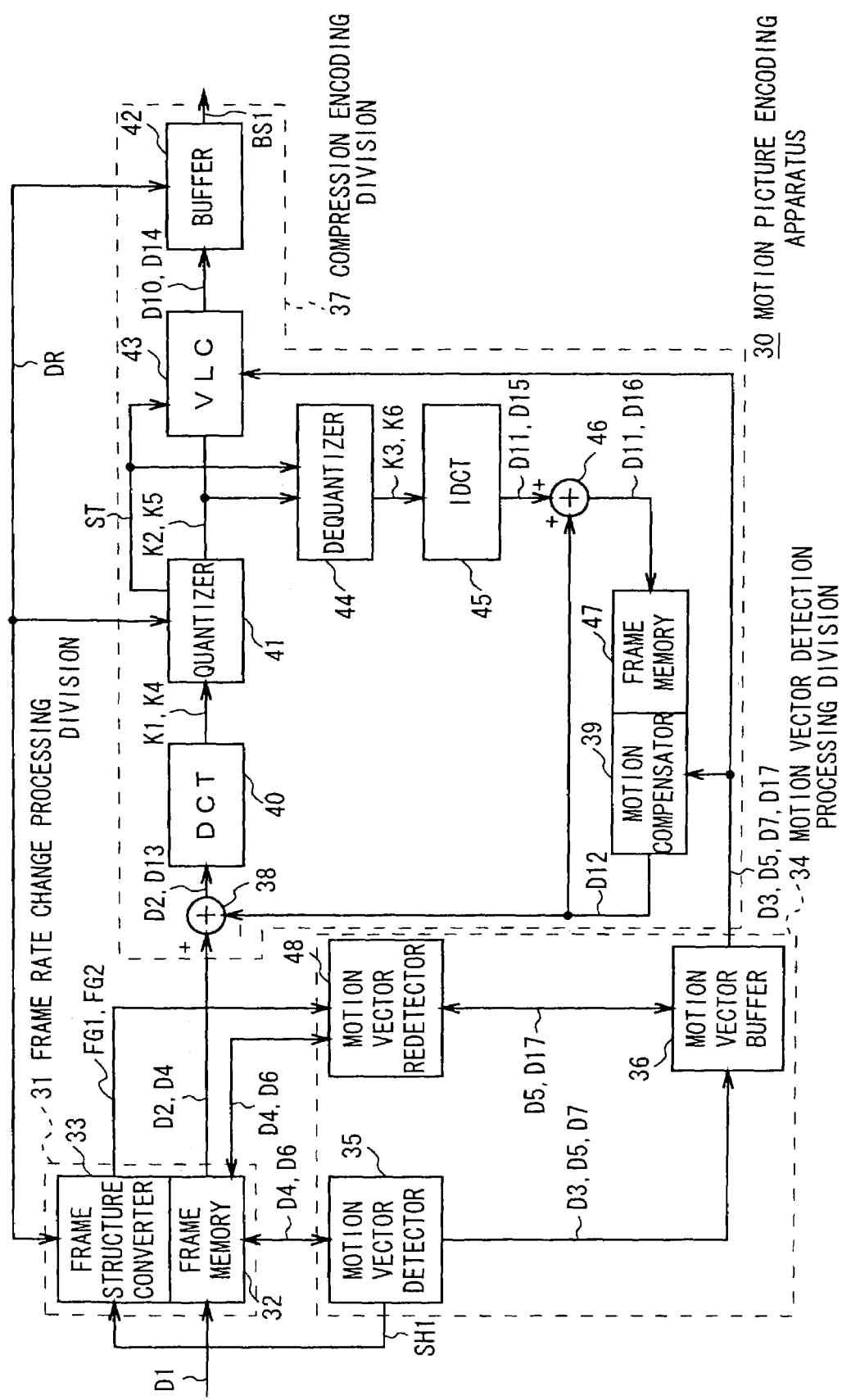
FIG. 2 is a block diagram showing a first embodiment of a circuit construction of a motion picture encoding apparatus according to the present invention.

In FIG. 2, reference numeral 30 denotes the motion picture encoding apparatus according to the first embodiment as a whole, where motion picture data D1 supplied from an external video camera (not shown) shooting an object (not shown) is sequentially captured on a frame image data basis into a frame memory for inputting 32 having recording capacity of a plurality of frames, provided in a frame rate change processing division 31.

Figure 3:
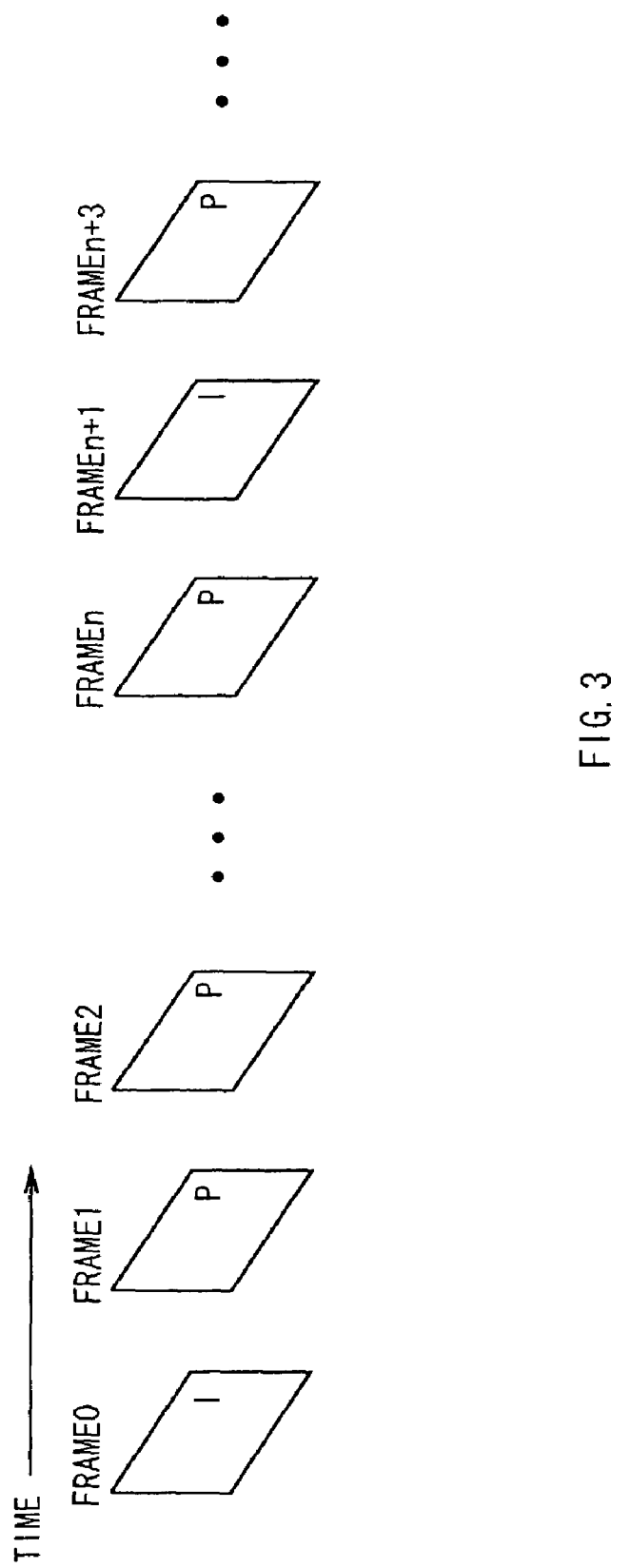
FIG. 3 is a schematic diagram explaining picture types assigned to the frame image data of the motion picture data.

In this case, as shown in FIG. 3, every time the frame image data is captured into the frame memory for inputting 32, a frame structure converter 33 of the frame rate change processing division 31 assigns picture types such as an I-picture and a P-picture to the captured frame image data in an order wherein one I-picture and a predetermined number of P-pictures are sequentially and alternately successive, and also records in the frame memory for inputting 32 the picture types representing the I-picture and the P-picture and frame identification information unique to the frame image data to which the picture types are assigned, as picture information.

When the I-picture is assigned to the frame image data in the frame memory for inputting 32, a motion vector detector 35 of a motion vector detection processing division 34 reads the picture information of the frame image data to which the I-picture is assigned (hereafter, referred to as first frame image data).

And the motion vector detector 35 generates predictive mode data D3 representing the frame identification information on the first frame image data as frame-to-be-encoded identification information and also representing that the first frame image data is sequentially compression-encoded as data in a unit of macro-block (hereafter, referred to as first macro-block data) D2 by in-frame encoding, based on that picture information and then sends the generated predictive mode data D3 to a motion vector buffer 36 to store it therein.

In addition, when the P-picture is assigned to the frame image data in the frame memory for inputting 32, the motion vector detector 35 reads the picture information on the frame image data to which the P-picture is assigned (hereafter, referred to as second frame image data).

And the motion vector detector 35 generates predictive mode data D5 representing the frame identification information on the second frame image data as the frame-to-be-encoded identification information and also representing that the second frame image data is sequentially compression-encoded as data in a unit of macro-block (hereafter, referred to as second macro-block data) D4 by forward predictive encoding, based on that picture type information.

In addition to it, the motion vector detector 35 sequentially reads the second frame image data on the second macro-block data D4 basis from the frame memory for inputting 32 and also reads first or second frame image data D6 adjacent to the second frame image data on a forward side (in the past time-wise) for reference purposes.

And while sequentially associating the second macro-block data D4 with a plurality of block data for comparison in a predetermined search range of the first or second frame image data for reference D6 by a block matching method, the motion vector detector 35 calculates a sum of absolute values of differences between the pixel values of the pixels in the second macro-block data D4 and the pixel values of the pixels of the block data for comparison corresponding thereto (hereafter, referred to as a predictive error).

Then, the motion vector detector 35 selects the predictive error of the smallest value (hereafter, especially referred to as a minimum predictive error) out of the predictive errors sequentially calculated between the second macro-block data D4 and the corresponding block data for comparison.

The motion vector detector 35 detects the block data for comparison which was used when the minimum predictive error (hereafter, referred to as approximate block data) was obtained, as the best match data with the second macro-block data D4 so as to detect a motion vector D7 of the second macro-block data D4 based on the amount of motion of the detected approximate block data and the second macro-block data D4.

Thus, the motion vector detector 35 generates predictive mode data D5 for the second frame image data in the frame memory for inputting 32, and when it detects the motion vector D7 of each piece of the second macro-block data D4 in the second frame image data, it associates the predictive mode data D5 with the motion vector D7, and then sends them to the motion vector buffer 36 to store them therein.

When the frame image data is sequentially captured into the frame memory for inputting 32 and the I-picture and the P-picture are assigned as described above, the motion vector detector 35 generates the predictive mode data D3 and D5 likewise each time, and detects the motion vector D7 of each piece of the second macro-block data D4, and then sends it to the motion vector butter 36 to store it therein.

A compression encoding division 37 starts compression encoding of the first and second frame image data when the motion vector detector 35 generates the predictive mode data D3 and D5 for the frame image data by a predetermined number of frames in order from the leading first frame image data in the frame memory for inputting 32 and also detects the motion vector D7 of each piece of the second macro-block data D4.

Actually, when the compression encoding division 37 starts compression encoding of the first and second frame image data, an operator 38 sequentially reads the leading first frame image data on the first macro-block data D2 basis from the frame memory for inputting 32.

When the compression encoding of the first and second frame image data starts, a motion compensator 39 starts to read the predictive mode data D3, the predictive mode data D5 and the motion vector D7 in order of the compression encoding of the first and second frame image data from the motion vector buffer 36, and stops a motion compensation process for the first macro-block data D2 based on the corresponding predictive mode data D3 (representing the in-frame encoding) read from the motion vector buffer 36 when the first macro-block data D2 is read from the frame memory for inputting 32 by the operator 38.

Accordingly, the operator 38 reads the first macro-block data D2 from the frame memory for inputting 32, and sends the first macro-block data D2 as it is to a discrete cosine transformer 40 since no data is given from by the motion compensator 39 at this point.

The discrete cosine transformer 40 performs the discrete cosine transformation on the first macro-block data D2 given from the operator 38, and sends the obtained discrete cosine transformation coefficient K1 to a quantizer 41.

The quantizer 41 detects the amount of accumulated encoded data (hereafter, referred to as the amount of accumulated data) DR in a buffer 42 provided on an output stage at predetermined intervals, and selects a quantization step ST according to the detected amount of accumulated data DR.

The quantizer 41 thereby quantizes the discrete cosine transformation coefficient K1 given from the discrete cosine transformer 40, based on the corresponding quantization step ST, and sends the obtained quantization coefficient K2 to a variable length coder 43 and a dequantizer 44 together with the quantization step ST used for that quantization.

When the compression encoding of the first and second frame image data starts, the variable length coder 43 starts to read the predictive mode data D3, the predictive mode data D5 and the motion vector D7 in order of the compression encoding of the first and second frame image data from the motion vector buffer 36, and performs the variable length coding on the quantization coefficient K2 given from the quantizer 41 with a Huffman code or the like, and also performs the variable length coding on the quantization step ST given from the quantizer 41 and the corresponding predictive mode data D3 read from the motion vector buffer 36, so as to once accumulate the obtained encoded data D10 in the buffer 42 and output it as encoded bit stream BS1 of which the encoded data amount has been thereby smoothed, to the outside.

In this way, the motion picture encoding apparatus 30 is capable of sequentially compression encoding the first frame image data in the frame memory for inputting 32 by the in-frame encoding on the first macro-block data D2 basis.

In addition, the dequantizer 44 dequantizes the quantization coefficient K2 given from the quantizer 41, based on the quantization step ST likewise given from the quantizer 41, and sends the obtained discrete cosine transformation coefficient K3 to an inverse-discrete cosine transformer 45.

The inverse-discrete cosine transformer 45 performs inverse discrete cosine transformation on the discrete cosine transformation coefficient K3 given from the dequantizer 44, and sends the obtained first macro-block data D11 to an adder 46.

When receiving the first macro-block data D11 from the inverse-discrete cosine transformer 45, the adder 46 sends the first macro-block data D11 as it is to a frame memory for reference 47 having recording capacity of a plurality of frames to store it therein since no data is provided at this point by the motion compensator 39.

Thus, every time the first macro-block data D11 is sequentially given from the inverse-discrete cosine transformer 45 by the compression encoding of the first frame image data, the adder 46 sends the first macro-block data D11 as it is to the frame memory for reference 47 to store it therein, so as to reconstruct with the first macro-block data D11 the first frame image data, for reference purposes in the motion compensation processing, in the frame memory for reference 47.

In addition, the operator 38 reads all the first macro-block data D2 in the first frame image data from the frame memory for inputting 32, and then reads the second frame image data in the frame memory for inputting 32 as a subject of encoding on the second macro-block data D4 basis.

At this time, the motion compensator 39 performs the motion compensation process based on the corresponding predictive mode data D5 (representing the forward predictive encoding) read from the motion vector buffer 36, and reads for reference purposes the first or second frame image data adjacent to the second frame image data which is an subject of encoding at this time, on a forward side (in the past time-wise) from the frame memory for reference 47.

And then, the motion compensator 39 extracts the block data for operation D12 which is the best match with the second macro-block data D4, from the first or second frame image data for reference based on the motion vector D7 of the corresponding second macro-block data D4 given from the motion vector buffer 36, and then sends it to the operator 38 and the adder 46.

Accordingly, the operator 38 reads the second macro-block data D4 from the frame memory for inputting 32, subtracts the macro-block data for operation D12 given from the motion compensator 39, from the second macro-block data D4, and then sends the obtained difference data D13 to the discrete cosine transformer 40.

In this case, the discrete cosine transformer 40 performs discrete cosine transformation on the difference data D13 given from the operator 38, and sends the obtained discrete cosine transformation coefficient K4 to the quantizer 41.

In addition, the quantizer 41 quantizes the discrete cosine transformation coefficient K4 given from the discrete cosine transformer 40, based on a corresponding quantization step ST which was selected just as in the above-mentioned case of processing the first macro-block data, and sends the obtained quantization coefficient K5 together with the quantization step ST thereof to the variable length coder 43 and the dequantizer 44.

The variable length coder 43 thereby performs the variable length coding on the quantization coefficient K5 given from the quantizer 41 with a Huffman code or the like, and also performs the variable length coding on the quantization step ST given from the quantizer 41, the corresponding predictive mode data D5 and predictive mode data D7 read from the motion vector buffer 36, and then once accumulates the obtained encoded data D14 in the buffer 42 and outputs it as the encoded bit stream BS1 of which encoded data amount has been thereby smoothed, to the outside.

Thus, the motion picture encoding apparatus 30 is capable of sequentially compression-encoding the second frame image data in the frame memory for inputting 32 by the forward predictive encoding on the second macro-block data D4 basis.

At this time, the dequantizer 44 dequantizes the quantization coefficient K5 given from the quantizer 41 based on the quantization step ST likewise given from the quantizer 41, and sends the obtained discrete cosine transformation coefficient K6 to the inverse-discrete cosine transformer 45.

In addition, the inverse-discrete cosine transformer 45 performs the inverse discrete cosine transformation on the discrete cosine transformation coefficient K6 given from the dequantizer 44, and sends the obtained difference data D15 to the adder 46.

When the difference data D15 is given from the inverse-discrete cosine transformer 45, the adder 46 adds the difference data D15 and the block data for operation D13 since the block data for operation D13 is given from the motion compensator 39 at this point, and then sends the obtained second macro-block data D16 to the frame memory for reference 47 to store it therein.

As described above, every time the difference data D15 is given from the inverse-discrete cosine transformer 45 by the compression encoding of the second frame image data, the adder 46 generates the second macro-block data D16 by adding the difference data D15 and the block data for operation D13 corresponding thereto, and sends the generated second macro-block data D16 to the frame memory for reference 47 to store it therein, so as to reconstruct with the second macro-block data D16 the second frame image data, for reference purposes in the motion compensation processing, in the frame memory for reference 47.

Figure 4:
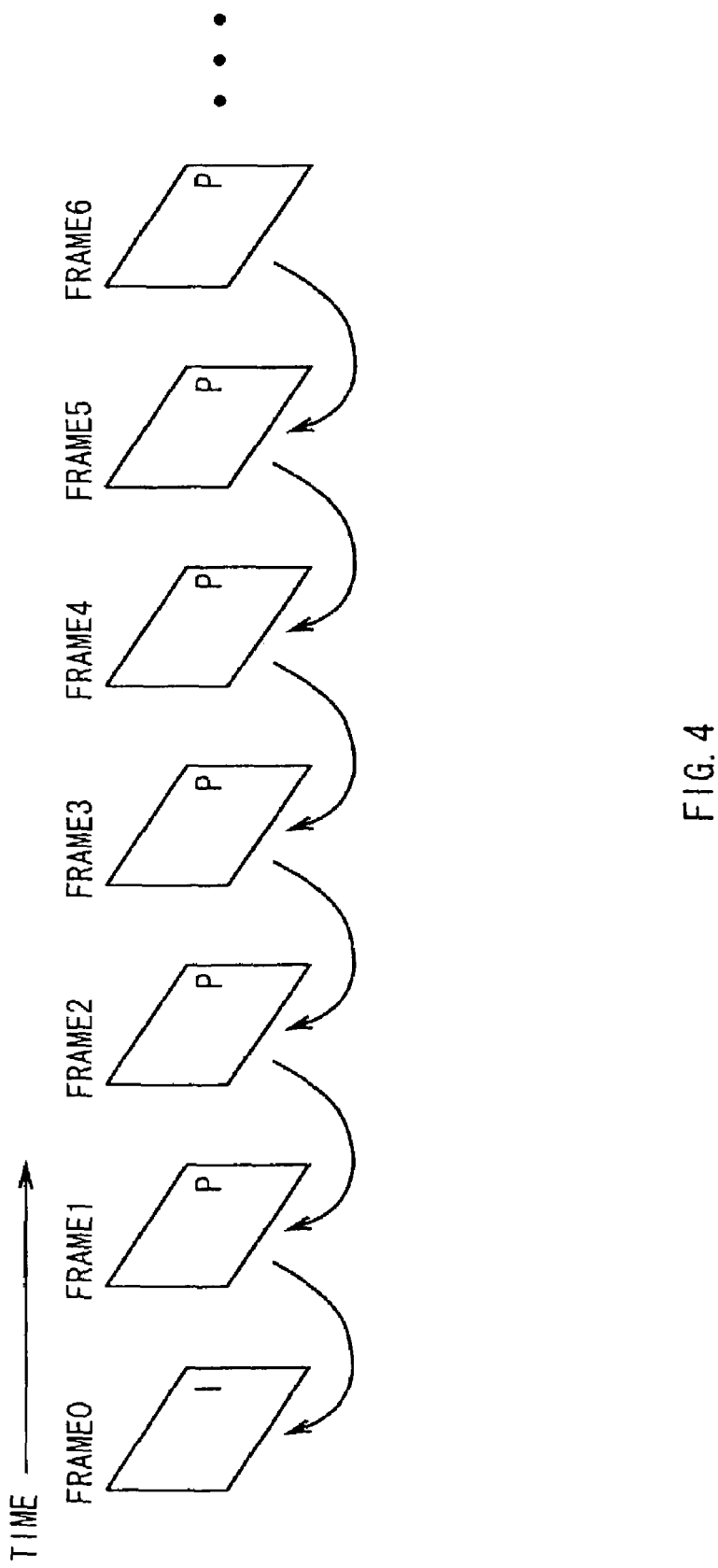
FIG. 4 is a schematic diagram explaining the compression encoding of the motion picture data.

Thus, as shown in FIG. 4, the motion picture encoding apparatus 30 sequentially compression-encodes the motion picture data D1 on the frame image data basis, that is, compression-encodes the data of the I-picture by the in-frame predictive encoding and compression-encodes the data of the P-picture by the forward predictive encoding which uses the I-picture or the P-picture in the past by one frame, so that the obtained encoded bit stream BS1 can be outputted to the outside.

In addition to this configuration, in the case of this motion picture encoding apparatus 30 (FIG. 2), every time the motion vector detector 35 detects the motion vector D7 for each piece of the second macro-block data D4 of one frame, it utilizes a predictive error calculated between the second macro-block data D4 and the first or second frame image data for reference D6, and then calculates a sum SH1 (hereafter, referred to as an inter-frame correlation value) of absolute values of differences between the pixel values of the pixels of the second frame image data which is the subject of encoding and the pixel values of the corresponding pixels of the first or second frame image data for reference D6, and then sends the calculated inter-frame correlation value SH1 to the frame structure converter 33.

Thus, the frame structure converter 33 predicts, based on the inter-frame correlation value SH1 given from the motion vector detector 35, the data amount (hereafter, referred to as predictive encoded data amount) of the encoded data D10 and D14 which is obtained in a case of compression-encoding the first and second frame image data which is the subject of encoding, at compressibility selected so as to give desired image quality to the motion picture at each destination of distribution (hereafter, referred to as selected compressibility).

And upon start of the compression encoding of the first and second frame image data which is the subject of encoding, the frame structure converter 33 detects the amount of accumulated data DR in the buffer 42 at predetermined intervals, that is, each time the first and second frame image data of one frame is compression-encoded for instance, and also compares the detected amount of the accumulated data DR to a present predetermined first threshold and second threshold smaller than the first threshold.

As a result, if the amount of accumulated data DR is within a range between the first and second thresholds, the frame structure converter 33 determines that it can compression-encode almost at the selected compressibility the first or second frame image data which is the subject of encoding following the first or second frame image data which is being compression-encoded when the amount of accumulated data DR is detected, and so it leaves the frame rate of the motion picture data D1 unchanged.

As opposed to this, if the amount of accumulated data DR is larger than the first-threshold, the frame structure converter 33 determines that the buffer 42 would overflow and the image quality of the motion picture would deteriorate according to the change in the compressibility unless the encoded data amount is reduced by compression-encoding the first or second frame image data which is the subject of encoding following the first or second frame image data which is being compression-encoded when the amount of accumulated data DR is detected, at compressibility higher than the selected compressibility.

In this case, the frame structure converter 33 estimates the amount of accumulated data DR for the time of compression-encoding the first and second frame image data of the predetermined number of frames at the selected compressibility, based on a predictive encoded data amount for the first and second frame image data of the predetermined number of frames which are the subjects of encoding following the first or second frame image data which is being-compression-encoded at this point, and the bit rate of the encoded bit stream BS1 outputted from the buffer 42.

And the frame structure converter 33 selects one or plural pieces of second frame image data from the first and second frame image data of the predetermined number of frames based on the estimated amount of accumulated data DR and the first and second thresholds, and makes the selected second frame image data unreadable from the frame memory for inputting 32 for the exclusion to thereby lower and change the frame rate of the motion picture data D1.

Accordingly, the frame structure converter 32 is capable of, even when the amount of accumulated data DR increases together with the encoded data amount obtained from the first or second frame image data due to abrupt change in the picture of the motion picture and so on based on the motion picture data D1, lowering the frame rate of the motion picture data D1 based on the increased amount of accumulated data DR and thereby decreasing the number of pieces of the first and second frame image data to be compression-encoded per unit time and thus preventing abrupt increase in the amount of accumulated data DR, so as to previously prevent abrupt increase in the compressibility and abrupt degradation of the image quality of the motion picture.

In addition to it, the frame structure converter 33 is capable of, when thus lowering the frame rate of the motion picture data D1, using the predictive encoded data amount of the first and second frame image data of the predetermined number of frames and thereby, even when the picture moves rather hard over a plurality of frames (that is, when an inter-frame correlation value SH1 between the successive first and second frame image data is relatively low) in the motion picture based on the motion picture data D1, reducing in advance the number of the first and second frame image data to be compression-encoded per unit time, so as to previously prevent the compressibility from becoming relatively high over the plurality of frames and to prevent the image quality of the motion picture from deteriorating over the plurality of frames.

In addition, even if the frame rate of the motion picture data D1 is thus reduced, the frame structure converter 33 detects the amount of the accumulated data DR of the buffer 42, and when the detected amount of the accumulated data DR is smaller than the second threshold, it determines that, even if the first and second frame image data as the subjects of encoding is increased and compression-encoded, the desired image quality for the motion picture can be maintained at the destinations of distribution.

At this time, the frame structure converter 33 estimates the amount of accumulated data DR of a case of compression-encoding the first and second frame image data of the predetermined number of frames and the excluded second frame image data, at the selected compressibility, based on the predictive encoded data amount of the first and second frame image data (the first and second frame image data remaining after the exclusion) of the predetermined number of frames which are the subjects of encoding following the first or second frame image data which is being compression-encoded at this point and one or plural pieces of the second frame image data already excluded from the first and second frame image data of the predetermined number of frames and the bit rate of the encoded bit stream BS1 which is outputted from the buffer 42.

And based on the estimated amount of the accumulated data DR and the first and second thresholds, the frame structure converter 33 selects one or plural pieces of the second frame image data to cancel the exclusion, out of the second frame image data already excluded from the first and second frame image data of the predetermined number, and cancels the exclusion by making the selected second frame image data readable from the frame memory for inputting 32, in order to increase and change the lowered frame rate so as not to exceed a predetermined frame rate.

Accordingly, the frame structure converter 33 is capable of, even when the amount of the accumulated data DR decreases together with the encoded data amount obtained from the first or second frame image data due to abrupt decrease in change in the picture of the motion picture and so on based on the motion picture data D1, rising the frame rate of the motion picture data D1 based on the decreased amount of the accumulated data DR and thereby increasing the number of the first and second frame image data to be compression-encoded per unit time and thereby increasing the amount of the accumulated data DR within the range of the first and second thresholds, so as to prevent the image quality of the motion picture from becoming higher than the desired image quality and varying due to excessive exclusion of the frame image data of the motion picture data D1.

In addition to it, the frame structure converter 33 is capable of, when thus rising the frame rate of the motion picture data D1, using the predictive encoded data amount of the first and second frame image data of the predetermined number of frames and the second frame image data already excluded from the first and second frame image data of the predetermined number of frames, and even when the change in the picture is rather stable over the plurality of frames (that is, when the inter-frame correlation value SH1 between the successive frame image data is relatively high) in the motion picture based on the motion picture data D1, thereby increasing in advance the number of pieces of the first and second frame image data to be compression-encoded per unit time so as to prevent excessive exclusion of the motion picture data D1 over the plurality of frame image data.

Figure 5:
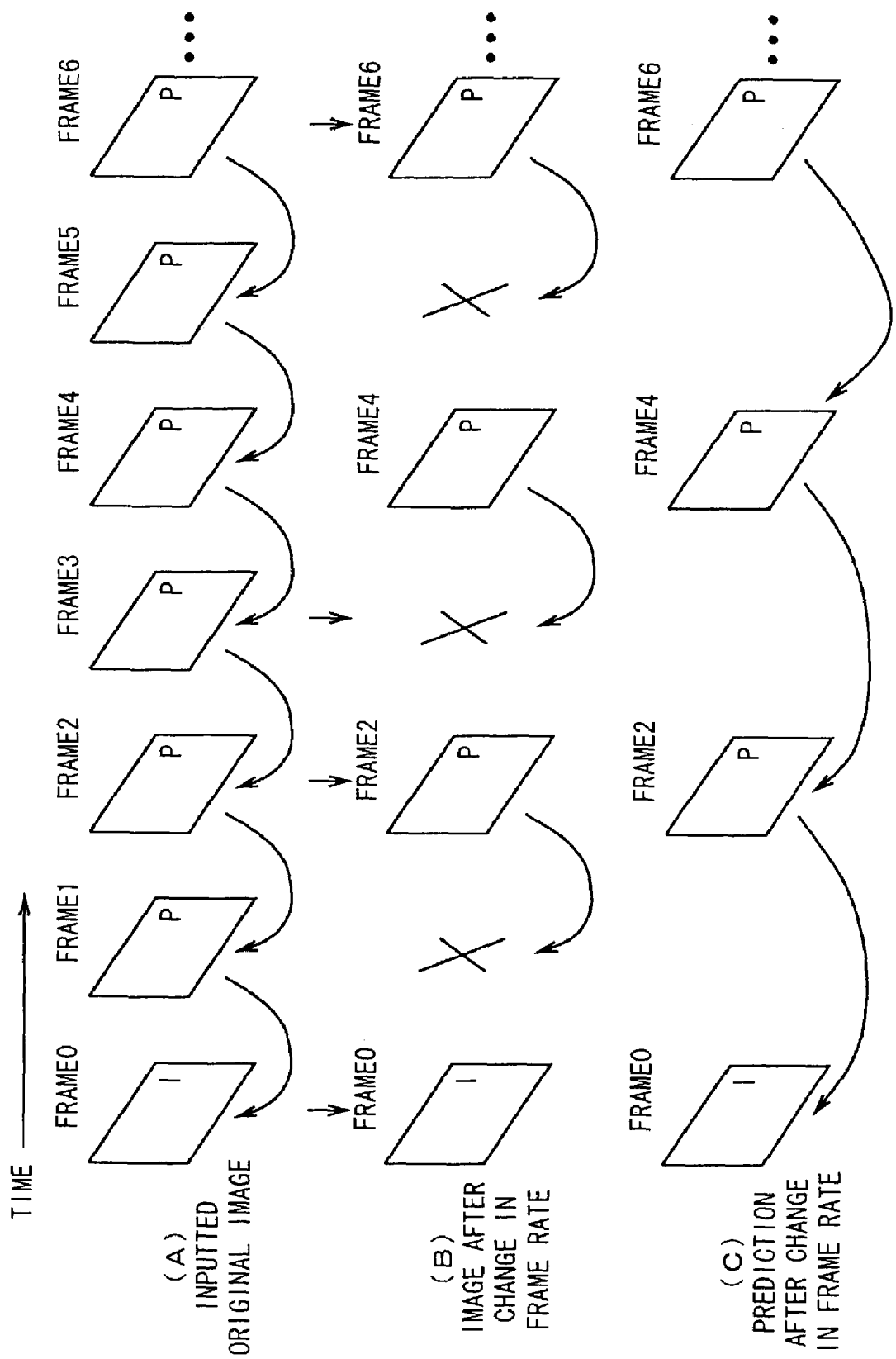
FIG. 5 is a schematic diagram explaining the change in the frame rate of the motion picture data.

Actually, when the frame structure converter 33 lowers the frame rate of the motion picture data D1 as shown in FIGS. 5(A) to (C), it leaves the first frame image data so as to allow the motion picture data D1 to be adequately decoded at the time of decoding the encoded bit stream BS1.

In addition, the frame structure converter 33 is capable of, when excluding the plurality of frame image data from the motion picture data D1 in conjunction with the change in the frame rate, excluding the second frame image data, for instance, by every other frame and thereby preventing successiveness of the motion picture based on the motion picture data D1 from getting remarkably impaired.

Incidentally, if the second frame image data is excluded from the motion picture data D1, the remaining second frame image data which was adjacent to the excluded second frame image data on the backward side (in the future time-wise) requires the redetection of the motion vector since the motion vector of each piece of the macro-block data D4 was detected with the excluded second frame image data as reference.

Thus, when the frame structure converter 33 excludes one or plural pieces of the second frame image data from the successive first and second frame image data of the motion picture data D1 every other frame, and it generates a motion vector redetection flag FG1 representing the frame identification information (hereafter, especially referred to as excluded frame identification information) on the excluded second frame image data (hereafter, especially referred to as excluded frame image data) and the frame identification information (hereafter, especially referred to as redetection frame identification information) on the second frame image data (hereafter, especially referred to as redetection frame image data) which requires the redetection of the motion vector of each piece of the macro-block data D4 due to the exclusion, and also representing that the redetection of the motion vector is required due to the exclusion, and then sends it to a motion vector redetector 48.

Thus, when receiving the motion vector redetection flag FG1 from the frame structure converter 33 as-shown in FIG. 5(C), the motion vector redetector 48 reads from the frame memory for inputting 32 the picture information on the redetection frame image data indicated by the redetection frame identification information specified by the motion vector redetection flag FG1, and thereby generates the predictive mode data D5 representing the frame identification information on the redetection frame image data and also representing that the redetection frame image data is sequentially compression-encoded on the macro-block data D4 basis by forward predictive encoding, based on the read picture information.

In addition, the motion vector redetector 48 sequentially reads the redetection frame image data indicated by the redetection frame identification information specified by the motion vector redetection flag FG1 from the frame memory for inputting 32 on the second macro-block data D4 basis at this point and also reads the first or second frame image data D6 which is newly adjacent to the redetection frame image data on the forward side due to the exclusion, for reference purposes.

And as with the above-mentioned motion vector detector 35, while sequentially associating the second macro-block data D4 with plural pieces of block data for comparison within a predetermined search range of the first or second frame image data for reference D6 by the block matching method, the motion vector redetector 48 detects the approximate block data having the minimum predictive error, so as to detect the motion vector D17 of the second macro-block data D4 based on the motion amounts of the detected approximate block data and the second macro-block data D4.

Thus, the motion vector redetector 48 generates the predictive mode data D5 for the redetection frame image data, and when it detects the motion vector D17 of each piece of the second macro-block data D4 in the redetection frame image data, it associates the predictive mode data D5 with each motion vector D17 and sends them to the motion vector buffer 36 to accumulate them therein, so as to render the predictive mode data D5 and each motion vector D17 readable from the motion vector buffer 36 with the motion compensator 39 and the variable length coder 43.

In addition to it, when the motion vector redetector 48 accumulates the predictive mode data D5 and each motion vector D17 in the motion vector buffer 36, it renders the predictive mode data D5 and the motion vector D7 before the redetection for the redetection frame image data and the predictive mode data D5 and the motion vector D7 of the excluded frame image data unreadable from the motion vector buffer 36, based on the redetection frame identification information and the excluded frame identification information specified by the motion vector redetection flag FG.

In addition, when canceling the exclusion of the excluded frame image data by rising the frame rate of the motion picture data D1, the frame structure converter 33 generates the motion vector redetection flag FG2 representing the redetection frame identification information on the redetection frame image data of which the motion vector was redetected due to the exclusion of the exclusion frame image data and the excluded frame identification information on the excluded frame image data of which the exclusion is to be cancelled, and also representing the cancellation of the exclusion, and sends it to the motion vector redetector 48.

Thus, when the motion vector redetection flag FG2 is given from the frame structure converter 33, the motion vector redetector 48 renders the predictive mode data D5 and the motion vector D17 redetected for the redetection frame image data, unreadable from the motion vector buffer 36, and renders the predictive mode data D5 and the motion vector D7 for the redetection frame image data before the redetection and the predictive mode data D5 and the motion vector D7 of the excluded frame image data, readable, based on the redetection frame identification information and the exclusion cancellation frame identification information specified by the motion vector redetection flag FG2.

Thus, the motion vector redetector 48 is capable of adequately compression-encoding each piece of the first and second frame image data by using the motion vectors D7 and D17 even when the frame rate of the motion picture data D1 is changed.

Figure 6:
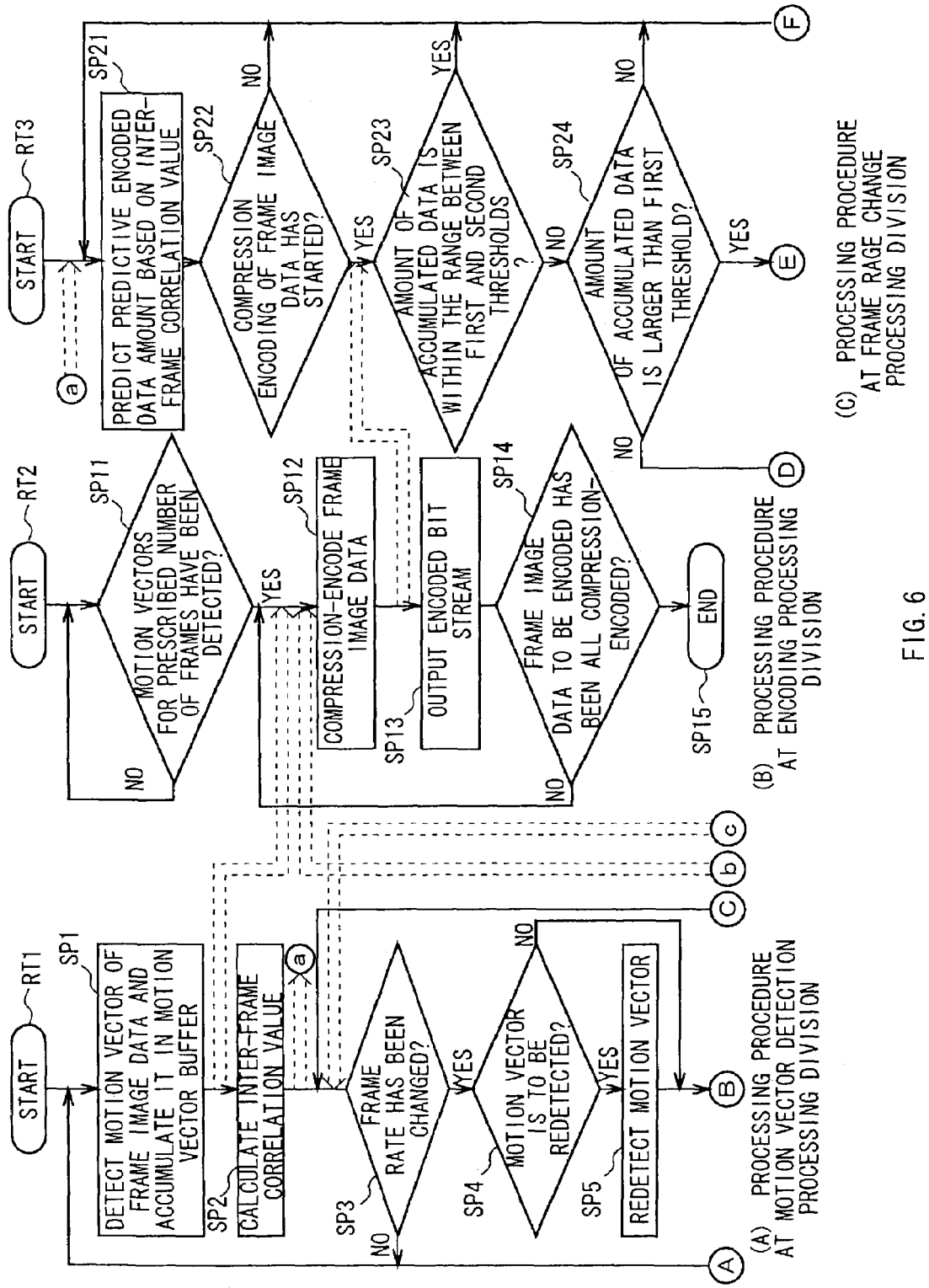
FIG. 6 is a flowchart showing a compression encoding procedure of the motion picture data.
Figure 7:
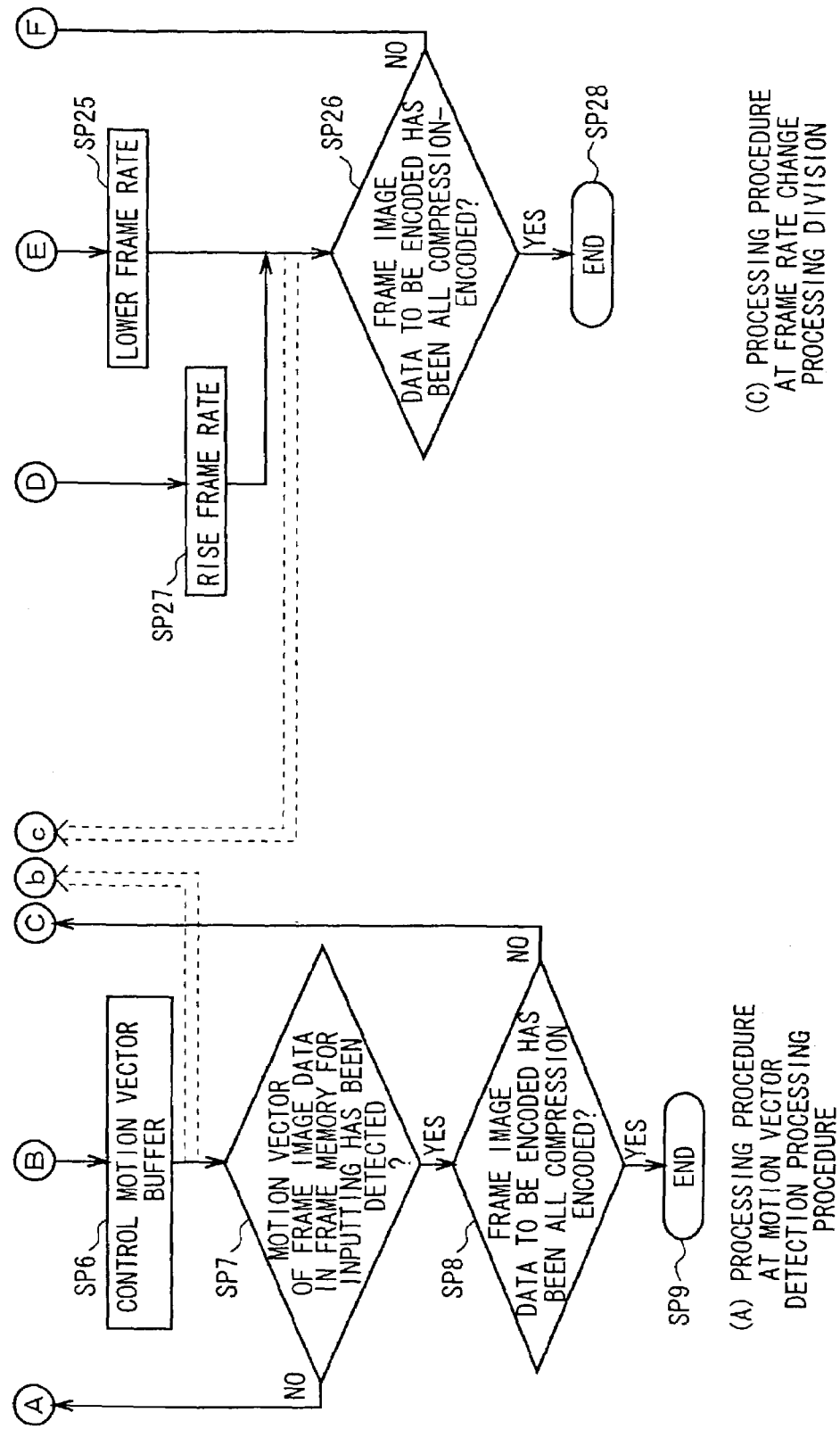
FIG. 7 is a flowchart showing the compression encoding procedure of the motion picture data.

Now, the compression encoding procedure of the motion picture data D1 by the frame rate change processing division 31, the motion vector detection processing division 34 and the compression encoding division 37 of the motion picture encoding apparatus 30 will be summarized. The motion vector detection processing division 34 enter the start step of a routine RT1 and moves on to step SP1 as shown in FIGS. 6(A) and 7(A).

In step SP1, in the motion vector detection processing division 34, the motion vector detector 35 sequentially reads the second frame image data from the frame memory for inputting 32 on the second macro-block data D4 basis, and also reads the first or second frame image data for reference D6 for the second frame image data, and then detects the motion vector D7 of each piece of the second macro-block data D4 by using the first or second frame image data for reference by the block matching method, and then accumulates the detected motion vectors D7 in the motion vector buffer 36 to detect the motion vector D7 of each piece of the second macro-block data D4 of one frame, and then moves on to step SP2.

In step SP2, in the motion vector detection processing division 34, the motion vector detector 35 uses the predictive error which was calculated when the motion vector D7 of each piece of the second macro-block data D4 is detected, in order to calculate the inter-frame correlation value SH1 between the second frame image data from which the second macro-block data D4 was extracted and the first or second frame image data for reference D6, and then sends the calculated inter-frame correlation value SH1 to the frame structure converter 33, and moves on to step SP3.

In step SP3, the motion vector detection processing division 34 uses the motion vector redetector 48 to determine whether the frame rate of the motion picture data D1 has been changed.

Obtaining a negative result in this step SP3 means that the compression-encoding of the first and second frame image data of the motion picture data D1 has not been started or that the first and second frame image data is being sequentially compression-encoded at the selected compressibility, and in this case, the motion vector detection processing division 34 returns to step SP1 without executing the redetection process of the motion vector by the motion vector redetector 48, and it repeats a processing loop of steps SP1–SP2–SP3 thereafter until the change in the frame rate of the motion picture data D1 is completed, so as to sequentially detect the motion vectors D7 of the second macro-block data D4 in the second frame image data, and also to calculate the inter-frame correlation value SH1 between the second frame image data and the first or second frame image data for reference D6.

In this case, as shown in FIG. 6(B), the compression encoding division 37 enters the start step of a routine RT2 and moves on to step SP11 where, for instance, the operator 38 waits for the motion vector D7 of each piece of the second macro-block data D4 for the second frame image data of the predetermined number of frames to be detected by the motion vector detection processing division 34 (the motion vector detector 35 in practice), and moves on to step S12 when the motion vector D7 of each piece of the second macro-block data D4 in the second frame image data of the predetermined number of frames is detected.

In step SP12, the compression encoding division 37 starts the compression encoding of the first and second frame image data in the frame memory for inputting 32, and once accumulates in the buffer 42 the encoded data D10 obtained by compression-encoding the first frame image data by the in-frame encoding with the operator 38, the discrete cosine transformer 40, the quantizer 41 and the variable length coder 43 or once accumulates in the buffer 42 the encoded data D14 obtained by compression-encoding the second frame image data by the forward predictive encoding with the motion vector D7 read from the motion vector buffer 36, and also reconstructs the compression-encoded first or second frame image data, for reference purposes in the motion compensation processing, in the frame memory for reference 47 with the dequantizer 44, the inverse-discrete cosine transformer 45, the adder 46 and the motion compensator 39, and then moves on to step SP13.

In step SP13, the compression encoding division 37 smoothes the encoded data amounts of the encoded data D10 and D14 once accumulated in the buffer 42 and thereby outputs the encoded data D10 and D14 as the encoded bit stream BS1 to the outside, and then moves on to step SP14.

In step SP14, the compression encoding division 37 determines according to a readout state of the first and second frame image data by the operator 38 from the frame memory for inputting 32 whether all of the first and second frame image data which was the subject of encoding has been compression-encoded, and if all the first and second frame image data which was the subject of encoding has not been compression-encoded, it returns to step SP12.

Then, the compression encoding division 37 repeats a processing loop of steps SP12–SP13–SP 14 thereafter until all the first and second frame image data which was the subject of encoding has been compression-encoded, to compression-encode the first frame image data which is the subject of encoding, by the in-frame encoding and also to compression-encode the second frame image data which is the subject of encoding, by the forward predictive encoding with the motion vectors D7 read from the motion vector buffer 36, and then to output the obtained encoded data D10 and D14 as the encoded bit stream BS1.

On the other hand, as shown in FIGS. 6(C) and 7(C), the frame rate change processing division 31 enters the start step of a routine RT3 and moves on to step SP21 where the frame structure converter 33 predicts the predictive encoded data amount of the first or second frame image data based on the inter-frame correlation value SH1 given from the motion vector detector 35, and then moves on to step SP22.

In step SP22, the frame rate change processing division 31 determines whether or not the compression encoding of the first and second frame image data has been started by the frame structure converter 33, and if the compression encoding of the first and second frame image data has not been started, it returns to step SP21.

Thus, the frame rate change processing division 31 repeats a processing loop of steps SP21–SP22 until the compression encoding of the first and second frame image data starts, so as to sequentially predict the predictive encoded data amount of the first and second frame image data.

And the frame rate change processing division 31 moves on to step SP23 when the compression encoding of the first and second frame image data starts in the compression encoding division 37 by sequentially reading the first and second frame image data on the first and second macro-block data D2 and D4 basis from the frame memory for inputting 32 by the operator 38.

In step SP23, the frame rate change processing division 31 detects the amount of accumulated data DR of the buffer 42 with the frame structure converter 33, and compares the detected amount of accumulated data DR to the first threshold and second threshold, so as to determine whether the amount of accumulated data DR is a value within the range from the first threshold to the second threshold.

Obtaining a positive result in this step SP23 means that the first or second frame image data following the first or second frame image data being compression-encoded at this point can be compression-encoded nearly at the selected compressibility, and in this case, the frame rate change processing division 31 returns to step SP21 without changing the frame rate of the motion picture data D1 with the frame structure converter 33, and repeats a processing loop of of steps SP21–SP22–SP23 until the motion picture data D1 needs to change its frame rate.

In addition, obtaining a negative result in step SP23 means that the amount of accumulated data DR is a value outside the range from the first threshold to the second threshold and so it is necessary to change the frame rate of the motion picture data D1, and in this case, the frame rate change processing division 31 moves on to step SP24.

In step SP24, the frame rate change processing division 31 determines with the frame structure converter 33 whether the amount of accumulated data DR is a value larger than the first threshold.

Obtaining a positive result in this step SP24 means that, as the amount of accumulated data DR is a value larger than the first threshold, the image quality of the motion picture may deteriorate due to compression-encoding the first or second frame image data following the first or second frame image data being compression-encoded at this point, at compressibility higher than the selected compressibility, and in this case, the frame rate change processing division 31 moves on to step SP25.

In step SP25, the frame rate change processing division 31 estimates the change in the amount of accumulated data DR with the frame structure converter 33 based on the predictive encoded data amount of the frame image data of the predetermined number of frames following the frame image data being compression-encoded at this point and the bit rate of the encoded bit stream BS1, and lowers the frame rate of the motion picture data D1 by excluding the frame image data based on the estimated amount of accumulated data DR and the first and second thresholds and sends the motion vector redetection flag FG1 to the motion vector redetector 48, and then moves on to step SP26.

Obtaining a negative result in step SP24, on the contrary, means that, although the frame rate is lowered by excluding the second frame image data from the motion picture data D1, the amount of accumulated data DR is a value smaller than the second threshold and so the desired image quality for the motion picture can be maintained even if the second frame image data is increased, and in this case, the frame rate change processing division 31 moves on to step SP27.

In step SP27, the frame rate change processing division 31 estimates the change in the amount of accumulated data DR of the time when the exclusion of the excluded frame image data is canceled, with the frame structure converter 33, based on the predictive encoded data amounts of the frame image data of the predetermined number of frames following the frame image data being compression-encoded at this point and of the frame image data already excluded from the frame image data of the predetermined number of frames and the bit rate of the encoded bit stream BS1.

Then, the frame rate change processing division 31 cancels the exclusion of the frame image data already excluded, based on the estimated amounts of accumulated data DR and the first and second thresholds and thereby increases the lowered frame rate so as not to exceed a prescribed frame rate and sends the motion vector redetection flag FG2 to the motion vector redetector 48, and then moves on to step SP26.

In step SP26, the frame rate change processing division 31 uses the frame structure converter 33 to determine according to the readout state of the first and second frame image data from the frame memory 32 by the operator 38 whether all of the first and second frame image data which was the subject of encoding has been compression-encoded, and if all the first and second frame image data which was the subject of encoding has not been compression-encoded, it returns to step SP21.

Thus, the frame rate change processing division 31 repeats a processing loop of steps SP21–SP22–SP23–SP24–SP25–SP26 thereafter until all the first and second frame image data which is the subject of encoding is compression-encoded, so as to change the frame rate of the motion picture data D1 as appropriate while sequentially predicting the predictive encoded data amount of the first and second frame image data.

At this time, in step SP3, the motion vector detection processing division 34 uses the motion vector detector 48 to determine based on the motion vector redetection flags FG1 and FG2 given from the frame structure converter 33 that the frame rate of the motion picture data D1 has been changed, and then moves on to step SP4.

In step SP4, the motion vector detection processing division 34 determines with the motion vector redetector 48 whether it is necessary to redetect the motion vector D17 in conjunction with the change in the frame rate of the motion picture data D1.

Obtaining a positive result in this step SP4 means that the motion vector D17 of each piece of the second macro-block data D4 of the redetection frame image data adjacent to the excluded second frame image data is to be redetected based on the motion vector redetection flag FG1 given from the frame structure converter 3 because the frame rate of the motion picture data D1 has been lowered, and in this case, the motion vector detection processing division 34 moves on to step SP5 to redetect the motion vector D17 of each piece of the second macro-block data D4 in the redetection frame image data with the motion vector redetector 48, and then moves on to step SP6.

And in step SP6, the motion vector detection processing division 34 uses the motion vector redetector 48 to once accumulate the motion vector D17 redetected by controlling the motion vector buffer 36 based on the motion vector redetection flag FG1, and also to render unreadable the motion vectors D7 before the redetection for the redetection frame image data and the motion vectors D7 of the excluded frame image data, and then moves on to step SP7.

Obtaining a negative result in step SP4, on the contrary, means that it is not necessary to redetect the motion vector D17 because the frame rate of the motion picture data D1 has been increased, and in this case, the motion vector detection processing division 34 moves on to step SP6.

And in step SP6, the motion vector detection processing division 34 uses the motion vector redtector 48 to control the motion vector buffer 36 based on the motion vector redetection flag FG2 given from the frame structure converter 3 so as to render unreadable the motion vectors D17 redetected for the redetection frame image data and to render readable the motion vectors D7 before the redetection for the redetection frame image data and the motion vectors D7 of the excluded frame image data to cancel the exclusion, and then moves on to step SP7.

In step SP7, the motion vector detection processing division 34 determines whether the motion vectors of the first and second macro-block data D2 and D4 in all the first and second frame image data in the frame memory for inputting 32 have been detected by the motion vector detector 35, and if the motion vectors of the first and second macro-block data D2 and D4 in all the fist and second frame image data in the frame memory for inputting 32 have not been detected, it returns to step SP1.

Thus, while the first and second frame image data for detecting the motion vectors of the first and second macro-block data D2 and D4 are stored in the frame memory for inputting 32, the motion vector detection processing division 34 repeats a processing loop of steps SP1–SP2–SP3–SP4–SP5–SP6–SP7 and thereby sequentially detects the motion vectors D7 of the first and second macro-block data D2 and D4 in the first and second frame image data in the frame memory for inputting 32 and also redetects as appropriate the motion vector D17 of each piece of the second macro-block data D4 in the redetection frame image data.

And in step SP7, the motion vector detection processing division 34 detects the motion vectors D7 of the first and second macro-block data D2 and D4 in all the first and second frame image data in the frame memory for inputting 32, and then moves on to step SP8.

In step SP8, the motion vector detection processing division 14 determines according to the readout state of the motion vectors D7 and D17 by the motion compensator 39 from the motion vector buffer 36 whether all of the first and second frame image data which is the subject of encoding has been compression-encoded, and if the compression encoding of the first and second frame image data has not been finished, it returns to step SP3.

Therefore, the motion vector detection processing division 34 repeats a processing loop of steps SP3–SP4–SP5–SP6–SP7–SP8 thereafter until all the first and second frame image data which is the subject of encoding has bean compression-encoded, so as to redetect as appropriate the motion vector D17 of each piece of the second macro-block data D4 in the redetection frame image data.

Thus, the compression encoding division 37 repeats a processing loop of steps SP12–SP13–SP14 until all of the first and second frame image data which is the subject of encoding is compression-encoded, but when the motion vector D17 is redetected for the redetection frame image data due to lowering the frame rate of the motion picture data D1, it compression-encodes the second frame image data which is the subject of encoding, by the forward predictive encoding by using the motion vector D17 read from the motion vector buffer 36.

And when the compression encoding division 37 determines in step SP14 that all of the first and second frame image data which is the subject of encoding has been compression-encoded, it moves on to step SP15 to finish the procedure in the compression encoding division 37.

In addition, when the compression encoding division 37 thus finishes the processing procedure, the frame rate change processing division 31 determines in step SP26 that all of the first and second frame image data which was the subject of encoding has been compression-encoded and moves on to step SP28 to finish the processing procedure at the frame rate change processing division 31, and the motion vector detection processing division 34 also determines in step SP8 that all of the first and second frame image data which was the subject of encoding has been compression-encoded and moves on to step SP9 to finish the processing procedure at the motion vector detection processing division 34, and thus the compression encoding procedure of the motion picture data D1 in the motion picture encoding apparatus 30 is completed.

In the above configuration, the motion picture encoding apparatus 30 sequentially captures the motion picture data D1 supplied from the outside, into the frame memory for inputting 32 on the frame image data basis, and assigns the I-picture or the P-picture to the frame image data captured into the frame memory for inputting 32 in a predetermined order.

And in the motion picture encoding apparatus 30, the motion vector detector 35 sequentially reads the second frame image data in the frame memory for inputting 32 on the second macro-block data D4 basis, in order to detect the motion vector D7 of each piece of the second macro-block data D4 read.

And in this state, in the motion picture encoding apparatus 30, the compression encoding division 37 sequentially reads the first frame image data from the frame memory for inputting 32 on the first macro-block data D2 basis and compression-encodes it by the in-frame encoding, and once accumulates the obtained encoded data D10 in the buffer 42 and also, sequentially reads the second frame image data from the frame memory for inputting 32 on the second macro-block data D4 basis and compression-encodes it by the forward predictive encoding using the corresponding motion vector D7, and once accumulates the obtained encoded data D14 in the buffer 42, and then outputs the encoded data D10 and D14 as the encoded bit stream BS1 from the buffer 42 to the outside.

Thus, in the motion picture encoding apparatus 30, upon starting the compression encoding of the first and second frame image data composing the motion picture data D1, the frame structure converter 33 periodically detects the amount of accumulated data DR of the buffer 42 to compare it to the first and second thresholds, and it changes the frame rate of the motion picture data D1 according to the amount of accumulated data, in such a way that the frame rate of the motion picture data D1 is lowered when the amount of accumulated data DR is larger than the first threshold and the frame rate of the motion picture data D1 is risen when the amount of accumulated data DR of the buffer 42 is smaller than the second threshold in a situation where the frame rate is thus low.

Accordingly, even if the encoded data amount obtained from the first and second frame image data increases due to the abrupt change in the picture of the motion picture based on the motion picture data D1 which is to be distributed, the motion picture encoding apparatus 30 reduces the number of the second frame image data to be compression-encoded per unit time by lowering the frame rate of the motion picture data D1 to adequately cope with that situation, so that it can be prevented that the increased amount of accumulated data DR is kept and thereby the compressibility abruptly rises, thus making it possible to prevent abrupt degradation of the image quality of the motion picture.

And even if the encoded data amount obtained from the first and second frame image data decreases due to abrupt decrease in the change in the picture of the motion picture based on the motion picture data D1 in a state where the frame rate of the motion picture data D1 to be distributed is low, or due to other reasons, the motion picture encoding apparatus 30 increases the number of pieces of the second frame image data to be compression-encoded per unit time by rising the frame rate of the motion picture data D1, so that it can be prevented that the amount of accumulated data DR remains decreased due to the excessive exclusion of the second frame image data of the motion picture data D1 and thereby the compressibility becomes relatively low, thus the image quality of the motion picture can be prevented from varying due to temporarily becoming higher than desired image quality.

Thus, the motion picture encoding apparatus 30 can stabilize the image quality of the motion picture to be provided to users because it appropriately changes the frame rate according to the amount of accumulated data DR of the buffer 42 representing the encoded data amounts of the encoded data D10 and D14 while compression-encoding the motion picture data D1.

In addition, when the amount of accumulated data DR is a value higher than the first threshold, the motion picture encoding apparatus 30 uses the predictive encoded data amount of the first and/or second frame image data of the predetermined number of frames which becomes the subject of encoding from this point, to lower the frame rate of the motion picture data D1 by excluding one or plural pieces of the second frame image data from the first and/or second frame image data of the predetermined number of frames, so that even when the picture in the motion picture based on the motion picture data D1 moves rather hard over the plurality of frames, the compressibility can be prevented from becoming relatively high over the plurality of frames, thus making it possible to previously prevent the image quality of the motion picture from deteriorating over the plurality of frames.

In addition, even when the amount of accumulated data DR is a value smaller than the second threshold, the motion picture encoding apparatus 30 uses the predictive encoded data amounts of the first and/or second frame image data of the predetermined number of frames which becomes the subject of encoding from this point and one or plural pieces of the second frame image data already excluded from the first and/or second frame image data of the predetermined number of frames, to rise the frame rate of the motion picture data D1, so that even when the change in the picture of the motion picture based on the motion picture data D1 is relatively stable over the plurality of frames, the compressibility can be previously prevented from becoming relatively low over the plurality of frames, thus it can be previously prevented that the image quality of the motion picture becomes higher than desired image quality over the plurality of frames and thereby changes abruptly.

And while the motion picture encoding apparatus 30 thus prevents the image quality of the motion picture from varying over the plurality of frames by using the encoded data amount of the first and second frame image data of the predetermined number of frames for changing the frame rate of the motion picture data D1, it sequentially detects the amount of accumulated data DR and monitors the state of the compression encoding while compression-encoding the first and second frame image data in the state where the frame rate has been changed in the above way, so that even when the predictive encoded data amount is different from the encoded data amount which has been actually compression-encoded because of low accuracy for predicting the predictive encoded data amount, for example, the frame rate which was changed once can be easily and adequately corrected according to the desired image quality of the motion picture.

According to the above configuration, the motion picture data D1 supplied from the outside is sequentially compression-encoded on the first and second frame image data basis, and the amount of the accumulated data DR of the buffer 42 is periodically detected and the frame rate of the motion picture data D1 is changed according to the change in the amount of the accumulated data DR while the obtained encoded data D10 and D14 are accumulated once in the butter 42 and outputted to the outside as the encoded bit stream BS1 of which the encoded data amount has been smoothed, so that it is possible to realize the motion picture encoding apparatus capable of adequately changing the number of pieces of the first and second frame image data to be compression-encoded per unit time according to the change in the picture of the motion picture based on the motion picture data D1 to be distributed and thereby stabilizing the compressibility, consequently stabilizing the image quality of the motion picture and thus adequately providing the motion picture of the desired image quality.

Figure 8:
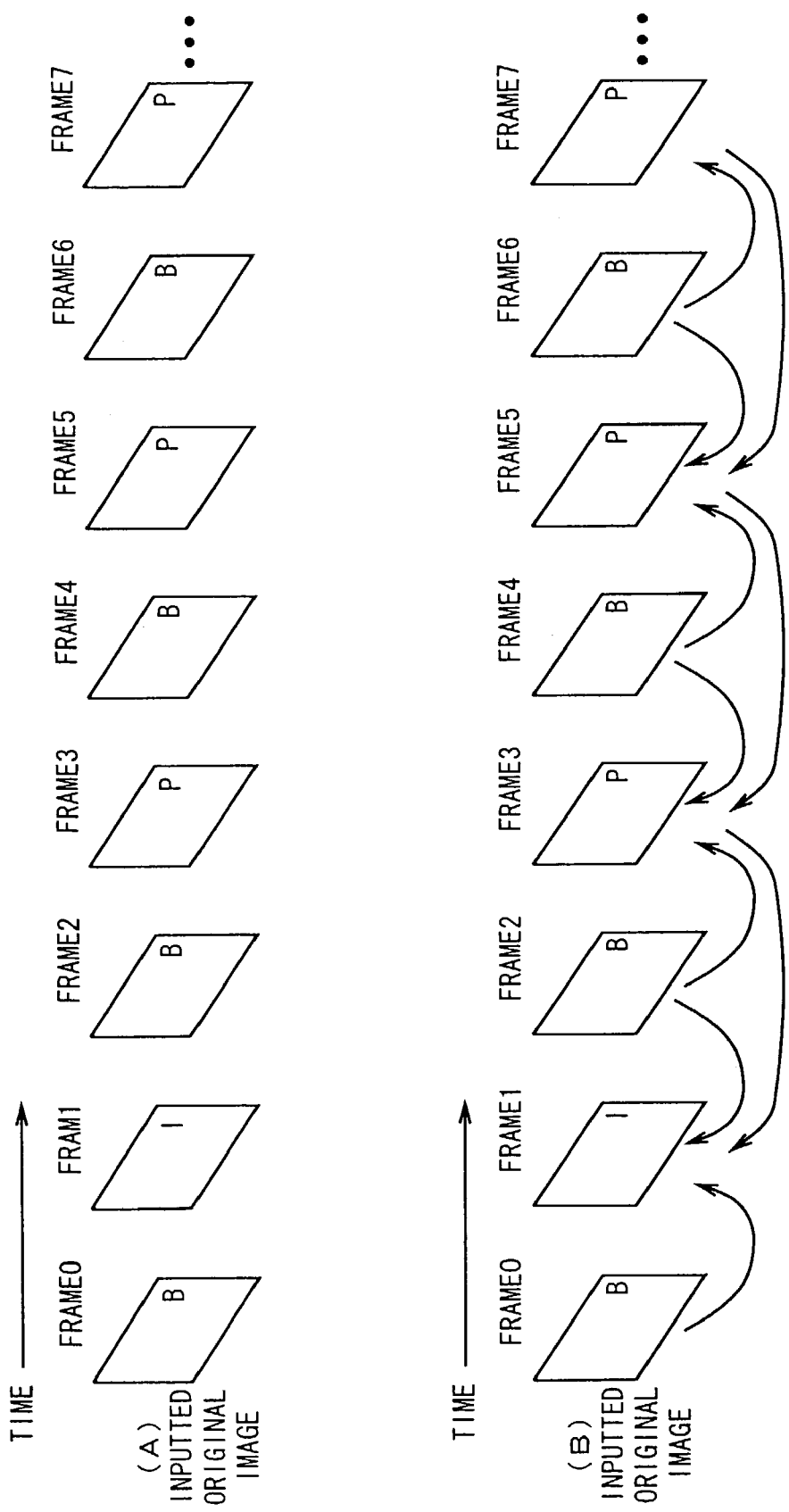
FIG. 8 is a schematic diagram showing I-pictures, P-pictures and B-pictures assigned to the frame image data of the motion picture data.

Note that, the above-mentioned first embodiment described the case where, as mentioned above for FIG. 3, the motion picture data D1 supplied from the outside is sequentially captured into the frame memory for inputting 32 on the frame image data basis, and the I-picture and the P-picture are sequentially assigned to the frame image data captured in the frame memory for inputting 32 in the predetermined order. The present invention is not limited thereto and also the I-picture, the P-picture and the B-picture can be assigned to the frame image data sequentially captured into the frame memory for inputting 32 as shown in FIGS. 8(A) and (B).

Incidentally, when the I-picture, the P-picture and the B-picture are used as the picture types, if the B-picture, I-picture, B-picture, P-picture, B-picture, P-picture, B-picture, P-picture, . . . , are sequentially assigned starting with the leading frame image data, for instance, the leading frame image data to which the B-picture is assigned (hereafter, referred to as third frame image data) is compression-encoded by backward predictive encoding by using the first frame image data of the second frame as reference, and the third frame image data after the second frame can be compression-encoded by bidirectional predictive encoding which uses the first or second frame image data adjacent on the forward side as reference and also uses the first or second frame image data adjacent on the backward side as reference.

In addition, the second frame image data can be compression-encoded by the forward predictive encoding which uses the first or second frame image data which is the closest on the forward side, as reference.

Figure 9:
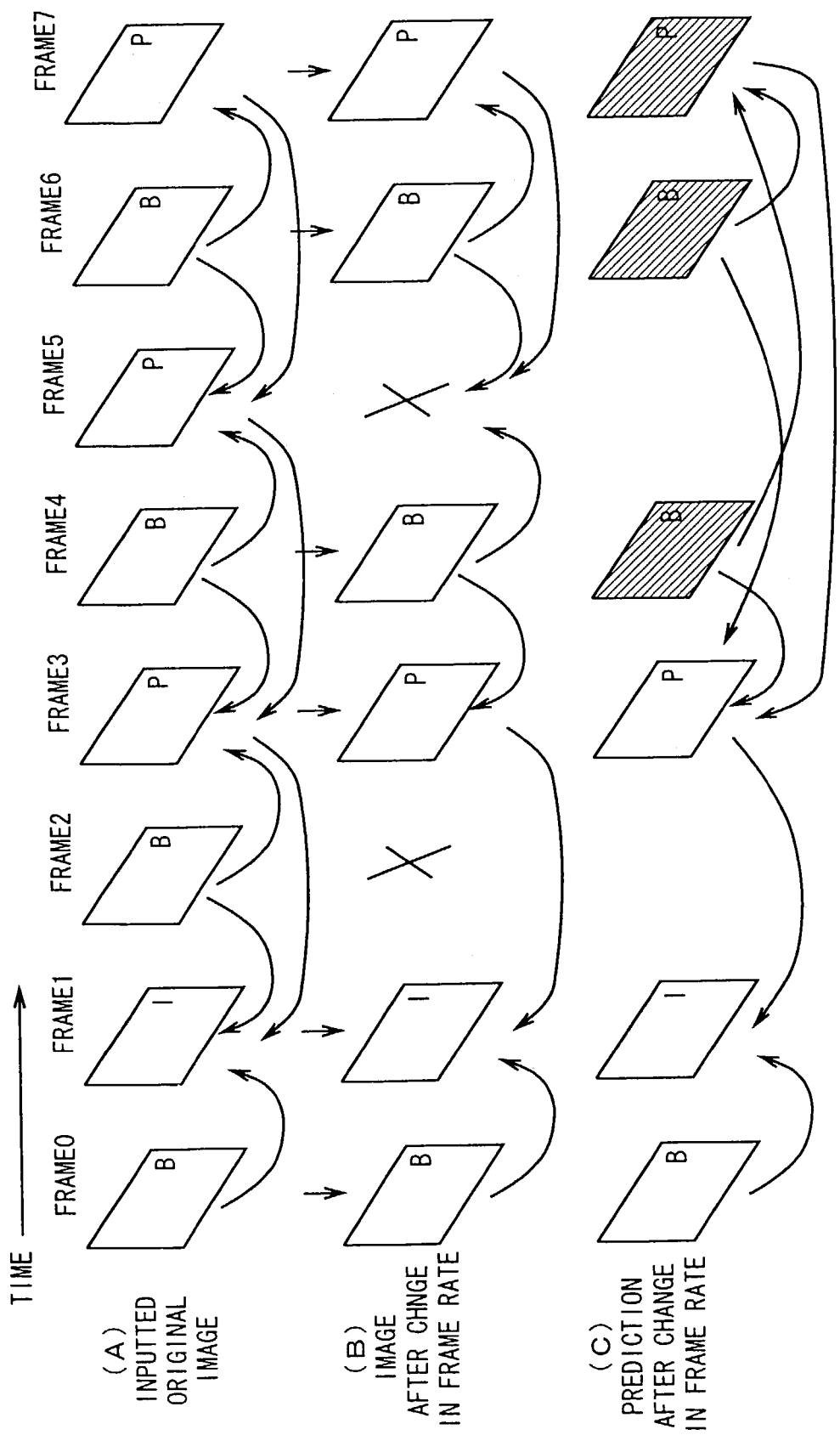
FIG. 9 is a schematic diagram explaining the redetection of a motion vector when the frame rate of the motion picture data is changed.

And as shown in FIGS. 9(A) to (C), if the frame rate of the motion picture data D1 is changed by excluding, for instance, the third frame image data of the third frame and the second frame image data of the fifth frame in a state where the I-picture, the P-picture and the B-picture are assigned to the frame image data in the frame memory for inputting 32, the third frame image data of the third frame is not used as reference for the first and second frame image data on the forward side and on the backward side, so that it is not necessary to redetect the motion vector of each piece of the first and second macro-block data of the first and second frame image data on the forward side and on the backward side due to the exclusion.

As opposed to this, the second frame image data of the fifth frame is used as reference for the third frame image data on the forward side (fourth frame) and the third and second frame image data on the backward side (sixth and seventh frames).

Therefore, according to the exclusion, as for the third frame image data of the fourth frame, the second frame image data of the seventh frame on the backward side may be used as reference to redetect the motion vector of each piece of the macro-block data on the backward side, and as for the third frame image data of the sixth frame, the second frame image data of the third frame on the forward side may be used as reference to detect the motion vector of each piece of the macro-block data on the forward side, and furthermore, as for the second frame image data of the seventh frame, the second frame image data of the third frame on the forward side may be used to detect the motion vector of each piece of the second macro-block data on the forward side.

In addition, the above-mentioned first embodiment has described the case where the motion vector redetector 48 redetects the motion vector D17 of each piece of the second macro-block data D4 of the redetection frame image data by the block matching method when the second frame image data is excluded in order to lower the frame rate of the motion picture data D1. The present invention is not limited thereto, but after the previously detected motion vector D7 of each piece of the second macro-block data D4 in the redetection frame image data is synthesized with the motion vector of each piece of the second macro-block data D4 of the excluded frame image data adjacent to the redetection frame image data, the motion vector of each piece of the second macro-block data D4 in the redetection frame image data may be redetected, or the motion vector may be redetected by using a simple motion vector detection method such as a telescopic search method, so as to significantly reduce the amount of operation of the redetection process of the motion vector in the motion vector redetector and thus speed up the redetection process.

Furthermore, the above-mentioned first embodiment has described the case where each piece of the second macro-block data D4 of the second frame image data is compression-encoded by the forward predictive encoding. The present invention is not limited thereto and the compression-encoding may be performed by one of the in-frame encoding and the forward predictive encoding by using the distribution value of each piece of the second macro-block data D4.

Furthermore, the above-mentioned first embodiment has described the case where the motion vector D17 of each piece of the second macro-block data D4 is redetected by using the first and second frame image data for reference D6 read from the frame memory for inputting 32 by the motion vector redetector 48. The present invention is not limited thereto and the motion vector redetector may read the first and second frame image data for reference from the frame memory for reference 47 so as to redetect the motion vector D17 of each piece of the second macro-block data D4. By doing the above, the motion vector D17 can be redetected by using the first and second frame image data having a block noise and so on generated by the compression encoding in the processes of the compression-encoding, decoding and then reconstructing, so that accuracy for detecting the motion vector D17 can be improved.

Furthermore, the above-mentioned first embodiment has described the case where the frame rate of the motion picture data D1 is changed according to the amount of accumulated data DR of the buffer 42 and the predictive encoded data amount. The present invention is not limited thereto and the frame rate of the motion picture data D1 may be changed according to the amount of accumulated data DR of the buffer 42. Even the frame rate is changed in this way, it is also possible to adequately cope with abrupt increase and decrease in the amount of accumulated data DR and thereby stabilize the image quality of the motion picture.

(3) SECOND EMBODIMENT

Figure 10:
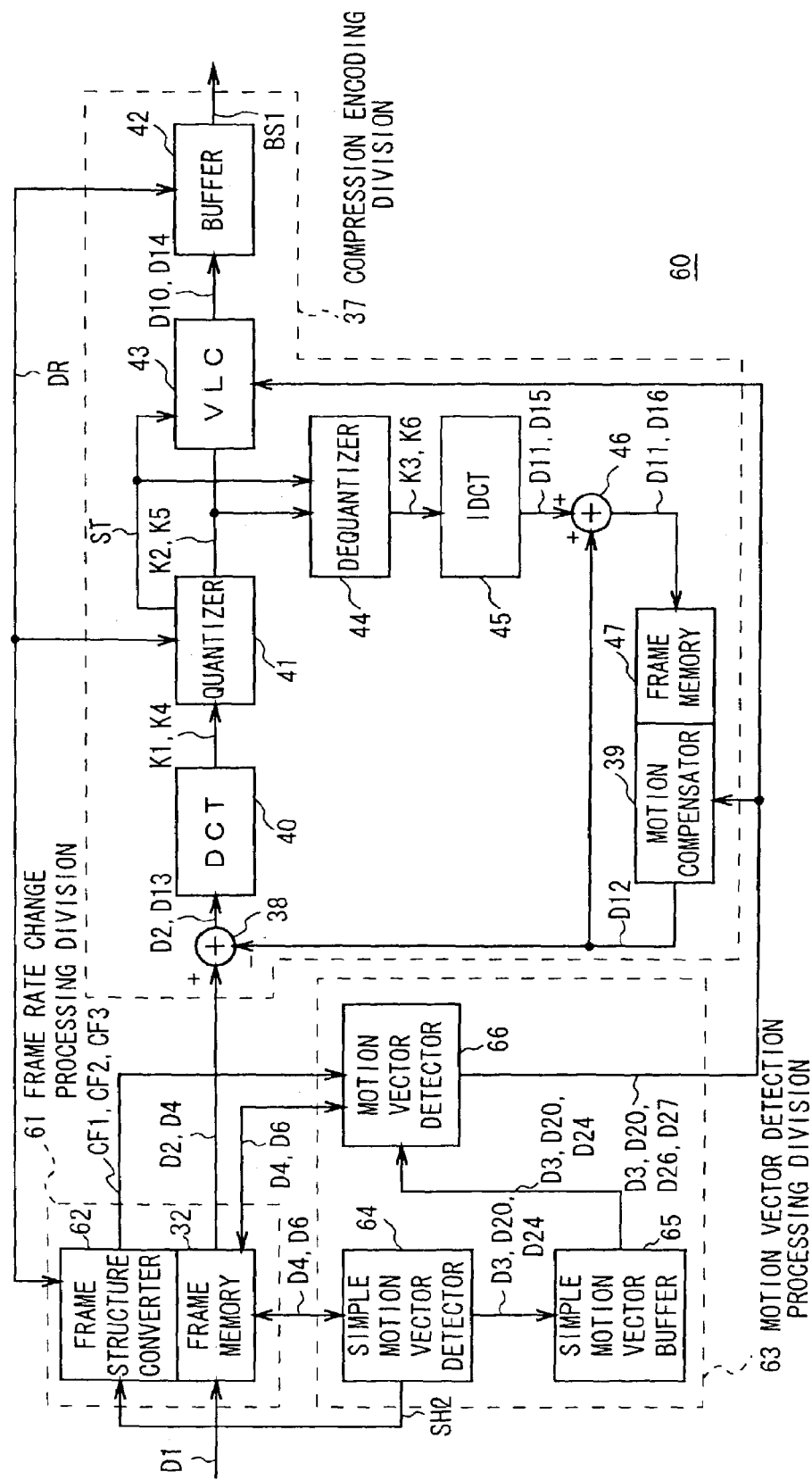
FIG. 10 is a block diagram showing the circuit construction of the motion picture encoding apparatus according to a second embodiment.

FIG. 10 in which the same reference numerals are applied to parts corresponding to those in FIG. 2 shows a motion picture encoding apparatus 60 according to a second embodiment, which is constructed in the same way as the motion picture encoding apparatus 30 according to the first embodiment, except the constructions of a frame structure converter 62 of a frame rate change processing division 61 and a motion vector detection processing division 63.

As in the case mentioned above about FIG. 3, every time the frame image data is captured into the frame memory for inputting 32, the frame structure converter 62 of the frame rate change processing division 61 assigns the picture types, the I-picture and the P-picture, to the captured frame image data and also records in the frame memory for inputting 32 the picture types each representing the I-picture or the P-picture and the frame identification information unique to the frame image data to which the picture types are assigned, as picture information.

And in the motion vector detection processing division 63, when the I-picture is assigned to the frame image data in the frame memory for inputting 32, a simple motion vector detector 64 reads the picture information on the first frame image data to which the I-picture has been assigned and generates predictive mode data D3 based on the read picture information, and then sends the generated predictive mode data D3 to a simple motion vector buffer 65 to accumulate it therein.

In addition, when the P-picture is assigned to the frame image data in the frame memory for inputting 32, the simple motion vector detector 64 reads the picture information on the second frame image data to which the P-picture has been assigned and also reads the picture information on the first or second frame image data for reference D6 adjacent to the second frame image data on the forward side.

The simple motion vector detector 64 generates predictive mode data D20 representing the frame identification information on the corresponding second frame image data which is the subject of encoding as frame-to-be-encoded information and representing the frame identification information on the first or second frame image data for reference D6 as reference frame identification information, based on the picture information, and further representing that the second frame image data which is the subject of encoding is sequentially compression-encoded by the forward predictive encoding on the second macro-block data D4 basis.

In addition, at this time, the simple motion vector detector 64 sequentially reads the second frame image data which is the subject of encoding, on the second macro-block data D4 basis from the frame memory for inputting 32 based on the picture information, and also reads the first or second frame image data for reference D6.

As shown in FIGS. 11(A) and (B), assuming that the original image is in the highest layer (hereinafter, referred to as the first layer) and an image of which the resolution is deteriorated by reducing the original image is an image in a lower layer than the original image, the simple motion vector detector 64 detects a simple motion vector of the second macro-block data D4 with lowered detection accuracy by a hierarchical search motion vector detection method which uses images in these different layers stepwise to detect the final motion vector of the original image level.

That is, the simple motion vector detector 64 generates hierarchical second macro-block data (hereinafter, referred to as hierarchical macro-block data) D21 by reducing the second macro-block data D4 to quarter or so, for example, and thereby lowering its resolution, and likewise generates hierarchical first or second frame image data for reference (hereafter, referred to as hierarchical frame image data) D22 by reducing the first or second frame image data for reference D6 to quarter or so, for example, and thereby lowering its resolution, in a second layer which is lower than the first layer of the original image level, with the hierarchical search motion vector detection method.

Figure 12:
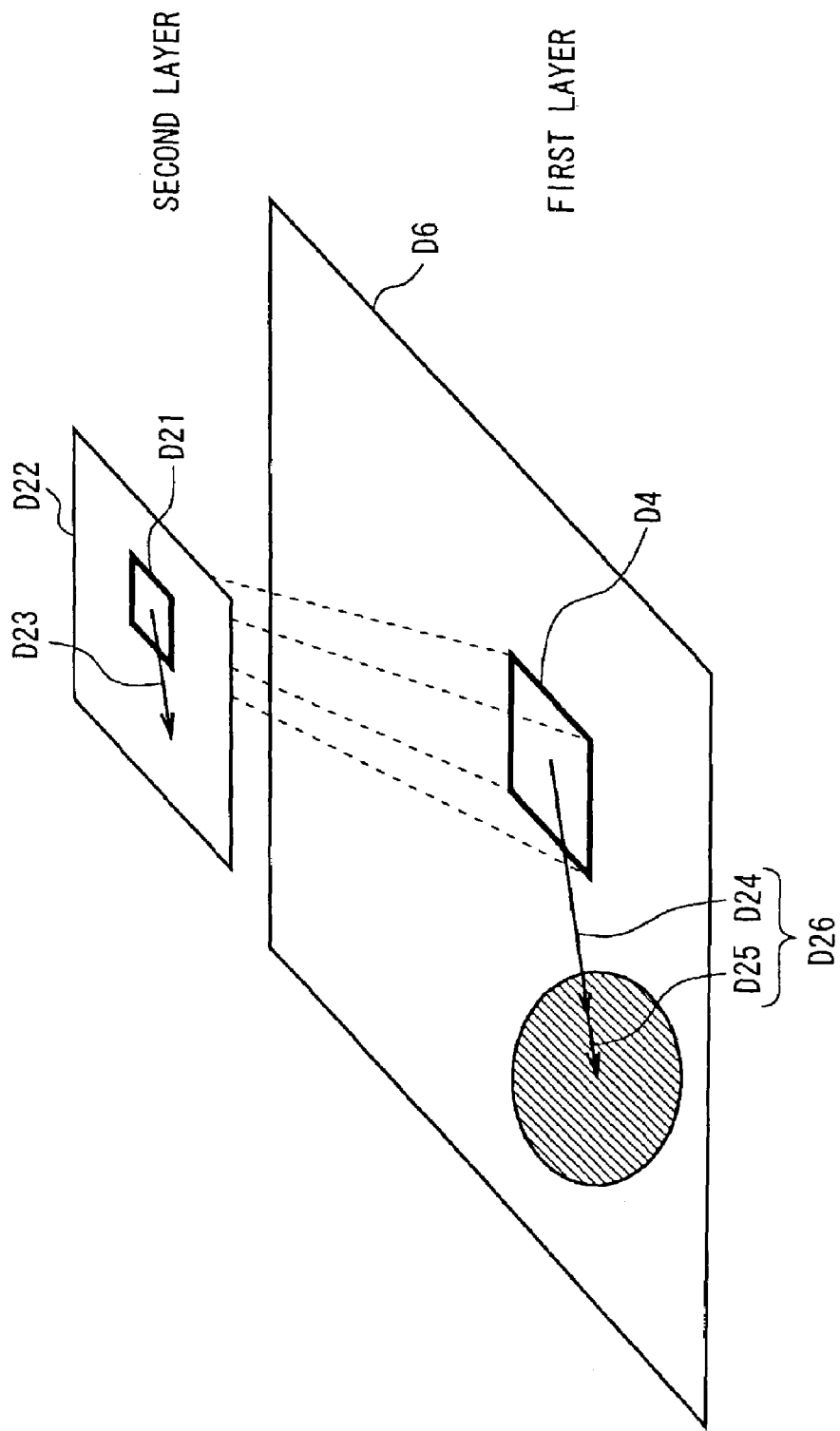
FIG. 12 is a schematic diagram explaining a hierarchical search motion vector detection method.

In addition, as shown in FIG. 12, the simple motion vector detector 64 detects the motion vector (hereafter, referred to as low resolution motion vector) D23 of the hierarchical macro-block data D21 based on the motion amount of the block data for comparison and the hierarchical macro-block data D21 which were used when the minimum predictive error was calculated, out of the predictive errors calculated by sequentially associating the hierarchical macro-block data D21 with plural pieces of block data for comparison in a relatively wide search range of the hierarchical frame image data D22 by the block matching method.

Further, the simple motion vector detector 64 detects a simple motion vector D24 of the second layer for the second macro-block data D4 by enlarging the low resolution motion vector D23 by four times, for instance, so as to match with the resolution of the second macro-block data D4 (that is, the resolution of the original image).

And the simple motion vector detector 64 associates the predictive mode data D20 for the second frame image data which is the subject of encoding in the frame memory for inputting 32 with the simple motion vector D24 of each piece of the second macro-block data D4, and then sends them to the simple motion vector buffer 65 to accumulate them therein.

Thus, every time the frame image data is sequentially captured into the frame memory for inputting 32 and the I-picture and the P-picture are assigned thereto, the simple motion vector detector 64 generates the predictive mode data D3 and D20 and also detects the simple motion vector D24 of each piece of the second macro-block data D4, and then accumulates them in the simple motion vector buffer 65.

In addition, every time the simple motion vector D24 of each piece of the second macro-block data D4 of one frame is detected, the simple motion vector detector 64 utilizes the predictive error calculated by using the hierarchical macro-block data D21 and the hierarchical frame image data D22 in order to calculate an inter-frame correlation value SH2 between the hierarchical second frame image data which is the subject of encoding (that is, second frame image data created by the hierarchical macro-block data D21) and the hierarchical frame image data for reference, and sends the calculated inter-frame correlation value SH2 to the frame structure converter 62.

Thus, the frame structure converter 62 predicts the predictive encoded data amount of the encoded data D10 and D14 which is obtained in a case of compression-encoding the first and second frame image data which is the subject of encoding at the selected compressibility, based on the inter-frame correlation value SH2 given from the simple motion vector detector 64.

Thus, the simple motion vector detector 64 utilizes the predictive error between the hierarchical macro-block data D21 and the hierarchical frame image data providing server data D22 each of which has the reduced number of pixels as compared with the original image, to calculate the inter-frame correlation value SH2, which can significantly reduce the amount of operation for the inter-frame correlation value SH2.

In addition, the frame structure converter 62 also calculates the predictive encoded data amount based on the inter-frame correlation value SH2 having the amount of information less than the inter-frame correlation value SH1 (FIG. 2) of the original image level, which can significantly reduce the amount of operation for calculating the predictive encoded data amount.

And when the compression encoding of the first and second frame image data which is the subject of encoding starts, the frame structure converter 62 detects the amount of accumulated data DR of the buffer 42 at predetermined intervals in the same way as described above about FIG. 2, and changes the frame rate of the motion picture data D1 according to the detected amount of accumulated data DR.

In addition, after the compression encoding of the first and second frame image data which is the subject of encoding starts, the frame structure converter 62 creates a control flag CF1 representing the frame identification information on the first frame image data as the frame-to-encoded information, based on the corresponding picture information in the frame memory for inputting 32, when the operator 38 reads the first frame image data which is the subject of encoding on the first macro-block data D2 basis from the frame memory for inputting 32, and then sends the flag CF1 to the motion vector detector 66.

Furthermore, when the operator 38 reads the second frame image data which is the subject of encoding from the frame memory for inputting 32 on the second macro-block data D4 basis, the frame structure converter 62 creates a control flag CF2 representing the frame identification information on the second frame image data which is the subject of encoding as the frame-to-be-encoded identification information and representing the frame identification information on the first or second frame image data for reference D6 as the reference frame identification information, based on the corresponding picture information and the picture information on the first or second frame image data for reference D6 for the second frame image data in the frame memory for inputting 32, and sends it to the motion vector detector 66.

Now, unless the first or second frame image data for reference which was used in detecting the simple motion vector D24 of the second frame image data which is the subject of encoding was excluded for the sake of changing the frame rate (including cancellation of the exclusion), the frame structure converter 62 creates the control flag CF2 by associating the second frame image data which is the subject of encoding with the first or second frame image data for reference D6 thereof as they are.

In addition, when the first or second frame image data for reference D6 used in detecting the simple motion vector D24 of the second frame image data which is the subject of encoding was excluded for the sake of changing the frame rate, the frame structure converter 62 creates the control flag CF2 by associating the second frame image data which is the subject of encoding with new first or second frame image data D6 for reference purposes instead of the excluded first or second frame image data.

Furthermore, when the operator 38 does not perform readout from the frame memory for inputting 32 by excluding the second frame image data which is the subject of encoding in conjunction with the change in the frame rate of the motion picture data D1, the frame structure converter 62 creates a control flag CF3, which represents the frame identification information on the second frame image data as the excluded frame identification information and represents that the second frame image data has been excluded, and sends it to the motion vector detector 66.

Thus, the frame structure converter 62 sequentially creates the control flags CF1, CF2 and CF3 in an order of compression-encoding of the first and second frame image data which is the subject of encoding, and sends them to the motion vector detector 66.

When the compression encoding of the first and second frame image data which is the subject of encoding starts, the motion vector detector 66 sequentially reads the predictive mode data D3 and D20 from the simple motion vector buffer 65 in the order of compression-encoding of the first and second frame image data which is the subject of encoding.

And every time the predictive mode data D3 and D20 is read from the simple motion vector buffer 65, the motion vector detector 66 compares the frame-to-be-encoded identification information and the reference frame identification information obtained based on the predictive mode data D3 and D20 with the frame-to-be-encoded identification information, the reference frame identification information and the excluded frame identification information obtained based on the corresponding control flags CF1, CF2 and CF3 given from the frame structure converter 62 at this time.

In this case, when the predictive mode data D3 for the first frame image data is read from the simple motion vector buffer 65, the motion vector detector 66 determines that the first frame image data is excluded from the subjects of exclusion as mentioned above as to FIGS. 5(A) and (C), and the first frame image data has not been excluded because the frame-to-be-encoded identification information obtained based on the predictive mode data D3 and the control flag CF1 match, and then sends the predictive mode data D3 to the motion compensator 39 and the variable length coder 43.

In addition, the motion vector detector 66 determines that, at the time of reading the predictive mode data D20 for the second frame image data from the simple motion vector buffer 65, the second frame image data and the first or second frame image data for reference D6 associated therewith on the detection of the simple motion vector D24 have not been excluded if the frame-to-be-encoded identification information and the reference frame identification information obtained based on the predictive mode data D20 and the corresponding control flag CF2 match, and then reads the simple motion vector D24 associated with the predictive mode data D20 from the simple motion vector buffer 65.

At this time, the motion vector detector 66 sequentially reads the second frame image data which is the subject of encoding, from the frame memory for inputting 32 on the second macro-block data D4 basis based on the control flag CF2, and also reads the first or second frame image data for reference D6.

And as shown in FIG. 12, the motion vector detector 66 sets a significantly narrow search range for the first or second frame image data for reference D6 around an end-point of the simple motion vector D24 by the block matching method, in the first layer according to the hierarchical search motion vector detection method, and calculates the predictive errors by sequentially associating plural pieces of the block data for comparison with the second macro-block data D4 in the search range.

As a result of this, the motion vector detector 66 detects a motion vector (hereafter, referred to as a motion vector for correction) D25 for correcting the simple motion vector D24 at the original image level with the motion amount of the block data for comparison and the second macro-block data D4 which was used when the minimum predictive error out of the calculated predictive errors was calculated, and adds the detected motion vector for correction D25 and the simple motion vector D24 so as to generate a final motion vector D26 of the first layer for the second macro-block data D4, and then sends it together with the predictive mode data D20 to the motion compensator 39 and the variable length coder 43.

In addition, the motion vector detector 66 determines that, at the time of reading the predictive mode data D20 for the second frame image data from the simple motion vector buffer 65, only the first or second frame image data for reference which was associated with the second frame image data on the detection of the simple motion vector D24 has been excluded if the frame-to-be-encoded identification information obtained based on the predictive mode data D20 and the control flag CF2 match but the reference frame identification information do not, and then starts the redetection process of the motion vector D26 for the second frame image data which is the subject of encoding without reading the simple motion vector D24 associated with the predictive mode data D20 from the simple motion vector buffer 65.

Actually, the motion vector detector 66 sequentially reads the second frame image data which is the subject of encoding from the frame memory for inputting 32 on the second macro-block data D4 basis based on the control flag CF2, and also reads the first or second frame image data for reference D6 newly associated in the frame structure converter 62.

And the motion vector detector 66 detects the simple motion vector D24 of the second macro-block data D4 in the second layer according to the hierarchical search motion vector detection method as in the above-mentioned case about FIGS. 11(A) and (B) and FIG. 12, and then generates the final motion vector D26 of the original image level for the second macro-block data D4 in the first layer.

In addition, the motion vector detector 66 stores new reference frame identification information obtained based on the control flag CF2 by replacing the reference frame identification information stored in advance, in the predictive mode data D20 so as to generate the predictive mode data D27 of which the contents have been modified in accordance with the redetection of the motion vector D26, and sends the generated predictive mode data D27 together with the motion vector D26 to the motion compensator 39 and the variable length coder 43.

In addition, the motion vector detector 66, at the time of reading the predictive mode data D20 for the second frame image data from the simple motion vector buffer 65, if the second frame image data has been excluded, does not execute the detection process of the motion vector for the second frame image data without reading the simple motion vector D24 associated with the predictive mode data D20 from the simple motion vector buffer 65, because it is detected based on the control flag CF3 that the second frame image data has been excluded even though the frame-to-be-encoded identification information and the excluded frame identification information obtained based on the predictive mode data D20 and the corresponding control flag CF3 match.

Thus, the motion vector detector 66 is capable of adequately detecting (including redetecting) the motion vector D26 for the second frame image data which is the subject of encoding according to the change in the frame rate of the motion picture data D1 by the frame structure converter 62.

Figure 13:
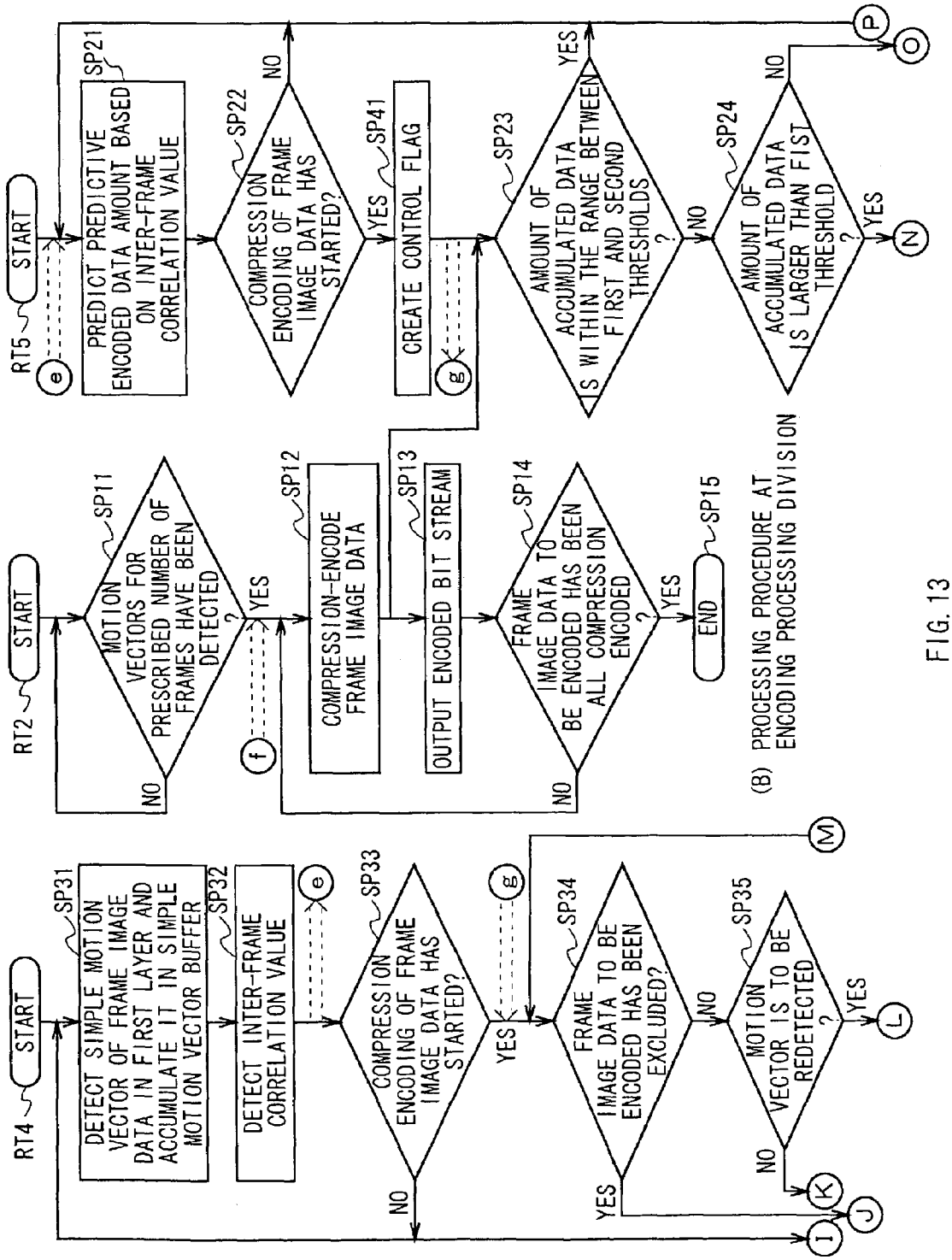
FIG. 13 is a flowchart showing a compression encoding procedure or the motion picture data.
Figure 14:
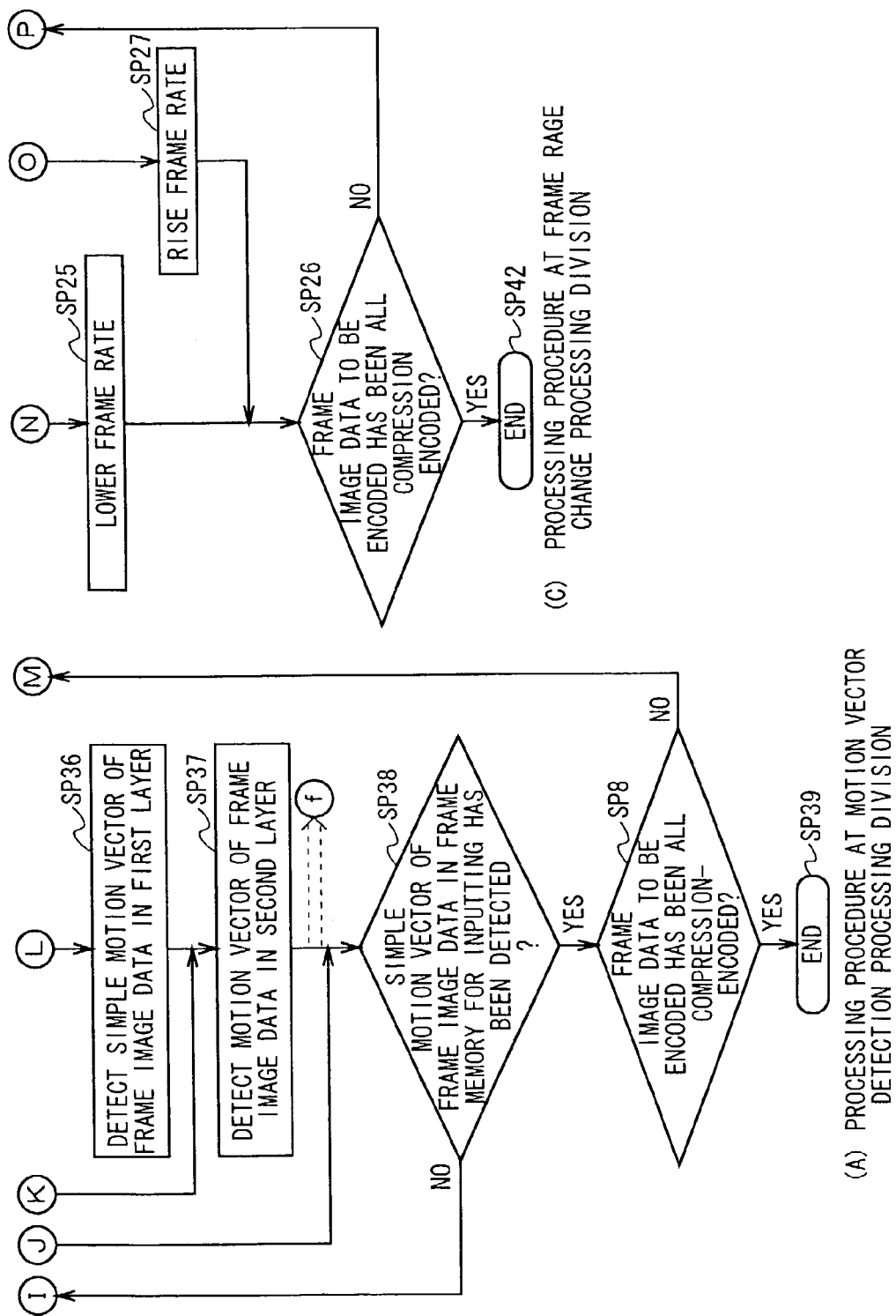
FIG. 14 is a flowchart showing the compression encoding procedure of the motion picture data.

Now, to summarize the compression encoding procedure of the motion picture data D1 by the frame rate change processing division 61, the motion vector detection processing division 63 and the compression encoding division 37 of the motion picture encoding apparatus 60, the motion vector detection processing division 63 first enters the start step of a routine RT4 and moves on to step SP31 as shown in FIG. 13(A) and FIG. 14(A) in which the same reference numerals are applied to parts corresponding to those of FIG. 6(A) and FIG. 7(A).

In step SP31, in the motion vector detection processing division 63, the simple motion vector detector 64 sequentially reads the second frame image data on the second macro-block data D4 basis from the frame memory for inputting 32 and also reads the first or second frame image data for reference D6 for the second frame image data, and detects the simple motion vector D24 of each piece of the second macro-block data D4 of one frame in the second layer according to the hierarchical search motion vector detection method, and then moves on to step SP32.

In step SP32, in the motion vector detection processing division 63, the simple motion vector detector 64 uses the predictive errors calculated for detecting the simple motion vectors D24 of the second macro-block data D4 to calculate the inter-frame correlation value SH2 between the hierarchical second frame image data which is the subject of encoding and the hierarchical frame image data for reference, sends the calculated inter-frame correlation value SH2 to the frame structure converter 62, and then moves on to step SP33.

At this time, as shown in FIG. 13(C) and FIG. 14(C) in which the same reference numerals are applied to parts corresponding to those in FIG. 6(C) and FIG. 7(C), the frame rate change processing division 61 enters the start step of a routine RT5 and moves on to step SP21, performs the process of step SP22 following the process of step SP21 and then moves on to step SP41.

In step SP41, in the frame rate change processing division 61, the frame structure converter 62 creates the control flags CF1, CF2 and CF3 for the first and second frame image data which is the subject of encoding, sends the created control flags CF1, CF2, and CF3 to the motion vector detector 66, and then moves on to step SP23.

Thus, the frame rate change processing division 61 sequentially sends the control flags CF1, CF2 and CF3 to the motion vector detector 66 by repeating the processing loop of steps SP21–SP22–SP23–SP24–SP25–SP26–SP27 while the first and second frame image data is compression-encoded, so as to change the frame rate of the motion picture data D1 as appropriate, and then if it determines in step SP26 that all of the first and second frame image data which was the subject of encoding has been compression-encoded, it moves on to step SP42 to finish the procedure in the frame rate change processing division 61.

On the other hand, in step SP33, the motion vector detection processing division 63 uses the motion vector detector 66 for example, to determine whether or not the compression encoding of the first and second frame image data has started, by monitoring whether or not the operator 38 accesses the frame memory for inputting 32, and repeats the processing loop of steps SP31–SP32–SP33 until the compression encoding of the first and second frame image data starts, so as to sequentially detect the simple motion vector D24 of each piece of the second macro-block data D4 in the second frame image data, and also to calculate the inter-frame correlation value SH2.

Then, the motion vector detection processing division 63 moves on to step SP14 when the motion vector detector 66 detects in step SP33 that the compression encoding of the first and second frame image data has started.

In step SP34, in the motion vector detection processing division 63, the motion vector detector 66 determines whether the second frame image data which is the subject of encoding has been excluded, due to the change in the frame rate, based on the control flags CF1, CF2 and CF3 given from the frame structure converter 62.

Obtaining a negative result in step SP34 means that the second frame image data which is the subject of encoding has not been excluded, and then the motion vector detection processing division 63 moves on to step SP35 to determine whether it is necessary to redetect the motion vector of each piece of the second macro-block data D4 for the second frame image data which is the subject of encoding.

Obtaining a positive result in step SP35 means that, in conjunction with the change in the frame rate of the motion picture data D1, the first or second frame image data for reference D6 different from that used in detecting the simple motion vector D24 was assigned to the second frame image data which is the subject of encoding, and in this case, the motion vector detection processing division 63 moves on to step SP36 where the motion vector detector 66 uses the second frame image data which is the subject of encoding and the new first or second frame image data for reference D6 in order to redetect the simple motion vector D24 of each piece of the macro-block data D4 in the second layer according to the hierarchical search motion vector detection method, and moves on to step SP37.

In step SP37, in the motion vector detection processing division 63, the motion vector detector 66 detects the motion vector D26 of each piece of the second macro-block data D4 at the original image level by using the second frame image data which is the subject of encoding, the first or second frame image data for reference and the simple motion vector D24 in the first layer according to the hierarchical search motion vector detection method, and moves on to step SP38.

Incidentally, obtaining a positive result in step SP34 means that the second frame image data which is the subject of encoding has been excluded due to the change in the frame rate, and in this case, the motion vector detection processing division 63 moves on to step SP38.

In addition, obtaining a negative result in step SP35 means that the first or second frame image data for reference D6 which is the same as that used in detecting the simple motion vector D24 is assigned to the second frame image data which is the subject of encoding, and in this case, the motion vector detection processing division 63 moves on to step SP37 where the motion vector detector 66 detects the motion vector D26 of each piece of the second macro-block data D4 at the original image level using the second frame image data which is the subject of encoding, the first or second frame image data for reference D6 and the corresponding simple motion vector D24 read from the simple motion vector buffer 65, in the first layer according to the hierarchical search motion vector detection method, and moves on to step SP38.

In step SP38, the motion vector detection processing division 63 uses the motion vector detector 66 to determine whether the simple motion vector D24 of each piece of the second macro-block data D4 for all the second frame image data in the frame memory for inputting 32 has been detected, and if it is determined that the simple motion vector D24 of each piece of the second macro-block data D4 for all the second frame image data in the frame memory for inputting 32 has not been detected, is moves on to step SP31.

Thus, while the second frame image data for detecting the simple motion vector D24 of the second macro-block data D4 is captured in the frame memory for inputting 32, the motion vector detection processing division 63 repeats a processing loop of steps SP31–SP32–SP33–SP34–SP35–SP36–SP37–SP38 and thereby sequentially detects the simple motion vectors D24 of the second macro-block data D4 for the second frame image data in the frame memory for inputting 32, and also sequentially detects the motion vectors D26 of the second macro-block data D4 while sequentially calculating the inter-frame correlation values SH2.

In step SP38, the motion vector detection processing division 63 detects the simple motion vector D24 of each piece of the second macro-block data D4 in all the second frame image data in the frame memory for inputting 32, and moves on to step SP8.

In step SP8, the motion vector detection processing division 63 uses the motion vector detector 66 to determine whether all the first and second frame image data which is the subject of encoding has been compression-encoded, by monitoring whether the operator 38 accesses the frame memory for inputting 32, and if the compression encoding of the first and second frame image data has not finished, it returns to step SP34.

Thus, the motion vector detection processing division 63 repeats the processing loop of steps SP34–SP35–SP36–SP37–SP38–SP8 thereafter until all the first and second frame image data which is the subject of encoding is compression-encoded, so as to sequentially detect the motion vectors D26 of the second macro-block data D4 for the second frame image data which is the subject of encoding.

When the motion vector detection processing division 63 determines in step SP8 that all the first and second frame image data which is the subject of encoding has been compression-encoded, as described above, it moves on to step SP39 to finish the procedure in the motion vector detection processing division 63, and thus the compression encoding procedure of the motion picture data D1 in the motion picture encoding apparatus 60 is completed.

In the above configuration, in the case where the motion picture encoding apparatus 60 compression-encodes the first and second frame image data composing the motion picture data D1 which is the subject of distribution, the simple motion vector detector 64 searches a relatively narrow search range of the hierarchical frame image data D22 having the lowered resolution obtained by reducing the pixels of the first or second frame image data for reference D6, for the hierarchical macro-block data D21 likewise having the lowered resolution obtained by reducing the pixels of each piece of the second macro-block data D4, in the second layer according to the hierarchical search motion vector detection method in order to detect in advance the low resolution motion vector D23 of the hierarchical macro-block data D21, and detects the simple motion vector D24 of the second macro-block data D4 by expanding the low resolution motion vector D23 so as to match with the resolution of the original image.

And in the motion picture encoding apparatus 60, at the time of actually compression-encoding the second frame image data on the second macro-block data D4 basis, the motion vector detector 66 searches for the second macro-block data D4 the significantly narrow search range set around the endpoint of the simple motion vector D24 to the first or second frame image data for reference D6 in the first layer according to the hierarchical search motion vector detection-method, in order to detect the motion vector for correction D25 for correcting the endpoint portion of the simple motion vector D24, and adds the detected motion vector for correction D25 and the simple motion vector D24 to detect the motion vector D26 of the first layer for the second macro-block data D4.

Accordingly, the motion picture encoding apparatus 60 uses the hierarchical frame image data D22 and the hierarchical block data D21 having the lowered resolution (that is, a reduced data amount) in the second layer according to the hierarchical search motion vector detection method in order to detect the simple motion vector D24 and also uses the first or second frame image data for reference D6 and the second macro-block data D4 of the original image level in the first layer according to the hierarchical search motion vector detection method in order to detect the motion vector for correction D25 for correcting only the endpoint portion of the simple motion vector D24, and thereby it detects the motion vector D26 of the first layer for the second macro-block data D4, so that it is possible to significantly reduce the amount of operation on the detection of the second macro-block data D4 as compared with the motion picture encoding apparatus 30 (FIG. 2) of the above-mentioned first embodiment.

In addition, while the motion picture encoding apparatus 60 detects the simple motion vector D24 of each piece of the second macro-block data D4 for all the second frame image data in the frame memory for inputting 32, it does not detect the motion vector D26 of the original image level of each piece of the second macro-block data D4 when the second frame image data is excluded in conjunction with the change in the frame rate of the motion picture data D1, and so it is possible to reduce a processing load in the motion vector detection processing division 63.

According to the above configuration, in the case of compression-encoding the first and second frame image data constituting the motion picture data D1 which is to be distributed, the motion vector D26 of each piece of the second macro-block data D4 for the second frame image data which is the subject of encoding is hierarchically detected by the hierarchical search motion vector detection method, which, in addition to the effects obtained by the above first embodiment, significantly reduces the amount of operation on the detection of the motion vector for each piece of the second macro-block data D4, thus making it possible to implement the motion picture encoding apparatus capable of speeding up the motion vector detecting process.

Note that, the above-mentioned second embodiment has described the case where, as mentioned above as to FIG. 3, the motion picture data D1 supplied from the outside is sequentially captured into the frame memory for inputting 32 on the frame image data basis, and the I-pictures and the P-pictures are assigned to the frame image data captured into the frame memory for inputting 32 in a predetermined order. The present invention, however, is not limited thereto and also allows the I-pictures, the P-pictures and the B-pictures to be assigned to the frame image data captured into the frame memory for inputting 32 as mentioned above as to FIGS. 8(A) and (B) and FIGS. 9(A) to (C).

In addition, the above-mentioned second embodiment has described the case where, on assigning the new first or second frame image data for reference D6 to the second frame image data which is the subject of encoding in conjunction with the change in the frame rate of the motion picture data D1, the simple motion vector D24 of each piece of the macro-block data D4 and the motion vector D26 of the original image level are sequentially detected by the motion vector detector 66 in the first and second layers according to the hierarchical search motion vector detection method. The present invention, however, is not limited thereto and also makes it possible, on assigning the new first or second frame image data for reference D6 to the second frame image data which is-the subject of encoding in conjunction with the change in the frame rate of the motion picture data D1, to detect the simple motion vector D24 of each piece of the second macro-block data D4 by using the second frame image data which is the subject of encoding and the new first or second frame image data for reference D6 with the simple motion vector detector 64 in the second layer according to the hierarchical search motion vector detection method and also to detect the motion vector D26 of the original image level of the second macro-block data D4 with the motion vector detector 66 in the first layer according to the hierarchical search motion vector detection method. This makes it possible to significantly reduce the processing load of the motion vector detector 66 on the redetection of the motion vector in conjunction with the change in the frame rate.

In addition to this, when the new first or second frame image data for reference D6 is assigned to the second frame image data which is the subject of encoding in conjunction with the change in the frame rate of the motion picture data D1, and if the second frame image data D6 (that is, the second frame image data adjacent to the second frame image data which is the subject of encoding on the forward side) is assigned for reference purposes to the second frame image data which is the subject of encoding on the detection of the simple motion vector D24, the motion vector detector 66 can synthesize the previously detected simple motion vector D24 of each piece of the second macro-block data D4 for the second frame image data which is the subject of encoding with the simple motion vector D24 of each piece of the macro-block data D4 for the second frame image data D6 which was a reference at the time of detecting the simple motion vector D24, and uses the obtained synthesized simple motion vector to detect the motion vector D26 of the original image level of each piece of the second macro-block data D4 for the second frame image data which is the subject of encoding by using the telescopic search method, for instance, in the first layer according to the hierarchical search motion vector detection method. This also can reduce the processing load of the motion vector detector 66 on the redetection of the motion vector in conjunction with the change in the frame rate.

Incidentally, it is also possible to reduce the processing load of the motion vector detector 66 by performing such a synthesis of the simple motion vectors D24 with the simple motion vector detector 64.

Furthermore, the above-mentioned second embodiment has described the case where each piece of the second macro-block data D4 of the second frame image data is compression-encoded by the forward predictive encoding. The present invention, however, is not limited thereto and it is possible to compression-encode it by one of the in-frame encoding and the forward predictive encoding, by using the distribution value of each piece of the second macro-block data D4.

Furthermore, the above-mentioned second embodiment has described the case where the motion vector detector 66 detects the motion vector D26 of each piece of the second macro-block data D4 by using the first and second frame image data for reference D6 read from the frame memory for inputting 32. The present invention, however, is not limited thereto and the motion vector detector 66 can read the first and second frame image data for reference from the frame memory for reference 47 so as to detect the motion vector D26 of each piece of the second macro-block data D4. According to this process, the motion vector D26 can be detected by using the first and second frame image data having the block noise and so on generated by the compression encoding in the processes of the compression encoding, decoding and then reconstructing, thus making it possible to improving the detection accuracy of the motion vector D26.

Furthermore, the above-mentioned second embodiment has described the case where the hierarchical search motion vector detection method using two layers, that is, the first and second layers is used to detect the motion vector D26 of the second macro-block data D4. The present invention, however, is not limited thereto and it is also possible to use a hierarchical search motion vector detection method using three or more layers which uses frame images each having different resolutions, in order to detect the motion vector of the second macro-block data D4.

Furthermore, the above-mentioned second embodiment has described the case where the frame rate of the motion picture data D1 is changed according to the amount of accumulated data DR of the buffer 42 and the predictive encoded data amount. The present invention, however, is not limited thereto and the frame rate of the motion picture data D1 can be changed according to the amount of accumulated data DR of the buffer 42. This change of the frame rate can also adequately cope with the abrupt increase and decrease in the amount of accumulated data DR and stabilize the image quality of the motion picture.

(4) THIRD EMBODIMENT

Figure 15:
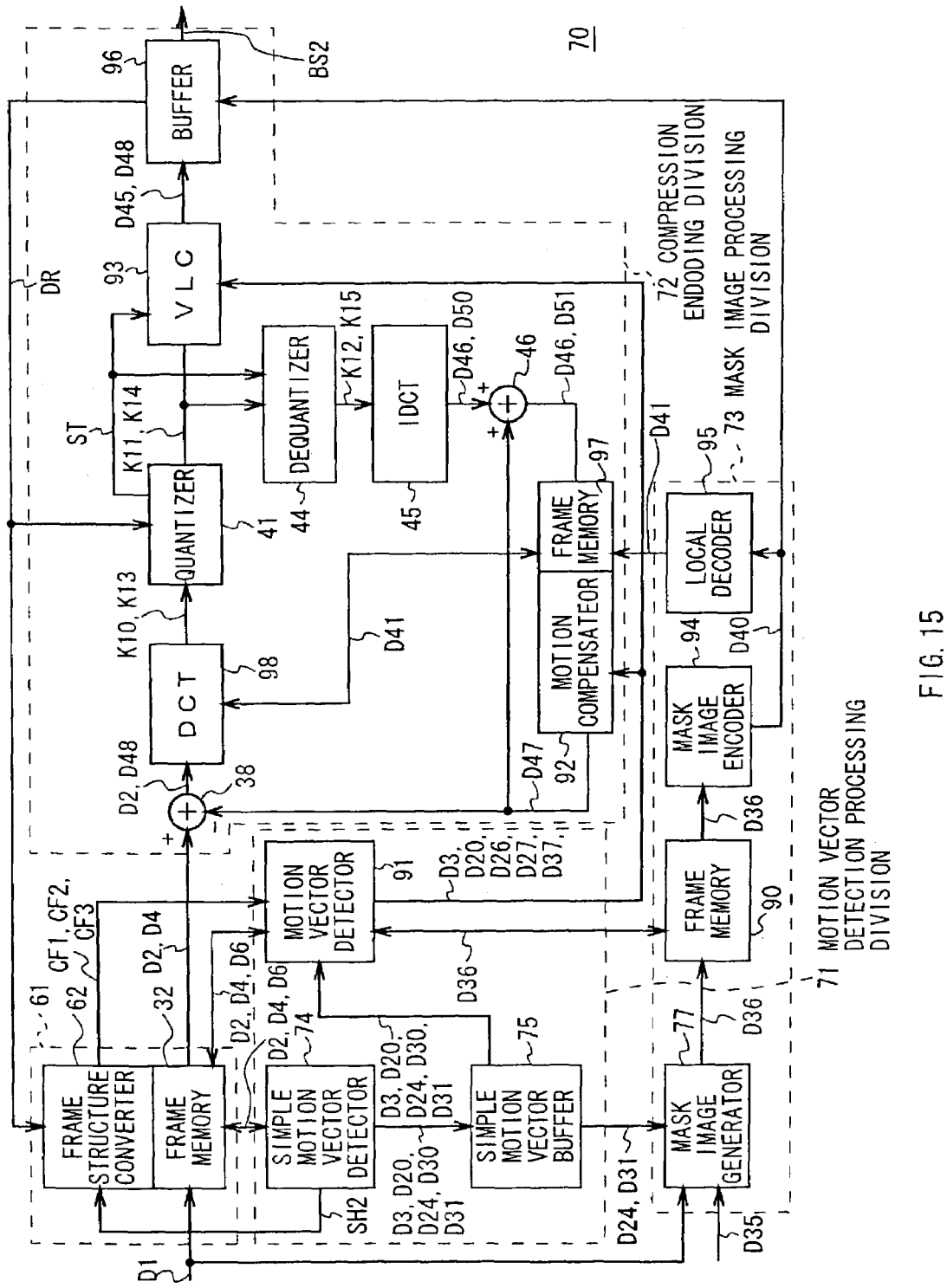
FIG. 15 is a block diagram showing the circuit construction of the motion picture encoding apparatus according to a third embodiment.

FIG. 15 in which the same reference numerals are applied to parts corresponding to those in FIG. 10 shows a motion picture encoding apparatus 70 according to a third embodiment, which has the same construction as the motion picture encoding apparatus 60 according to the second embodiment, except the constructions of a motion vector detection processing division 71, a compression encoding division 72 and a mask image processing division 73.

In the motion vector detection processing division 71, when the I-picture is assigned to the leading frame image data constituting the motion picture data D1 in the frame memory for inputting 32, a simple motion vector detector 74 reads the picture information on the first frame image data to which the I-picture is assigned and thereby generates the predictive mode data D3 based on the picture information, and then sends the generated predictive mode data D3 to a simple motion vector buffer 75 to accumulate it therein.

In addition, when the P-picture is assigned to the frame image data in the frame memory for inputting 32, the simple motion vector detector 74 generates the predictive mode data D20 based on the picture information on the second frame image data to which the P-picture is assigned and on the first or second frame image data for reference, in the same way as the simple motion vector detector 64 of the motion picture encoding apparatus 60 mentioned above as to FIG. 10.

And in the second layer according to the hierarchical search motion vector detection method, just as in the case mentioned above as to FIGS. 11(A) and (B) and FIG. 12, the simple motion vector detector 74 detects the simple motion vector D24 of each piece of the second macro-block data D4 for the second frame image data to which the P-picture has been assigned, and associates each detected simple motion vector D24 with the predictive mode data D20 and sends them to the simple motion vector buffer 75 to accumulate them therein.

In addition, when the I-picture is assigned to frame image data other than the leading one out of the frame image data constituting the motion picture data D1 in the frame memory for inputting 32, the simple motion vector detector 74 reads the picture information on the first frame image data to which the I-picture is assigned and also reads the picture information on the second frame image data for reference D6 adjacent to the first frame image data on the forward side.

The simple motion vector detector 74 generates predictive mode data D30 which represents the frame identification information on the first frame image data which is the subject of encoding as the frame-to-be-encoded identification information and also represents the frame identification information on the second frame image data for reference D6 as the reference frame identification information, based on the picture information, and further represents that the first frame image data which is the subject of encoding is sequentially compression-encoded by the in-frame encoding on the first macro-block data D2 basis.

In addition, the simple motion vector detector 74 sequentially reads the first frame image data-which is the subject of encoding on the first macro-block data D2 basis from the frame memory for inputting 32 and also reads the second frame image data for reference D6, and then detects a simple motion vector D31 of each piece of the first macro-block data D2 for the first frame image data in the second layer according to the hierarchical search motion vector detection method just as mentioned above as to FIGS. 11(A) and (B) and FIG. 12.

And the simple motion vector detector 74 associates the predictive mode data D30 for the first frame image data with the simple motion vector D31 of each piece of the first macro-block data D2 and sends them to the simple motion vector buffer 75 to accumulate them therein.

In this way, every time the frame image data is sequentially captured into the frame memory for inputting 32 and the I-picture and the P-picture are assigned, the simple motion vector detector 74 likewise generates the predictive mode data D3, D20 and D30 and also detects the simple motion vectors D24 and D31, and then accumulates them in the simple motion vector buffer 75.

Here, the motion picture encoding apparatus 70 sequentially captures the motion picture data D1 supplied from the outside on the frame image data basis into the frame memory for inputting 32 and also into a mask image generator 77 of the mask image processing division 73.

Figure 16:
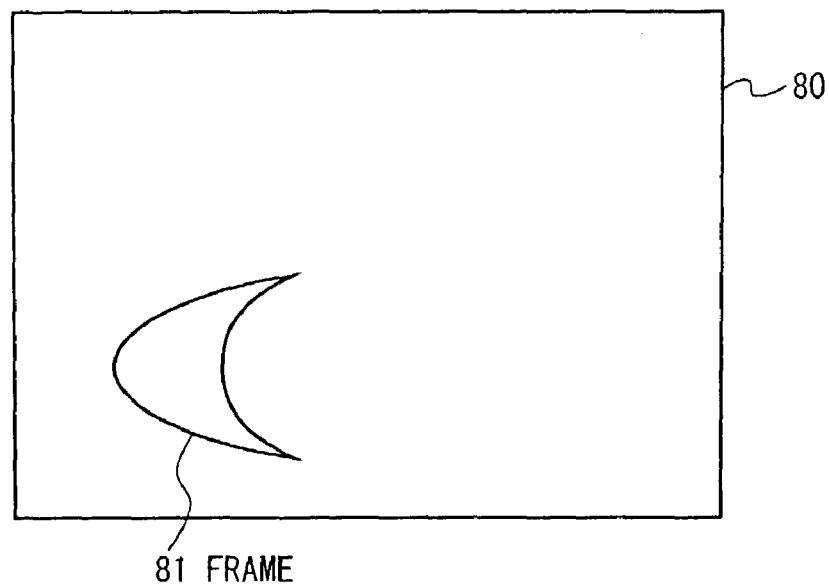
FIG. 16 is a schematic diagram explaining the specification of an initial position and an arbitrary shape of an extract image for a frame image.

And as shown in FIG. 16, the mask image generator 77 has been given from the outside shape specifying data D35 which specifies an initial position of an extract image of a person or the like to be extracted from a frame image 80 based on the frame image data and also specifies an arbitrary shape of the extract image with a frame 81.

Figure 17:
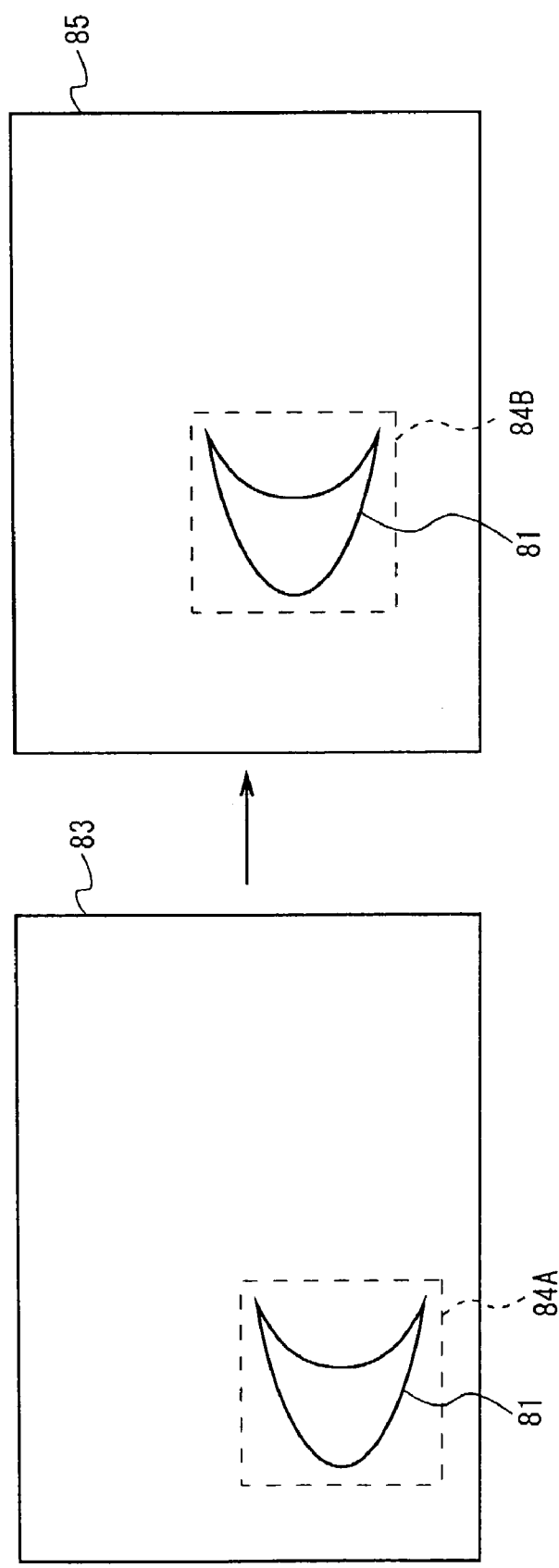
FIG. 17 is a schematic diagram explaining the tracing of the extract image between the frame images.

In this case, when the mask image generator 77 captures the leading frame image data out of the frame image data constituting the motion picture data D1, it divides the captured frame image data into macro-block data, and sets a target area 84A in a rectangular shape enclosing the frame 81 of the extract image in a frame image 83 based on the leading frame image data on the basis of the shape specifying data D35 as shown in FIG. 17 so as to detect the macro-block data in the set target area 84A.

In addition, when the mask image generator 77 captures the frame image data of the second frame, it divides the frame image data of the second frame into the macro-block data, and reads the simple motion vector D24 of each piece of the macro-block data (that is, the second macro-block data D4) for the frame image data of the second frame (that is, the second frame image data) from the simple motion vector buffer 75.

And after roughly detecting a position to which the macro-block data in the target area 84A of the frame image 83 based on the leading frame image data has moved in a frame image 85 based on the frame image data of the second frame, by using each simple motion vector D24, the mask image generator 77 detects with high accuracy the position to which each piece of the macro-block data in the target area 84A has moved, by comparing the target areas 84A and 84B with each other by a line matching method, for instance, between the frame images 83 and 85.

When the target area 84B having each piece of the macro-block data is specified in the frame image 85 based on the frame image data of the second frame, the mask image generator 77 specifies the frame 81 of the extract image in the specified target area 84B.

In this way, every time the frame image data is sequentially captured from the outside, the mask image generator 77 uses the corresponding simple motion vectors D24 and D31 read from the simple motion vector buffer 75 and also uses the line matching method to sequentially detect the position to which each piece of the macro-block data in the target area 84A has moved between adjacent frame image data and to thereby specify the target area 84B and also the frame 81 of the extract image, and to thus sequentially trace the extract image over a plurality of the frame image data.

Figure 18:
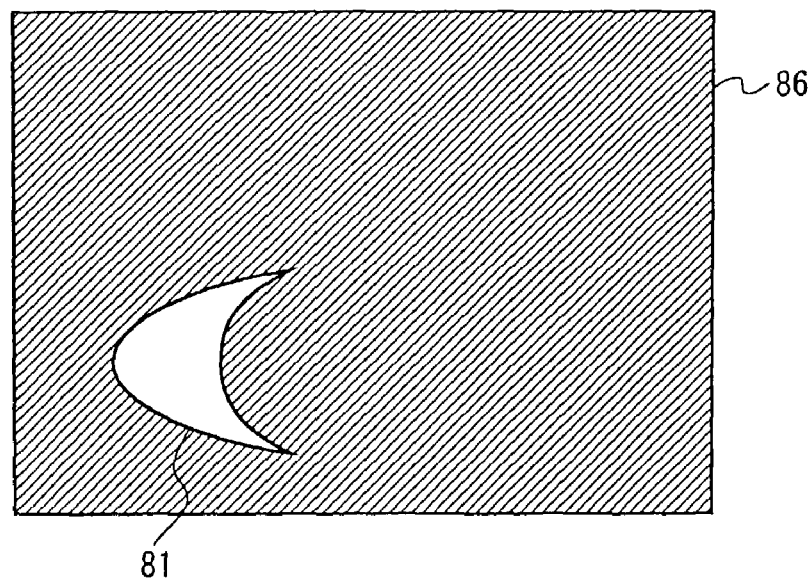
FIG. 18 is a schematic diagram showing the configuration of a mask image.

In addition, as shown in FIG. 18, when the extract image is traced between the adjacent frame image data, the mask image generator 77 first changes the pixel value of each pixel of each piece of macro-block data as to the leading frame image data on the basis of the shape specifying data D35 so that, in the frame image 83 (FIG. 17), it colors the portion inside the frame 81 of the extract image white and colors the portion outside that frame 81 black, for instance, to thus generate a mask image 86 representing the initial position and the arbitrary shape of the extract image, and then sends data (hereafter, referred to as mask image data) D36 of the generated mask image 86 to a mask frame memory 90 having storage capacity of a plurality of frames to accumulate it therein.

In addition, as for the frame image data of the second frame and following frames, the mask image generator 77 changes the pixel values of the pixels of each piece of macro-block data based on the frame 81 of the extract image traced and thereby generates the mask image data D36 representing the moved position and the arbitrary shape of the extract image by the same processing as in the case of the leading frame image data, and then sends the generated mask image data D36 to the mask frame memory 90 to accumulate it therein.

In this way, every time the frame image data is captured, the mask image generator 77 generates the mask image data D36 representing the moved position and the arbitrary shape of the extract image based on the frame image data while tracing the extract image, and accumulates it in the mask frame memory 90.

Incidentally, when the simple motion vectors D24 and D31 of the predetermined number of frames are accumulated in the simple motion vector buffer 75 by the simple motion vector detector 74, and the mask image data D36 of the predetermined number of frames is accumulated in the mask frame memory 90 by the mask image generator 77 and thereby the compression encoding division 72 starts the compression encoding of the first and second frame image data which is the subject of encoding, a motion vector detector 91 sequentially reads the corresponding predictive mode data D3, D20 and D30 from the simple motion vector butter D5 according to the order or the compression encoding for the first and second frame image data which is the subject of encoding.

Every time the predictive mode data D3, D20 and D30 are read from the simple motion vector buffer 75, the motion vector detector 91 compares the frame-to-be-encoded identification information and the reference frame identification information obtained based on the predictive mode data D3, D20 and D30 with the frame-to-be-encoded identification information, the reference frame identification information and the excluded frame identification information obtained based on the corresponding control flags CF1, CF2 and CF3 given from the frame structure converter 62.

In this case, when the predictive mode data D3 and D30 for the first frame image data are read from the simple motion vector buffer 75, the motion vector detector 91 does not take the first frame image data to be the subject of exclusion as mentioned above as to FIGS. 5(A) to (C), and determines that the first frame image data has not been excluded since the frame-to be-encoded identification information obtained based on the predictive mode data D3 and D30 and the corresponding control flag CF1 coincide with each other, and then sends the predictive mode data D3 and D30 to a motion compensator 92 and a variable length coder 93.

In addition, when the predictive mode data D20 for the second frame image data is read from the simple motion vector buffer 75, and when the motion vector detector 91 detects based on the predictive mode data D20 and the corresponding control flag CF2 that the second frame image data and the first or second frame image data for reference D6 associated therewith on the detection of the simple motion vector D24 have not been excluded, it reads the simple motion vectors D24 associated with the predictive mode data D20 from the simple motion vector buffer 75.

At this time, the motion vector detector 91 sequentially reads the second frame image data which is the subject of encoding on the second macro-block data D4 basis from the frame memory for inputting 32 based on the control flag CF2, and also reads the first or second frame image data for reference D6 associated therewith on the detection of the simple motion vectors D24, and further reads the mask image data D36 corresponding to the second frame image data which is the subject of encoding from the mask frame memory 90.

Figure 19:
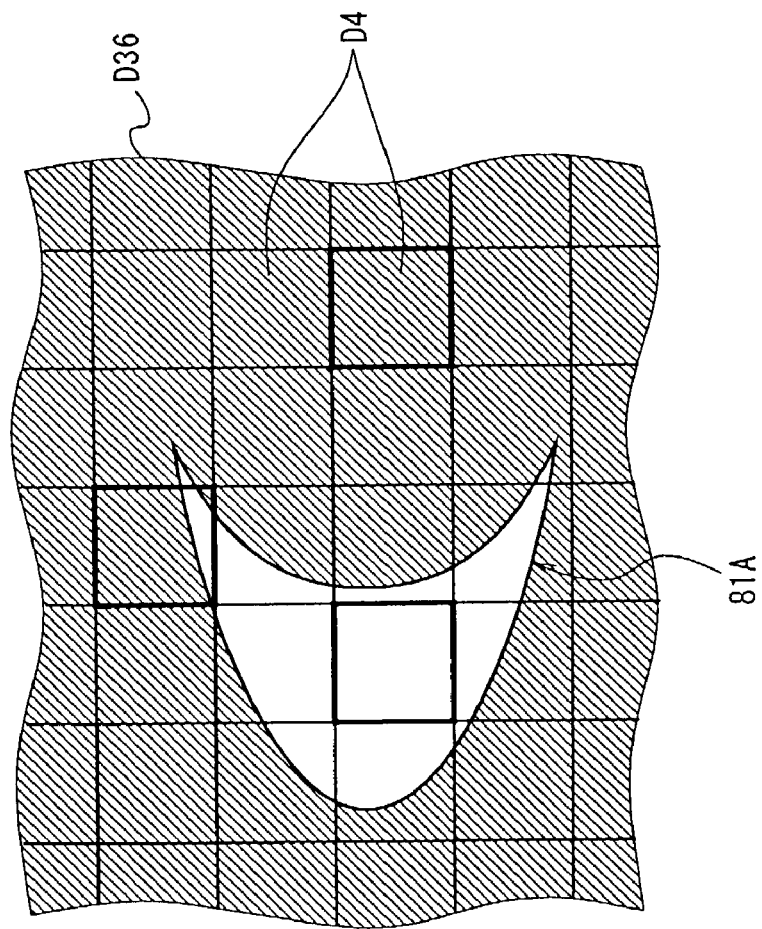
FIG. 19 is a schematic diagram explaining the determination of second macro-block data using the mask image data.

And as shown in FIG. 19, the motion vector detector 91 uses the mask image data D36 to determine whether each piece of the second macro-block data D4 is located outside or inside an edge 81A of the extract image in the arbitrary shape or overlapping the edge 81A.

As a result of this, the motion vector detector 91 sends only the predictive mode data D20 to the motion compensator 92 and the variable length coder 93 without detecting the motion vector of the original image level as to, out of the second macro-block data D4, the second macro-block data D4 located outside the edge 81A of the extract image.

In addition, as to, out of the second macro-block data D4, the second macro-block data D4 located inside the edge 81A of the extract image, the motion vector detector 91 reads the corresponding simple motion vector D24 from the simple motion vector buffer 75 and detects the motion vector D26 of the original image level in the first layer according to the hierarchical search motion vector detection method as mentioned above as to FIG. 12, and then sends the detected motion vector D26 together with the predictive mode data D20 to the motion compensator 92 and the variable length coder 93.

Figure 20:
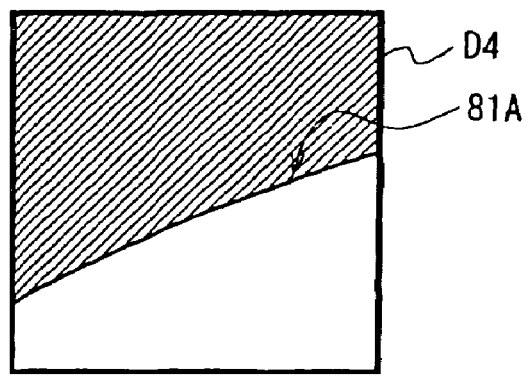
FIG. 20 is a schematic diagram explaining the detection of the motion vector of the second macro-block data overlapping an edge.

Furthermore, as shown in FIG. 20, the motion vector detector 91 detects the pixels located inside the edge 81A out of all the pixels in the second macro-block data D4 by using the mask image data D36 as to, out of the second macro-block data D4, the second macro-block data D4 overlapping the edge 81A of the extract image.

Then the motion vector detector 91 selectively uses only the pixels located inside the edge 81A out of the pixels of the second macro-block data D4 to calculate the predictive errors and thereby detect the motion vector D37 of the original image level, by the block matching method in the first layer according to the hierarchical search motion vector detection method as mentioned above as to FIGS. 11(A) and 11(B) and FIG. 12, and then sends the detected motion vector D37 together with the predictive mode data D20 to the motion compensator 92 and the variable length coder 93.

In addition, when the predictive mode data D20 for the second frame image data is read from the simple motion vector buffer 75, and if the new first or second frame image data D6 is associated for reference purposes with the second frame image data which is the subject of encoding in conjunction with the change in the frame rate of the motion picture data D1, the motion vector detector 91 sequentially reads the second frame image data which is the subject of encoding on the second macro-block data D4 basis from the frame memory for inputting 32 based on the control flag CF2, and also reads the first or second frame image data for reference D6 newly associated therewith, and further reads the mask image data D36 corresponding to the second frame image data which is the subject of encoding from the mask frame memory 90.

At this time, the motion vector detector 91 stores in the predictive mode data D20 the new reference frame identification information obtained based on the control flag CF2 by replacing the reference frame identification information stored in advance, so as to generate the predictive mode data D27 having the modified contents of the second macro-block data D4.

In addition, the motion vector detector 91 uses each piece of the second macro-block data D4 of the second frame image data which is the subject of encoding and the first or second frame image data for reference D6 newly associated therewith in order to detect the simple motion vector D24 of each piece of the second macro-block data D4 in the second layer according to the hierarchical search motion vector detection method as mentioned above as to FIGS. 11(A) and (B) and FIG. 12.

Then the motion vector detector 91 uses the detected simple motion vectors D24 of the second macro-block data D4, in order to generate the motion vectors D26 and D37 of the original image level only for the second macro-block data D4 inside the edge 81A and overlapping the edge 81A of the extract image specified by the mask image data D36 in the first layer as mentioned above as to FIGS. 19 and 20.

Thus, the motion vector detector 91 sends only the predictive mode data D27 to the motion compensator 92 and the variable length coder 93 as to the second macro-block data D4 located outside the edge 81A of the extract image, and sends to the motion compensator 92 and the variable length coder 93 the motion vectors D26 and D37 of the original image level together with the predictive mode data D27 as to the second macro-block data D4 located inside the edge 81A and overlapping the edge 81A.

Furthermore, when the motion vector detector 91 detects, at the time of reading the predictive mode data D20 for the second frame image data which is the subject of encoding from the simple motion vector buffer 75, that the second frame image data has been excluded, on the basis of the control flags CF3 given from the frame structure converter 62, it does not execute the detection of the motion vector for the second frame image data at the original image level and also renders the mask image data D36 corresponding to the second frame image data which is the subject of encoding, unreadable from the mask frame memory 90.

In this way, the motion vector detector 91 is capable of sequentially and adequately detecting (including redetecting) the motion vectors D26 and D37 of the second macro-block data D4 corresponding to the extract image for the second frame image data which is the subject of encoding, adequately according to the change in the frame rate of the motion picture data D1 by the frame structure converter 62.

On the other hand, when the compression encoding of the first or second frame image data which is the subject of encoding starts by the compression encoding division 72, a mask image encoder 94 in the mask image processing division 73 sequentially reads the corresponding mask image data D36 from the mask frame memory 90 in order of the compression encoding of the first and second frame image data, and compression-encodes the read mask image data D36 by the mask image data encoding method prescribed by the MPEG4 standard, and then sends the obtained encoded data D40 to a local decoder 95 and a buffer 96.

Incidentally, the mask image encoder 94 does not execute the readout of the mask image data D36 which has been rendered unreadable by the motion vector detector 91 in the mask frame memory 90.

The local decoder 95 decodes the encoded data D40 given from the mask image encoder 94 according to the prescription of the MPEG4 standard, and sends the obtained mask image data D41 to a frame memory for reference 97 having the storage capacity of a plurality of frames to accumulate it therein.

In addition, when the compression encoding of the first and second frame image data which is the subject of encoding starts, the operator 38 in the compression encoding division 72 sequentially reads the first frame image data from the frame memory for inputting 32 on the first macro-block data D2 basis.

The motion compensator 92 then stops the motion compensation process or the first macro-block data D2 based on the corresponding predictive mode data D3 and D30 given from the motion vector detector 91.

Thus, when reading the first macro-block data D2 of the first frame image data from the frame memory for inputting 32, the operator 38 sends the first macro-block data D2 as it is to a discrete cosine transformer 98 since no data is given from the motion compensator 92.

When the compression encoding of the first and second frame image data which is the subject of encoding starts, the discrete cosine transformer 98 sequentially reads the corresponding mask image data D41 from the frame memory for reference 97 according to the order of the compression encoding of the first and second frame image data which is the subject of encoding, and when the first macro-block data D2 is given from the operator 38, it determines whether the first macro-block data D2 is located outside or inside the edge 81A of the extract image or on which portion of the edge 81A it is located, based on the corresponding mask image data D41.

And when the first macro-block data D2 is located outside the edge 81A, the discrete cosine transformer 98 changes the pixel values of the pixels of the first macro-block data D2 to the pixel value representing black, for instance, which significantly reduces the data amount in the compression encoding, in accordance with the prescription of the MPEG4 standard.

In addition, when the first macro-block data D2 is located inside the edge 81A, the discrete cosine transformer 98 leaves the first macro-block data D2 unchanged in accordance with the prescription of the MPEG4 standard.

Furthermore, when the first macro-block data D2 is overlapping the edge 81A, the discrete cosine transformer 98 changes, out of the pixel values of the pixels of the first macro-block data D2, the pixel values of the pixels outside the edge 81A to the pixel value representing black and leaves the pixel values of the pixels inside the edge 81A unchanged, in accordance with the prescription of the MPEG4 standard.

Thus, the discrete cosine transformer 98 changes the pixel values of the pixels of each piece of the first macro-block data D2 based on the mask image data D41 and thereby renders the extract image in the arbitrary shape seemingly extracted in the frame image based on the first frame image data so as to performs the discrete cosine transformation on each piece of the first macro-block data D2, and then sends the obtained discrete cosine transformation coefficient K10 to a quantizer 41.

The quantizer 41 quantizes the discrete cosine transformation coefficient K10 given from the discrete cosine transformer 98, based on the corresponding quantization step ST, and sends the obtained quantization coefficient K11 to the variable length coder 93 and the dequantizer 44 together with the quantization step ST used for that quantization.

The variable length coder 93 performs the variable length coding on the quantization coefficient K11 given from the quantizer 41, with the Huffman code or the like, and also performs the variable length coding on the quantization step ST given from the quantizer 41 and the corresponding predictive mode data D3 given from the motion vector detector 91, and then sends the encoded data D45 thus obtained to the buffer 96 to once accumulate it therein.

Thus, the buffer 96 outputs to the outside the encoded data D45 given from the variable length coder 93 and the encoded data D40 given from the mask image encoder 94 as an encoded bit stream BS2 of which the encoded data amount has been smoothed.

In this way, the motion picture encoding apparatus 70 is capable of sequentially compression-encoding the first frame image data in the frame memory for inputting 32 by the in-frame encoding on the first macro-block data D2 basis in a state where the extract image data is seemingly extracted.

In addition, the dequantizer 44 dequantizes the quantization coefficient K11 given from the quantizer 41, based on the quantization step ST likewise given from the quantizer 41, and then sends the discrete cosine transformation coefficient K12 thus obtained to the inverse-discrete cosine transformer 45.

The inverse-discrete cosine transformer 45 performs the inverse-discrete cosine transformation on the discrete cosine transformation coefficient K12 given from the dequantizer 44, and then sends the first macro-block data D46 thus obtained to the adder 46.

When the first macro-block data D46 is given from the inverse-discrete cosine transformer 45, the adder 46 sends the first macro-block data D46 as it is to the frame memory for reference 97 to stores it therein since no data is given from the motion compensator 92 at this point.

Thus, every time the first macro-block data D46 is sequentially given from the inverse-discrete cosine transformer 45 by compression-encoding the first frame image data, the adder 46 sends the first macro-block data D46 as it is to the frame memory for reference 97 to store it therein, and thereby reconstructs the first frame image data where the extract image data is seemingly extracted, with the first macro-block data D46 for reference purposes in the motion compensation process, in the frame memory for reference 97.

In addition, the operator 38 reads the first frame image data from the frame memory for inputting 32, and subsequently reads the second frame image data which is the subject of encoding in sequence on the second macro-block data D4 basis.

At this time, the motion compensator 92 performs the motion compensation process based on the corresponding predictive mode data D20 and D27 given from the motion vector detector 91, and thereby reads from the frame memory for reference 97 the first or second frame image data which has been associated for reference purposes with the second frame image data which is the subject of encoding and which has the extract image data seemingly extracted, and also reads the mask image data D41 corresponding to the second frame image data which is the subject of encoding.

And the motion compensator 92 extracts block data for operation D47 which is the best match with the second macro-block data D4 from the first or second frame image data for reference based on the motion vectors D26 and D37 of the second macro-block data D4 and the mask image data D41 given from the motion vector detector 91 in accordance with the prescription of the MPEG4 standard, and then sends the extracted block data for operation D47 to the operator 38 and the adder 46.

Accordingly, when reading the second macro-block data D4 from the frame memory for inputting 32, the operator 38 subtracts the block data for operation D47 given from the motion compensator 92 at this point, from the second macro-block data D4, and sends the obtained difference data D48 to the discrete cosine transformer 98.

When the difference data D48 is given from the operator 38, the discrete cosine transformer 98 changes the pixel value of the difference data D48 to have the extract image data seemingly extracted, based on the corresponding mask image data D41 in compliance with the prescription of the MPEG4 standard, performs the discrete cosine transformation thereon, and then sends the discrete cosine transformation coefficient K13 thus obtained to the quantizer 41.

The quantizer 41 quantizes the discrete cosine transformation coefficient K13 given from the discrete cosine transformer 98, based on the corresponding quantization step ST, and sends the obtained quantization coefficient K14 to the variable length coder 93 and the dequantizer 44 together with the quantization step ST.

The variable length coder 93 performs the variable length coding on the quantization coefficient K14 given from the quantizer 41, with the Huffman code or the like, and also performs the variable length coding on the quantization step ST given from the quantizer 41 and the corresponding predictive mode data D20, D27 and the motion vector D26, D37 given from the motion vector detector 91, and then sends the encoded data D48 thus obtained to the buffer 96 to once accumulate it therein.

Thus, the buffer 96 outputs to the outside the encoded data D48 given from the variable length coder 93 and the encoded data D40 given from the mask image encoder 94 as the encoded bit stream BS2 of which the encoded data amount has been smoothed.

In this way, the motion picture encoding apparatus 70 is also capable of sequentially compression-encoding the second frame image data in the frame memory for inputting 32 by the forward predictive encoding on the second macro-block data D4 basis in the state where the extract image data has been seemingly extracted.

At this time, the dequantizer 44 dequantizes the quantization coefficient K14 given from the quantizer 41, based on the quantization step ST likewise given from the quantizer 41, and then sends the discrete cosine transformation coefficient K15 thus obtained to the inverse-discrete cosine transformer 45.

In addition, the inverse-discrete cosine transformer 45 performs the inverse-discrete cosine transformation on the discrete cosine transformation coefficient K15 given from the dequantizer 44, and then sends the difference data D50 thus obtained to the adder 46.

The adder 46 is given the block data for operation D47 from the motion compensator 92 when the difference data D50 is given from the inverse-discrete cosine transformer 45, and thereby adds the difference data D50 and the block data for operation D47, and then sends the second macro-block data D51 thus obtained to the frame memory for reference 97 to store it therein.

Thus, every time the difference data D50 is given from the inverse-discrete cosine transformer 45 by compression-encoding the second frame image data, the adder 46 adds the difference data D50 and the corresponding block data for operation D47 to generate the second macro-block data D51, and sends the generated second macro-block data D51 to the frame memory for reference 97 to store it therein, and thereby reconstructs the second frame image data in which the extract image data has been seemingly extracted, with the second macro-block data D51 for reference purposes in the motion compensation process in the frame memory for reference 97.

Incidentally, the variable length coder 93 is capable of selectively performing the variable length coding on the portion of the extract image data for the quantization coefficients K11 and K14 obtained from the first and second frame image data, thereby reducing the processing load of the variable length coding and also reducing the encoded data amount of the encoded bit stream BS2.

Thus, the motion picture encoding apparatus 70 is capable of extracting and compression-encoding the seeming extract image data from the first and second frame image data while changing the frame rate for the motion picture data D1 as appropriate, and then outputting the encoded bit stream BS2 thus obtained to the outside.

Figure 21:
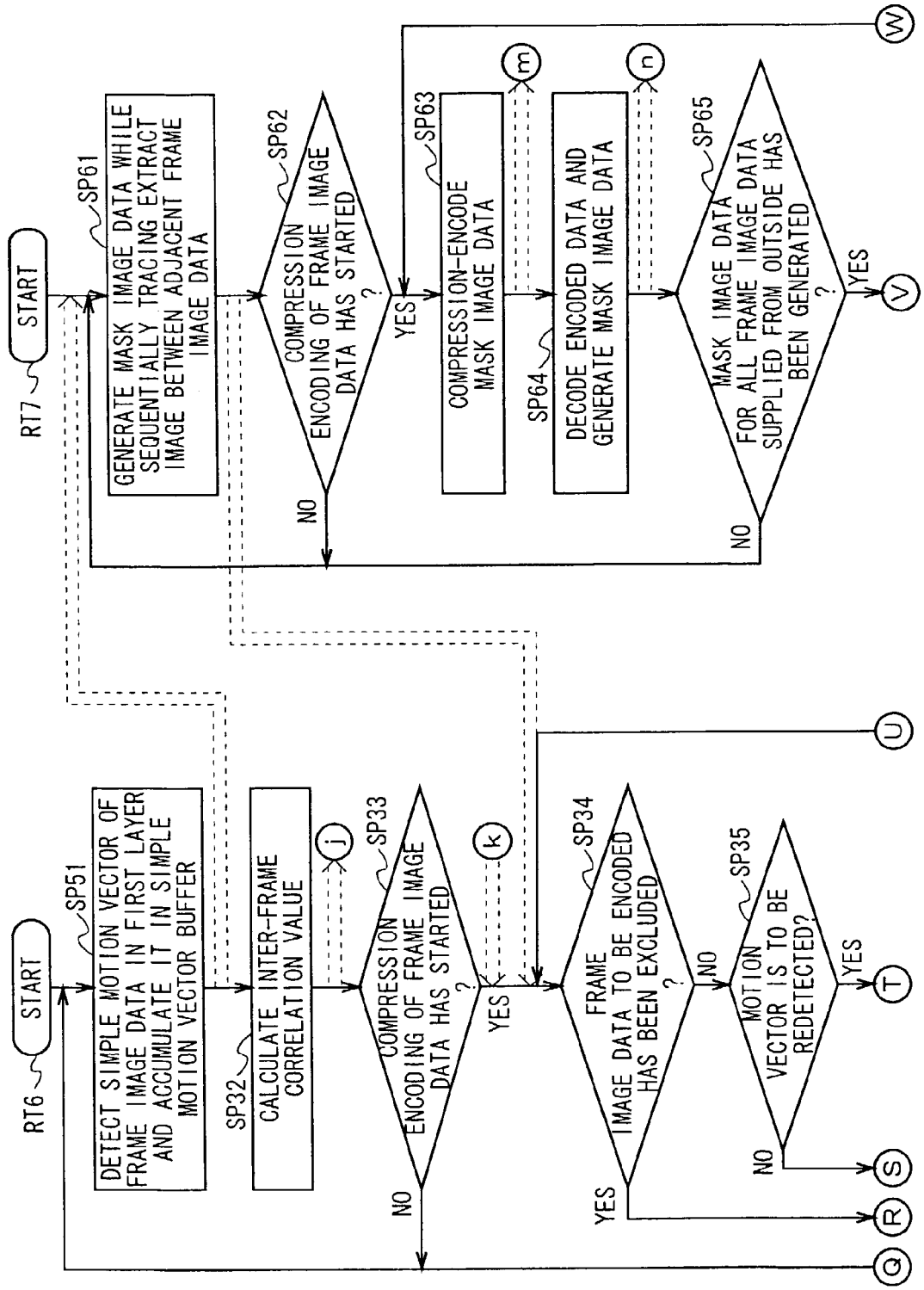
FIG. 21 is a flowchart showing the compression encoding procedure of the motion picture data.
Figure 22:
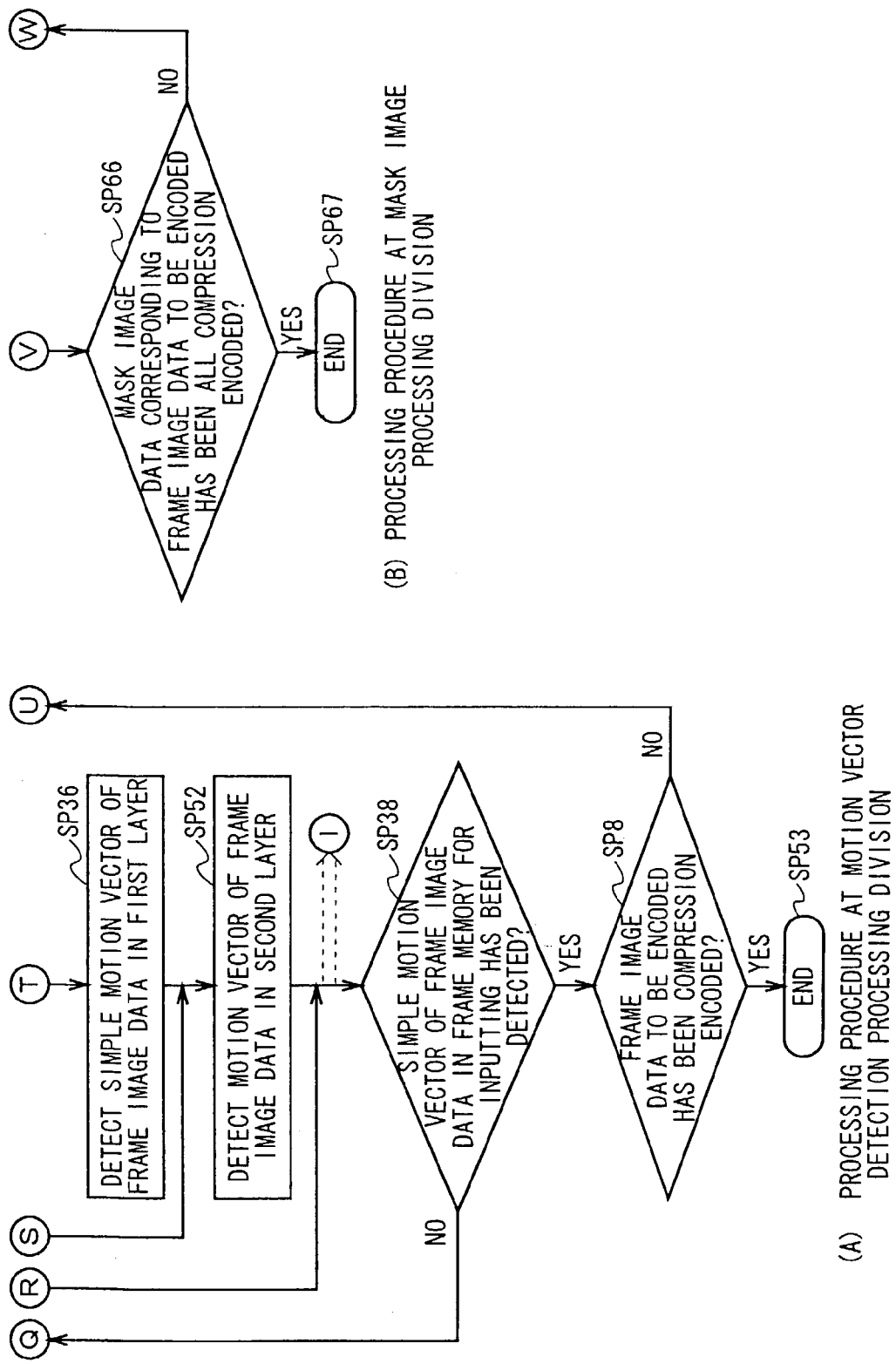
FIG. 22 is a flowchart showing the compression encoding procedure of the motion picture data.

Now, to summarize the procedure for compression-encoding the motion picture data D1 by the frame rate change processing division 61, the motion vector detection processing division 71, the compression encoding division 72 and the mask image processing division 73 of the motion picture encoding apparatus 70, first of all, the motion vector detection processing division 71 enters the start step of a routine RT6 and moves on to step SP51 as shown in FIGS. 21(A) and 22(A) in which the same reference numerals are applied to parts corresponding to those of FIG. 13(A) and FIG. 14(A).

In step SP51, the motion vector detection processing division 71 sequentially reads the first and second frame image data other than the leading first frame image data, from the frame memory for inputting 32 with the simple motion vector detector 74 on the first and second macro-block data D2 and D4 basis, and also reads the first or second frame image data for reference D6 for the first and second frame image data, and detects the simple motion vector D24, D31 of each piece of the first and second macro-block data D2 and D4 of one frame in the second layer according to the hierarchical search motion vector detection method, and accumulates them in the simple motion vector buffer 75, and then moves on to step SP32.

In step SP32, the motion vector detection processing division 71 uses the simple motion vector detector 74 to calculate the inter-frame correlation value SH2 and send it to the frame structure converter 62, and then moves on to step SP33.

In step SP33, the motion vector detection processing division 71 uses the motion vector detector 91 to determine whether the compression encoding of the first and second frame image data has started, by monitoring whether the operator 38 has accessed the frame memory for inputting 32, and if the compression coring of the first and second frame image data has not started, it returns to step SP51.

Thus, the motion vector detection processing division 71 repeats a processing loop of steps SP51–SP32–SP33 until the compression encoding of the first and second frame image data starts, in order to sequentially detect the simple motion vector D24, D31 of each piece of the first and second macro-block data D2 and D4 in the first and second frame image data, and also calculate the inter-frame correlation value SH2.

At this time, as shown in FIG. 21(B) and FIG. 22(B), the mask image processing division 73 enters the start step of a routine RT7 and moves on to step SP61 to sequentially capture the motion picture data D1 supplied from the outside, on the frame image data basis, generate the mask image data D36 specifying the initial position and the arbitrary shape of the extract image of the leading frame image data based on the shape specifying data D35, and accumulate it in the mask frame memory 90, and then moves on to step SP62.

In step SP62, the mask image processing division 73 determines whether the compression encoding of the first and second frame image data has started, by monitoring whether the motion vector detector 91 accesses the mask frame memory 90 for instance, and if the compression encoding of the first and second frame image data has not started, it returns to step SP61.

Therefore, the mask image processing division 73 repeats the processing loop of steps SP61–SP62 until the compression encoding of the first and second frame image data starts, in order to generate the mask image data D36 representing the moved position and the arbitrary shape of the extract image of each piece of the frame image data and accumulate it in the mask frame memory 90 while sequentially tracing the exact image by using the simple motion vectors D24 and D31 of the first and second macro-block data read from the simple motion vector buffer 75 for the frame image data of the second and successive frames.

When the compression encoding division 72 starts the compression encoding of the first and second frame image data which is the subject of encoding thereafter, the motion vector detection processing division 71 moves on step SP34 from step SP33 to sequentially perform the processing of steps SP34–SP35–SP36 as mentioned above as to FIG. 13(A) and FIG. 14(A), and moves on to step SP52.

In step SP52, the motion vector detection processing division 71 uses the motion vector detector 91 to sequentially reads the second frame image data which is the subject of encoding, on the second macro-block data D4 basis from the frame memory for inputting 32 and also read the first or second frame image data for reference D6, and further read the corresponding mask image data D36 from the mask frame memory 90 and thereby determine based on the read mask image data D36 whether each piece of the second macro-block data D4 is located outside or inside the edge 81A of the extract image in the arbitrary shape or overlapping the edge 81A, and then detect the motion vector D26, D37 of the original image level of each piece of the second macro-block data D4 based on the results of the determination in the first layer according to the hierarchical search motion vector detection method, and moves on to step SP38.

In step SP38, the motion vector detection processing division 71 uses the simple motion vector detector 74 to determine whether the simple motion vector D24, D31 of each piece of the first and second macro-block data D2 and D4 for all the first and second frame image data of the second and successive frames has been detected, and if the simple motion vector D24 and D31 of each piece of the first frame image data for all the first and second frame image data of the second and successive frames has not been detected, it returns to step SP51.

Thus, the motion vector detection processing division 71 repeats a processing loop of steps SP51–SP32–SP33–SP34–SP35–SP36–SP52–SP38 while the first and second frame image data for detecting the simple motion vectors D24 and D31 is captured in the frame memory for inputting 32, so as to sequentially detect the simple motion vectors D24 and D31 of the first and second macro-block data D2 and D4 for the first and second frame image data of the second and successive frames captured in the frame memory for inputting 32, and also to detect the motion vectors D26 and D37 of the second macro-block data D4 while sequentially calculating the inter-frame correlation values SH2.

On the other hand, when the compression encoding division 72 starts the compression encoding of the first and second frame image data which is the subject of encoding, the mask image processing division 73 moves from step SP62 to step SP63 to use the mask image encoder 94 to read the mask image data D36 from the mask frame memory 90 and compression-encode it, and then send the encoded data D40 thus obtained to the local decoder 95 and the buffer 96, and then moves on to step SP64.

In step SP64, the mask image processing division 73 uses the local decoder 95 to decode the encoded data D40, and accumulates the obtained mask image data D41 in the frame memory for reference 97, and then moves on to step SP65.

In step SP65, the mask image processing division 73 uses the mask image generator 77 to determine whether the mask image data D36 has been generated, while tracing the extract image from all the frame image data supplied from the outside, and if the mask image data D36 has not been generated while tracing the extract image from all the frame image data, it returns to step SP61.

Thus, the mask image processing division 73 repeats the processing loop of steps SP61–SP62–SP63–SP64–SP65 until the mask image data D36 representing the moved position and the arbitrary shape of the extract image is generated from all the frame image data, so as to sequentially compression-encode the accumulated mask image data D36 while generating the mask image data D36 based on the extract image which has been sequentially traced from the frame image data and accumulating it in the mask frame memory 90.

Figure 23:
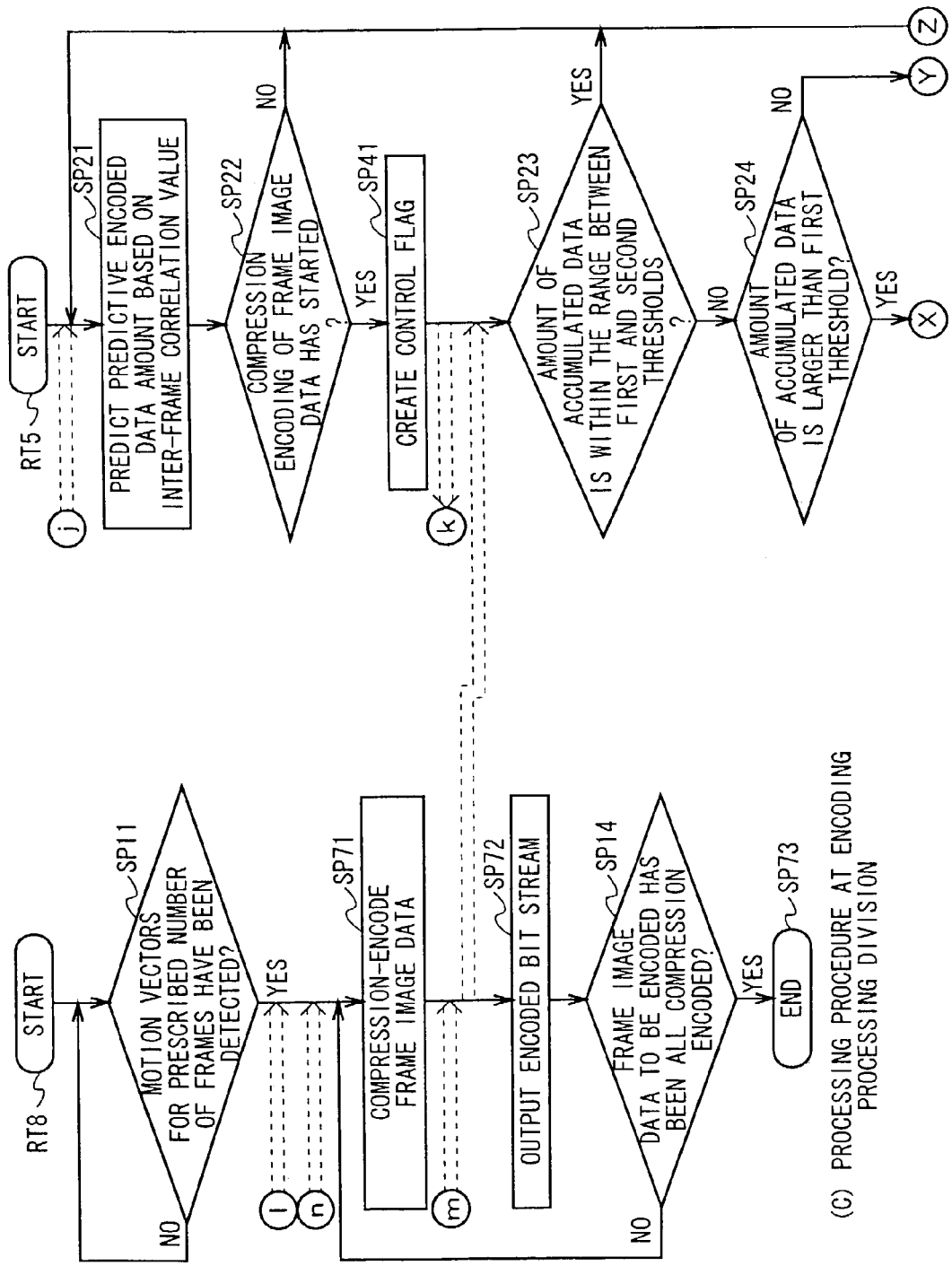
FIG. 23 is a flowchart showing the compression encoding procedure of the motion picture data.
Figure 24:
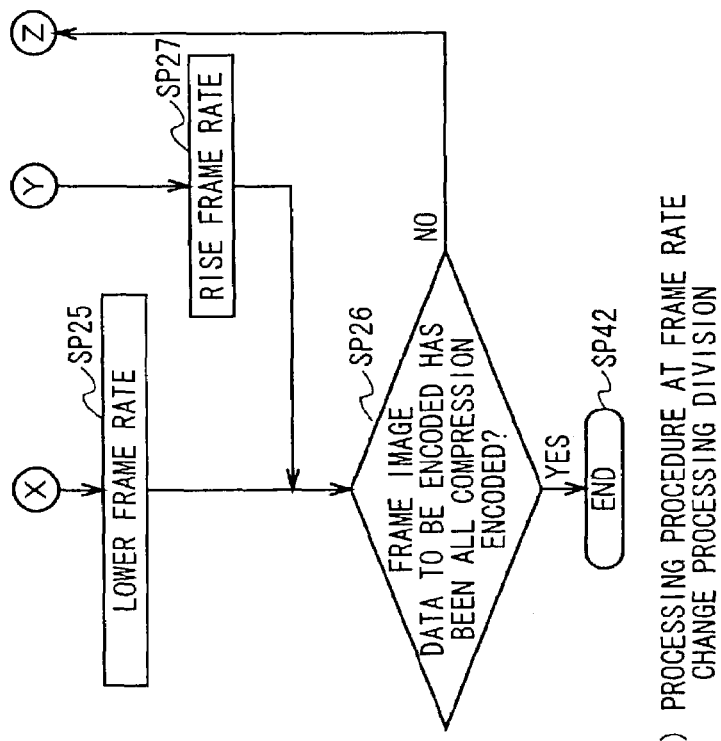
FIG. 24 is a flowchart showing the compression encoding procedure of the motion picture data.
Figure 26:
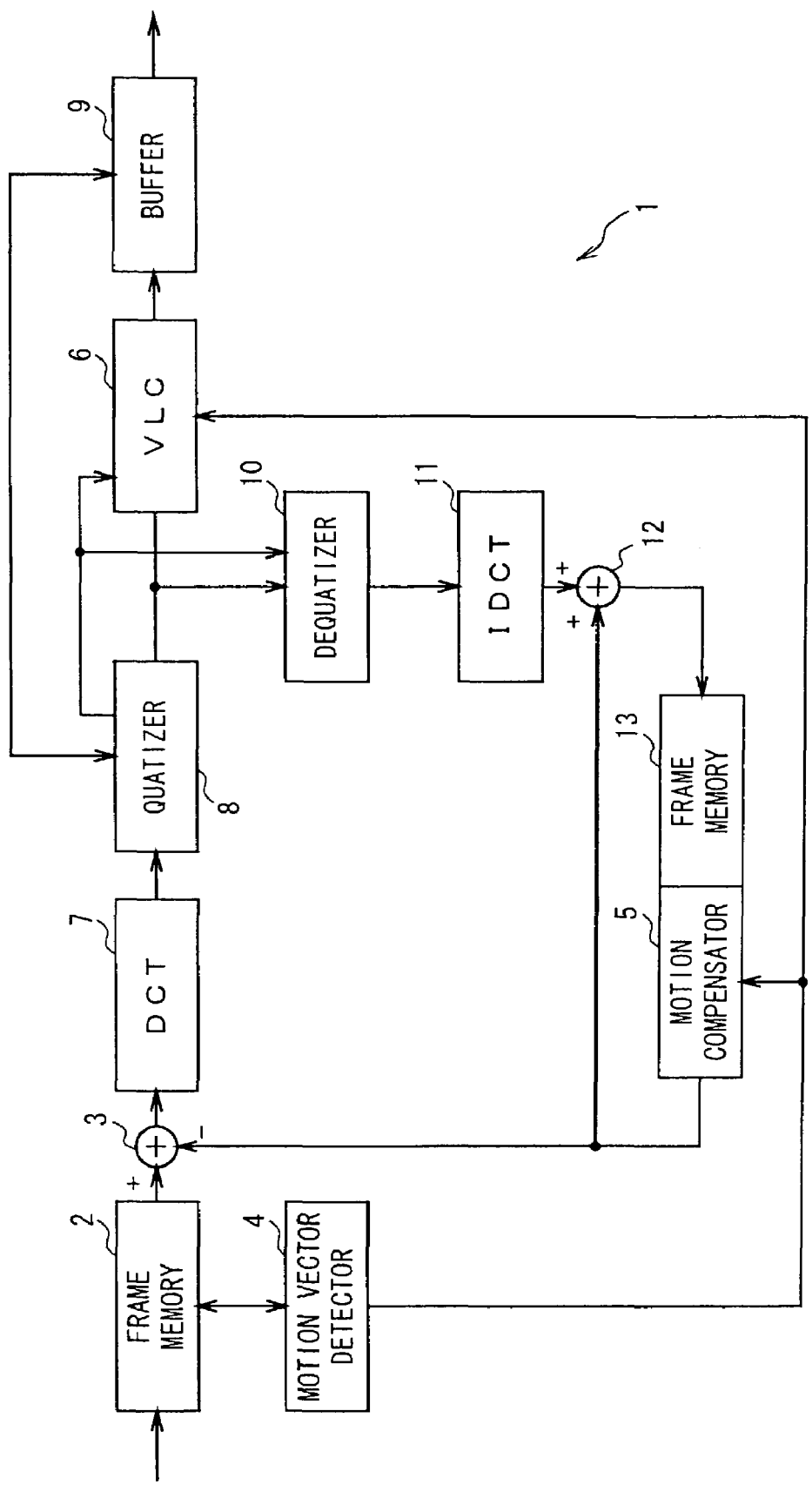
FIG. 26 is a block diagram showing the circuit construction of a conventional motion picture encoding apparatus.

In addition, as shown in FIG. 23(C) in which the same reference numerals are applied to parts corresponding to those of FIG. 13(B), the compression encoding division 72 enters the start step of a routine RT8 and then moves on to step SP11, and then moves on to step SP71 by starting the compression encoding of the first and second frame image data which is the subject of encoding.

In step SP71, the compression encoding division 72 sequentially reads the first and second frame image data from the frame memory for inputting 32 on the first and second macro-block data D2 and D4 basis with the operator 38, and changes the pixel values of the read first and second macro-block data D2 and D4 based on the mask image data D41 with the discrete cosine transformer 98 and thereby extracts the seeming extract image data, and then compression-encodes it by the in-frame encoding or the forward predictive encoding using the motion vectors D26 and D37, and accumulates the obtained encoded data D45 and D48 in the buffer 96, and then moves on to step SP72.

In step SP72, the compression encoding division 72 outputs from the buffer 96 to the outside as the encoded bit stream BS2 the encoded data D45 and D48 obtained by compression-encoding the first and second frame image data together with the encoded data D40 given from the mask image processing division 73 by compression-encoding the mask image data D36, and then moves on to step SP14.

In step SP14, the compression encoding division 72 determines whether all the first and second frame image data which is the subject of encoding has been compression-encoded, according to the readout state of the first and second frame image data from the frame memory for inputting 32 by the operator 38, and if all the first and second frame image data which is the subject of encoding has not been compression-encoded, it returns to step SP71.

Thus, the compression encoding division 72 repeats the processing loop of steps SP71–SP72–SP14 until all the first and second frame image data which is the subject of encoding has been compression-encoded, so as to extract the seeming extract image data of the first frame image data which is the subject of encoding and compression-encode it by the in-frame encoding, and also to extract the seeming extract image data of the second frame image data which is the subject of encoding and compression-encode it by the forward predictive encoding using the motion vectors D26 and D37, and then to output the obtained encoded data D45 and D48 together with the encoded data D40 of the mask image data D36 as the encoded bit stream BS2.

Then, in step SP38, when the motion vector detection processing division 71 uses the simple motion vector detector 74 to detect the simple motion vectors D24 and D31 of each piece of the first and second macro-block data D2 and D4 for all the first and second frame image data of the second and successive frames, it moves on to step SP8.

In step SP8, the motion vector detection processing division 71 determines with the motion vector detector 91 whether all the first and second frame image data which is the subject of encoding has been compression-encoded, by monitoring whether the operator 38 accesses the frame memory for inputting 32, and if all the first and second frame image data which is the subject of encoding has not been compression-encoded, it returns to step SP34.

Thus, the motion vector detection processing division 71 repeats the processing loop of steps SP34–SP35–SP36–SP52–SP38–SP8 until all the first and second frame image data which is the subject of encoding has been compression-encoded, so as to sequentially detect the motion vectors D26 and D37 of each piece of the second macro-block data D4 for the second frame image data which is the subject of encoding.

When the motion vector detection processing division 71 determines in step SP8 that all the first and second frame image data which is the subject of encoding has been compression-encoded as described above, it moves on to step SP53 to finish the procedure of the motion vector detection processing division 71.

In addition, in step SP65, the mask image processing division 73 uses the mask image generator 77 to generate the mask image data D36 while sequentially tracing the extract images from all the frame image data, and then moves on to step SP66.

In step SP66, the mask image processing division 73 determines whether all the mask image data D36 in the mask frame memory 90 has been compression-encoded by the mask image encoder 94, and if all the mask image data D36 has not been compression-encoded, it returns to step SP62.

Thus, the mask image processing division 73 repeats the processing loop of steps SP62–SP63–SP64–SP65–SP66 until all the mask image data D36 in the mask frame memory 90 is compression-encoded, so as to sequentially compression-encode the mask image data D36 in the mask frame memory 90, and then sends the obtained encoded data D40 to the local decoder 95 and the buffer 96.

And in step SP66, when the mask image processing division 73 determines that all the mask image data D36 in the mask frame memory 90 has been compression-encoded, it moves on to step SP67 and finishes the processing procedure of the mask image processing division 73.

Furthermore, when the compression encoding division 72 determines in step SP14 that all the first and second frame image data which is the subject of encoding has been compression-encoded, it moves on to step SP73 and finishes the processing procedure of the compression encoding division 72, and thus all the procedure for compression encoding the motion picture data D1 in the motion picture encoding apparatus 70 is finished.

In the above configuration, the motion picture encoding apparatus 70 sequentially captures the motion picture data D1 supplied from the outside, into the frame memory for inputting 32 on the frame image data basis, and uses the simple motion vector detector 74 to detect the simple motion vectors D24 and D31 of the first and second macro-block data D2 and D4 for the first and second frame image data in the second layer according to the hierarchical search motion vector detection method.

In addition, the motion picture encoding apparatus 70 also sequentially captures the motion picture data D1 supplied from the outside into the mask image generator 77 on the frame image data basis, and generates with the mask image generator 77 the mask image data D36 representing the moved position and the arbitrary shape of the extract image data for each piece of the frame image data while sequentially tracing the extract image data wherein the initial position and the arbitrary shape are specified for the leading frame image data, in the frame image data of the second and successive frames, by using the simple motion vectors D24 and D31 of the first and second macro-block data D2 and D4.

And in the motion picture encoding apparatus, 70, when the compression encoding division 72 compression-encodes the first and second frame image data which is the subject of encoding, the motion vector detector 91 detects the motion vectors D26 and D37 of the original image level only for the second macro-block data D4 inside the extract image and overlapping the edge 81A on the basis of the simple motion vector D24 and the mask image data D36 in the first layer according to the hierarchical search motion vector detection method.

Thus, in the motion picture encoding apparatus 70, the compression encoding division 72 compression-encodes the first frame image data by the in-frame encoding with extracting the seeming extract image data based on the mask image data D41 while the frame rate change processing division 61 changes the frame rate of the motion picture data D1 as appropriate, and also compression-encodes the second frame image data by the forward predictive encoding with extracting the seeming extract image data based on the motion vectors D26 and D37 of the original image level and the mask image data D41, and further the mask image encoder 94 sequentially compression-encodes the mask image data D36, once accumulates the obtained encoded data D45, D48 and D40 in the buffer 96 and then outputs them as the encoded bit stream BS2 to the outside.

Accordingly, in addition to changing the frame rate of the motion picture data D1, the motion picture encoding apparatus 70 compression-encodes the motion picture data D1 with sequentially extracting the extract image data from the frame image data, and so it can significantly reduce the amount of the data, which is the subject of encoding, to be compression-encoded per unit time, as compared with the motion picture encoding apparatuses 30 and 60 (FIGS. 2 and 10) according to the above-mentioned first and second embodiments, in addition to the effects obtained by the above-mentioned embodiments, and thus it is possible to significantly lower the compressibility for the extract image data and make the image quality of the extract image to be provided to users higher.

In addition to this, the motion picture encoding apparatus 70 hierarchically detects the motion vectors of the first and second macro-block data D2 and D4 with the simple motion vector detector 74 and the motion vector detector 91, and uses the simple motion vectors D24 and D31 detected in the second layer on the lower layer side, for both the tracing of the extract image data for the first and second frame image data and the detection of the motion vectors D26 and D37 of the second macro-block data D4 in the first layer on the higher layer side (original image level) which is used for the compression encoding of the extract image data, and so it is possible to significantly reduce the amount of operation for detecting the motion vector, as compared with the case where the motion vector is individually and directly detected in one layer for each of the tracing and compression encoding of the extract image data.

Incidentally, the motion picture encoding apparatus 70 uses the hierarchical search motion vector detection method to detect the motion vector, and so it is possible to significantly reduce the amount of operation for detecting the motion vector, as compared with the case where the motion vector is directly detected in one layer as is clear from the above-mentioned second embodiment.

In addition, in the motion picture encoding apparatus 70, the motion vector detector 91 detects the final motion vectors D26 and D37 of the original image level only for the second macro-block data D4 located on or inside the edge 81A of the extract image data, out of the second macro-block data D4 of the second frame image data, based on the mask image data D36, and so it is possible to further reduce the amount of operation for detecting the motion vector.

And as for the second macro-block data D4 overlapping the edge 81A of the extract image data the motion vector detector 91 of the motion picture encoding apparatus 70 detects the motion vector D37 by especially using only the pixels inside the edge 81A, and so it is possible to significantly improve the detection accuracy of the motion vector D37 which is used for the compression encoding of the extract image data.

Furthermore, while the motion picture encoding apparatus 70 uses the simple motion vectors D24 and D31 for the tracing of the extract image data for the first and second frame image data, it also uses the line matching method for doing the above, and so it is possible to improve the tracing accuracy of the traced image data.

According to the above configuration, the simple motion vector detector 74 detects the simple motion vectors D24 and D31 of the lower layer for the first and second macro-block data D2 and D4, and by sharing the detected simple motion vectors D24 and D31, the mask image generator 77 traces the extract image data for the first and second frame image data so as to generate the mask image data D36 and the motion vector detector 91 detects the motion vectors D26 and D37 of the higher layer of the second macro-block data D4 for the compression encoding of the extract image data, so that it is possible to significantly reduce the amount of operation for detecting the motion vector, and it is thus feasible to implement the motion picture encoding apparatus capable of speeding up the compression encoding process of the extract image data in the arbitrary shape.

Moreover, the above-mentioned third embodiment has described the case where, as mentioned above as to FIG. 15, the motion picture data D1 supplied from the outside is sequentially captured into the frame memory for inputting 32 on the frame image data basis, and the I-picture and the P-picture are sequentially assigned to the frame image data captured in the frame memory for inputting 32 in the predetermined order. The present invention, however, is not limited thereto and also the I-picture, the P-picture and the B-picture can be assigned to the frame image data captured into the frame memory for inputting 32 as mentioned above as to FIGS. 8(A) and (B) and FIGS. 9(A) to (C).

In addition, the above-mentioned third embodiment has described the case where, when the new first or second frame image data for reference D6 is assigned to the second frame image data which is the subject of encoding in conjunction with the change in the frame rate of the motion picture data D1, the motion vector detector 91 sequentially detects the simple motion vector D24 and the motion vectors D26 and D37 of the original image level of each piece of the macro-block data D4 in the first and second layers according to the hierarchical search motion vector detection method. The present invention, however, is not limited thereto and also when the new first or second frame image data for reference D6 is assigned to the second frame image data which is the subject of encoding in conjunction with the change in the frame rate of the motion picture data D1, the simple motion vector detector 74 can detect the simple motion vector D24 of each piece of the second macro-block data D4 by using the second frame image data which is the subject of encoding and the new first or second frame image data for reference D6 in the second layer according to the hierarchical search motion vector detection method and also the motion vector detector 91 can detect the motion vectors D26 and D37 of the original image level of the second macro-block data D4 in the first layer according to the hierarchical search motion vector detection method. This method can significantly reduce the processing load of the motion vector detector 91 on the redetection of the motion vector in conjunction with the change in the frame rate.

In addition to this, when the new first or second frame image data for reference D6 is assigned to the second frame image data which is the subject of encoding in conjunction with the change in the frame rate of the motion picture data D1, and if the second frame image data D6 (to be more specific, the second frame image data adjacent to the second frame image data which is the subject of encoding on the forward side) has been assigned for reference purposes to the second frame image data which is the subject of encoding at the time of detecting the simple motion vector D24, the motion vector detector 91 can synthesize the previously detected simple motion vector D24 of each piece of the second macro-block data D4 for the second frame image data which is the subject of encoding with the simple motion vector D24 of each piece of the second macro-block data D4 for the second frame image data D6 which was used for reference at the time of detecting the simple motion vector D24, and use the obtained synthesized simple motion vector in order to detect the motion vectors D26 and D37 of the original image level of each piece of the second macro-block data D4 for the second frame image data which is the subject of encoding by using the telescopic search method, for instance, in the first layer according to the hierarchical search motion vector detection method. This method also can significantly reduce the processing load of the motion vector detector 91 on the redetection of the motion vector in conjunction with the change in the frame rate.

Incidentally, it is also possible to reduce the processing load of the motion vector detector 91 by performing such synthesis of the simple motion vectors D24 with the simple motion vector detector 74.

Furthermore, the above-mentioned third embodiment has described the case where each piece of the second macro-block data D4 of the second frame image data is compression-encoded by the forward predictive encoding. This invention, however, is not limited to this and the data can be compression-encoded by one of the in-frame encoding and the forward predictive encoding by using the distribution value of each piece of the second macro-block data D4.

Furthermore, the above-mentioned third embodiment has described the case where the motion vector detector 91 detects the motion vectors D26 and D37 of each piece of the second macro-block data D4 by using the first and second frame image data for reference D6 read from the frame memory for inputting 32. The present invention, however, is not limited thereto and it is also possible to read the first and second frame image data for reference from the frame memory for reference 97 with the motion vector detector 91 so as to detect the motion vectors D26 and D37 of each piece of the second macro-block data D4. This method can use the first and second frame image data having block noises and so on generated by the compression encoding in the processing of the compression encoding, decoding and then reconstruction, in order to detect the motion vectors D26 and D37, which can improve the detection accuracy of the motion vectors D26 and D37.

Furthermore, the above-mentioned third embodiment has described the case where the hierarchical search motion vector detection method employing two layers, that is, the first and second layers is used to detect the motion vectors D26 and D37 of the second macro-block data D4. The present invention, however, is not limited thereto and it is also possible to use the hierarchical search motion vector detection method employing three or more layers which have frame images of resolutions different from each other, in order to detect the motion vectors of the second macro-block data D4.

Furthermore, the above-mentioned third embodiment has described the case where the simple motion vector detector 74 accumulates the simple motion vectors D24 and D31 and the predictive mode data D3, D20 and D30 in the simple motion vector buffer 75. The present invention, however, is not limited thereto and the simple motion vector detector 74 can also accumulate in the simple motion vector buffer 75 the predictive errors calculated on the detection of the simple motion vectors D24 and D31, in addition to the simple motion vectors D24 and D31 and the predictive mode data D3, D20 and D30. By this method, it is possible to adequately select the search range by using the predictive errors for redetecting the simple motion vectors D24 and D31 of the first and second macro-block data D2 and D4 with the simple motion vector detector 74, or to adequately select the search range for comparing the target areas 84A and 84B to each other between adjacent frame image data with the mask image generator 77 by the line matching method, and thus the accuracy of the redetection of the simple motion vectors D24 and D31 and of the tracing of the extract image can be improved.

Figure 25:
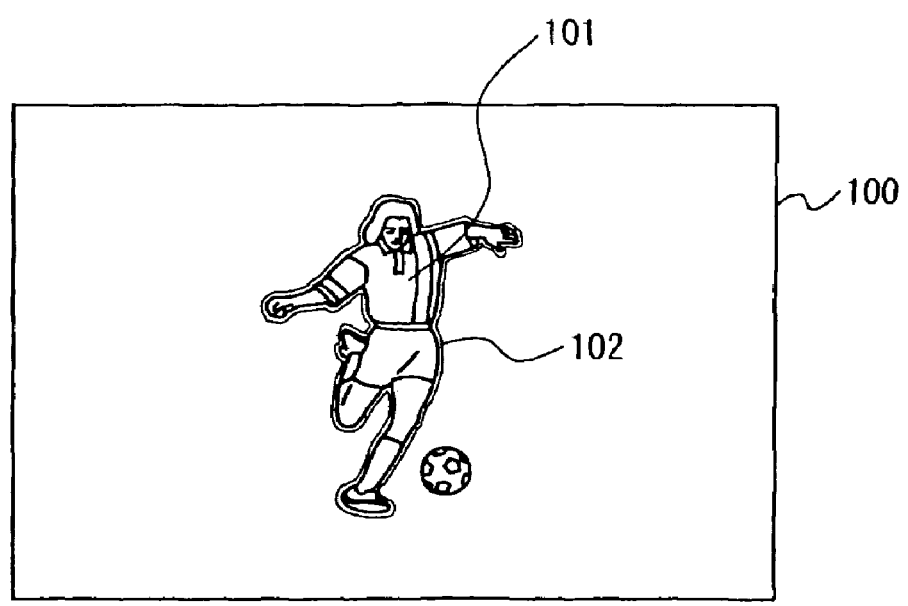
FIG. 25 is a schematic diagram explaining a method of specifying the arbitrary shape of the extract image for the frame image.

Furthermore, the above-mentioned third embodiment has described the case of specifying to the mask image generator 77 the initial position and the arbitrary shape of the extract image based on the shape specifying data D35. The present invention, however, is not limited thereto and it is also possible, as shown in FIG. 25, to specify to the mask image generator 77 an arbitrary point of an extract image 101 of a person or the like in a frame image 100 and thereby automatically detect an edge 102 of the extract image 101 so as to identify the arbitrary shape, or automatically detect various edges of a picture in the frame image with the mask image generator 77 so as to identify the extract image and its arbitrary shape.

Furthermore, the above-mentioned third embodiment has described the case where a crescent shape is specified as the arbitrary shape of the extract image as is apparent from the above-mentioned FIG. 16. The present invention, however, is not limited thereto and it is also possible to specify other various shapes as the arbitrary shape of the extract image, such as the arbitrary shape formed by the edge of a picture, an ellipse, a star shape and a round shape.

Furthermore, the above-mentioned third embodiment has described the case where the frame rate of the motion picture data D1 is changed according to the detected amount of accumulated data DR of the buffer 96 and the predictive encoded data amount. The present invention, however, is not limited thereto and it is also possible to change the frame rate of the motion picture data D1 according to the detected amount of accumulated data DR of the buffer 96. It is possible, even if the frame rate is thus changed, to adequately deal with the abrupt increase and decrease in the amount of accumulated data DR so as to stabilize the image quality of the motion picture.

(5) OTHER EMBODIMENTS

Note that, the above-mentioned first to third embodiments have described the case where the motion picture encoding apparatuses 30, 60 and 70 mentioned with reference to FIG. 2 to FIG. 25 are applied as a motion picture encoding apparatus of the present invention. The present invention is not limited thereto and it is also broadly applicable to other various motion picture encoding apparatuses, like electronic apparatuses such as personal computers, portable telephones, and PDAs (Personal Digital Assistance), as long as the apparatuses can simply compression-encode motion picture data or can extract extract image data from motion picture data and compression-encode it, like a motion picture encoding apparatus employing the compression encoding method such as the MPEG2 standard, a motion picture encoding apparatus which compression-encodes motion picture data previously stored therein or in the outside, instead of the motion picture data D1 supplied from the video camera, and a motion picture encoding apparatus which extracts extract image data from motion picture data supplied from a video camera or previously stored therein and compression-encodes it.

Incidentally, in the case of applying the motion picture encoding apparatus according to the present invention to an electronic apparatus such as personal computer, portable telephone or PDA, the circuit blocks mentioned above as to FIGS. 2 and 10 can be installed as hardware in the electronic apparatus, or a program to execute the compression encoding processing procedure of the motion picture data D1 described in FIGS. 6(A) to (C), FIGS. 7(A) and (C), FIGS.

13(A) to (C), FIGS. 14(A) and (C), FIGS. 21(A) and (B), FIGS. 22(A) and (B), FIGS. 23(C) and (D) and FIG. 24(D) is installed on the electronic apparatus instead of the hardware and the compression encoding processing procedure of the motion picture data D1 can be executed in accordance with the program as software processing, so as to realize the present invention.

And in order to install on the electronic apparatus the above-mentioned program for performing the procedure for compression encoding the motion picture data D1 described with reference to FIGS. 6(A) to (C), FIGS. 7(A) and (C), FIGS. 13(A) to (C), FIGS. 14(A) and (C), FIGS. 21(A) and (B), FIGS. 22(A) and (B), FIGS. 23(C) and (D) and FIG. 24(D), it is possible to use a program storage medium storing the program therein, and it is also possible to utilize wired and radio communication media such as a local area network, the Internet and digital satellite broadcasting, and it is further possible to install it via various communication interfaces such as a router and a modem.

Incidentally, as the program storage medium for installing the program on the electronic apparatus to render it executable, not only a package medium such as floppy disk, CD-ROM (Compact Disc-Read Only Memory) or DVD (Digital Versatile Disc) but also a semiconductor memory or a magnetic disk for temporarily or permanently storing a program can be used. In addition, as a means for storing the program in the program storage medium, it is possible to utilize the wired and radio communication media such as the local area network, the Internet and the digital satellite broadcasting, and it is also possible to store it via various communication interfaces such as the router and the modem.

Furthermore, the above-mentioned first to third embodiments have described the case where the compression encoding divisions 37 and 72 mentioned above as to FIGS. 2, 10 and 15 are applied as a compression encoding means for sequentially compression-encoding the motion picture data on frame image data basis so as to generate encoded data. The present invention, however, is not limited thereto and it is also possible to broadly apply other various compression encoding means capable of sequentially compression-encoding the motion picture data on the frame image data basis so as to generate encoded data.

Furthermore, the above-mentioned first to third embodiments have described the case where the frame structure converters 33 and 62 mentioned above as to FIGS. 2, 10 and 15 are applied as frame rate changing means for changing the frame rate of the motion picture data according to the amount of accumulated data of the buffer. The present invention is not limited thereto and it is also possible to broadly apply other various frame rate changing means capable of changing the frame rate of the motion picture data according to the amount of accumulated data of the buffer.

Furthermore, the above-mentioned first to third embodiments have described the case where the motion vector detector 35 for detecting the motion vector 24 by the block matching method mentioned above as to FIG. 2 is applied as a motion vector detection means for detecting the motion vector between the frame image data and calculating the correlation value between the above frame image data in conjunction with the detection of the motion vector. The present invention is not limited thereto and it is also possible to broadly apply other various motion vector detection means capable of detecting the motion vector between frame image data and calculating the correlation value between the above frame image data in conjunction with the detection of the motion vector, such as the motion vector detection means for detecting the motion vector by an optical flow.

Furthermore, the above-mentioned first to third embodiments have described the case where the simple motion vector detectors 64 and 74 for detecting the simple motion vector D24 and D31 in the second layer according to the hierarchical search motion vector detection method mentioned above as to FIGS. 10 and 15 are applied as a lower layer motion vector detection means for detecting the simple motion vector between the frame image data in one or plural layers lower than a predetermined layer. The present invention, however, is not limited thereto and it is also possible to broadly apply other various lower layer motion vector detection means capable of detecting the simple motion vector between the frame image data in one or plural layers lower than the predetermined layer, such as a lower layer motion vector detection means for sequentially detecting the low-resolution motion vectors stepwise in the plural layers lower than the predetermined layer to finally detect the simple motion vector.

Furthermore, the above-mentioned first to third embodiments have described the case where the motion vector detectors 66 and 91 for detecting the motion vectors D26 and D37 of the original image level in the first layer according to the above-mentioned hierarchical search motion vector detection method mentioned above as to FIGS. 10 and 15 are applied as a higher layer motion vector detection means for detecting the motion vector by using the simple motion vector in one or plural layers higher than the predetermined layer. The present invention, however, is not limited thereto and it is also possible to broadly apply other various higher layer motion vector detection means capable of detecting the motion vector by using the simple motion vector in one or plural layers higher than the predetermined layer, such as the higher layer motion vector detection means for sequentially detecting the low resolution motion vectors stepwise in plural layers by using the simple motion vector to finally detect the simple motion vector of the original image level.

Furthermore, the above-mentioned first to third embodiments have described the case where the mask image generator 77 for generating the mask image data D36 while tracing the extract image data for the first and second frame image data mentioned above as to FIG. 15 is applied as a mask image data generation means for generating the mask image data for sequentially extracting the extract image data in the arbitrary shape from each piece of the frame image data of the motion picture data. The present invention, however, is not limited thereto and it is also possible to broadly apply other various mask image data generation means capable of generating the mask image data for sequentially extracting the extract image data in the arbitrary shape from each piece of the frame image data of the motion picture data, such as the mask image data generation means for generating a mask image data, not tracing the extract image data, based on the results of tracing the extract image data in another circuit block or specification of the extract image data provided from the outside.

Furthermore, the above-mentioned first to third embodiments have described the case where the simple motion vector detector 74 for detecting the simple motion vectors D24 and D31 in the second layer according to the hierarchical search motion vector detection method mentioned with reference to FIG. 15 is applied as a lower layer motion vector detection method for detecting the simple motion vector between successive frame image data of the motion picture data in one or plural layers lower than a prescribed layer. The present invention, however, is not limited to this and it is also possible to widely apply other various lower layer motion vector detection means capable of detecting the simple motion vector between successive frame image data of the motion picture data in one or plural layers lower than the prescribed layer, such as a lower layer motion vector detection means for sequentially detecting the low resolution motion vectors stepwise in plural layers lower than the prescribed layer so as to finally detect the simple motion vector.

Furthermore, the above-mentioned first to third embodiment have described the case where the mask image generator 77 for generating the mask image data while tracing the extract image data mentioned with reference to FIG. 15 is applied as a tracing means for tracing the extract image data in an arbitrary shape in successive frame image data of the motion picture data by using the simple motion vector. The present invention, however, is not limited to this and it is also possible to widely apply other various tracing means capable of tracing the extract image data in an arbitrary shape in successive frame image data of the motion picture data by using the simple motion vector, such as a tracing means for executing only the tracing processing, separately from the generation processing of mask image data and a tracing means for outputting as a tracing result of the extract image data the results of identifying the tracing position of the extract image data and the first and second macro-block data overlapping the extract image data on a pixel basis.

Furthermore, the above-mentioned first to third embodiments have described the case where the motion vector detector 91 for detecting the motion vectors D26 and D37 of the original image level in the first layer according to the hierarchical search motion vector detection method mentioned with respect to FIG. 15 is applied as a higher layer motion vector detection means for detecting the motion vector of the original image level between successive frame image data of the motion picture data in one or plural layers higher than the prescribed layer by using the simple motion vector in common. The present invention, however, is not limited to this and it is also possible to widely apply other various higher layer motion vector detection means capable of detecting the motion vector of the original image level between successive frame image data of the motion picture data in one or plural layers higher than the prescribed layer by using the simple motion vector in common, such as the higher layer motion vector detection means for sequentially detecting the lower resolution motion vectors in plural layers stepwise by using the simple motion vector so as to finally detect the motion vector of the original image level.

Furthermore, the above-mentioned first to third embodiments have described the case where the compression encoding division 72 mentioned with respect to FIG. 15 is applied as a compression encoding method for sequentially extracting the extract image from successive frame image data of the motion picture data based on the tracing result of the extract image data and compression-encoding the extracted extract image data by the motion compensation predictive encoding using the motion vector. The present invention, however, is not limited to this and it is also possible to widely apply other various compression encoding means capable of sequentially extracting extract image data from successive frame image data of the motion picture data based on the tracing result of the extract image data and compression-encoding the extracted extract image data by the motion compensation predictive encoding using the motion vector.

INDUSTRIAL UTILIZATION

The present invention can be used in personal computers which distribute motion picture data via the Internet.

The invention claimed is:

1. A motion picture encoding apparatus comprising:
compression encoding means for sequentially compression-encoding motion picture data on a frame image data basis to generate encoded data;
a buffer which accumulates and then outputs said encoded data;
frame rate changing means for changing a frame rate of said motion picture data according to an amount of accumulated data of said buffer;
motion vector detection means for detecting a motion vector between frame image data of said motion picture data and calculating a correlation value between said frame image data in conjunction with detecting said motion vector;
said compression encoding means sequentially compression-encodes said motion picture data on said frame image data basis by motion compensation predictive encoding using said motion vector;
said frame rate changing means predicts an encoded data amount generating a predicted encoded data amount of said encoded data based on said correlation value between said frame image data, and changes said frame rate of said motion picture data according to said predicted encoded data amount and said amount of accumulated data; and
when said frame image data is excluded, forming excluded frame image data, from said motion picture data due to a change in said frame rate, said motion vector detection means assigns said frame image data which is new, for reference purposes to an other frame image data which was used to detect said motion vector with said excluded frame image data as a reference, so as to redetect said motion vector.

2. The motion picture encoding apparatus according to 1, wherein said motion vector detection means uses said motion vector of said excluded frame image data and said motion vector of said other frame image data using the excluded frame image data as said reference to redetect said motion vector between said other frame image data and said new frame image data for reference.

3. A motion picture encoding apparatus comprising:
compression encoding means for seciuentially compression-encoding motion picture data on a frame image data basis to generate encoded data;
a buffer which accumulates and then outputs said encoded data;
frame rate changing means for changing a frame rate of said motion picture data according to an amount of accumulated data of said buffer;
motion vector detection means for detecting a motion vector between frame image data of said motion picture data and calculating a correlation value between said frame image data in conjunction with detecting said motion vector;
said compression encoding means sequentially compression-encodes said motion picture data on said frame image data basis by motion compensation predictive encoding using said motion vector;
said frame rate changing means predicts an encoded data amount generating a predicted encoded data amount of said encoded data based on said correlation value between said frame image data, and changes said frame rate of said motion picture data according to said predicted encoded data amount and said amount of accumulated data;

said motion vector detection means including
- lower layer motion vector detection means for detecting a simple motion vector between said frame image data in one or plural layers lower than a predetermined layer; and
- higher layer motion vector detection means for detecting said motion vector by using said simple motion vector in one or plural layers higher than said predetermined layer;
- wherein for said motion picture data before a change in said frame rate, said lower layer motion vector detection means detects said simple motion vector between all said frame image data which are subjects of detection of said motion vector; and
- said higher layer motion vector detection means detects said motion vector by using said simple motion vector between said frame image data left as subjects of encoding in conjunction with the change in said frame rate.

4. The motion picture encoding apparatus according to claim 3, wherein said lower layer motion vector detection means calculates said correlation value in conjunction with the detection of said simple motion vector.

5. The motion picture encoding apparatus according to claim 4, comprising
- mask image data generation means for generating mask image data for sequentially extracting extract image data in an arbitrary shape from each piece of said frame image data of said motion picture data, wherein
- said compression encoding means extracts said extract image data from said frame image data based on said mask image data, and compression-encodes said extract image data extracted, by motion compensation predictive encoding using said motion vector in order to generate said encoded data.

6. A motion picture encoding method comprising:
- sequentially compression-encoding motion picture data on a frame image data basis to generate encoded data;
- accumulating said encoded data in a buffer generating an amount of accumulated data;
- outputting said encoded data from said buffer;
- changing the frame rate of said motion picture data according to said amount of accumulated data of said buffer;
- detecting a motion vector between frame image data of said motion picture data;
- calculating a correlation value between said frame image data in conjunction with detecting said motion vector;
- said sequentially compression-encoding said motion picture data on said frame image basis by motion compensation predictive encoding using said motion vector;
- predicting an encoded data amount of said encoded data based on said correlation value between said frame image data of said motion picture data according to a predicted encoded data amount and said amount of accumulated data;
- changing said frame rate of said motion picture data according to said predicted encoded data amount and said amount of accumulated data; and
- assigning said frame image data, which is new, for reference purpose to an other frame image data which was used in detecting said motion vector with excluded frame image data, formed by said frame image data being excluded from motion picture data due to a change in said frame rate, as a reference, redetecting said motion vector.

7. A motion picture encoding method comprising:
- sequentially compression-encoding motion picture data on a frame image data basis to generate encoded data;
- accumulating said encoded data in a buffer generating an amount of accumulated data;
- outputting said encoded data from said buffer;
- changing the frame rate of said motion picture data according to said amount of accumulated data of said buffer;
- detecting a motion vector between frame image data of said motion picture data;
- calculating a correlation value between said frame image data in conjunction with detecting said motion vector;
- said sequentially compression-encoding said motion picture data on said frame image basis by motion compensation predictive encoding using said motion vector;
- predicting an encoded data amount of said encoded data based on said correlation value between said frame image data of said motion picture data according to a predicted encoded data amount and said amount of accumulated data;
- changing said frame rate of said motion picture data according to said predicted encoded data amount and said amount of accumulated data;
- wherein said detecting said motion vector includes lower layer motion vector detecting including detecting a simple motion vector between said frame image data in one or plural layers lower than a predetermined layer and higher layer motion vector detecting including detecting said motion vector by using said simple motion vector in one or plural layers higher than said predetermined layer;
- wherein, for said motion picture data before a change in said frame rate, said lower layer motion vector detecting includes detecting said simple motion vector between all said frame image data which are subjects detected by said motion vector; and
- said higher layer motion vector detecting includes detecting said motion vector between said frame image data left as subjects of encoding in conjunction with the change in said frame rate.

8. A computer storage medium, having instructions that when executed by a processor performs steps comprising:
- sequentially compression-encoding motion picture data on a frame image data basis to generate encoded data;
- accumulating said encoded data in a buffer generating an amount of accumulated data;
- outputting said encoded data from said buffer;
- changing the frame rate of said motion picture data according to said amount of accumulated data of said buffer;
- detecting a motion vector between frame image data of said motion picture data;
- calculating a correlation value between said frame image data in conjunction with detecting said motion vector;
- said sequentially compression-encoding said motion picture data on said frame image basis by motion compensation predictive encoding using said motion vector;
- predicting an encoded data amount of said encoded data based on said correlation value between said frame image data of said motion picture data according to a predicted encoded data amount and said amount of accumulated data;

changing said frame rate of said motion picture data according to said predicted encoded data amount and said amount of accumulated data; and assigning said frame image data, which is new, for reference purpose to an other frame image data which was used in detecting said motion vector with excluded frame image data, formed by said frame image data being excluded from motion picture data due to a change in said frame rate, as a reference, redetecting said motion vector.

9. A computer storage medium, having instructions that when executed by a processor performs the steps comprising:

sequentially compression-encoding motion picture data on a frame image data basis to generate encoded data;

accumulating said encoded data in a buffer generating an amount of accumulated data;

outputting said encoded data from said buffer;

changing the frame rate of said motion picture data according to said amount of accumulated data of said buffer;

detecting a motion vector between frame image data of said motion picture data;

calculating a correlation value between said frame image data in conjunction with detecting said motion vector;

said sequentially compression-encoding said motion picture data on said frame image basis by motion compensation predictive encoding using said motion vector;

predicting an encoded data amount of said encoded data based on said correlation value between said frame image data of said motion picture data according to a predicted encoded data amount and said amount of accumulated data;

changing said frame rate of said motion picture data according to said predicted encoded data amount and said amount of accumulated data;

wherein said detecting said motion vector includes lower layer motion vector detecting including detecting a simple motion vector between said frame image data in one or plural layers lower than a predetermined layer and higher layer motion vector detecting including detecting said motion vector by using said simple motion vector in one or plural layers higher than said predetermined layer;

wherein, for said motion picture data before a change in said frame rate, said lower layer motion vector detecting includes detecting said simple motion vector between all said frame image data which are subjects detected by said motion vector; and said higher layer motion vector detecting includes detecting said motion vector between said frame image data left as subjects of encoding in conjunction with the change in said frame rate.

* * * * *

UNITED STATES PATENT AND TRADEMARK OFFICE
CERTIFICATE OF CORRECTION

PATENT NO. : 7,158,570 B2
APPLICATION NO. : 10/312555
DATED : January 2, 2007
INVENTOR(S) : Takefumi Nagumo et al.

It is certified that error appears in the above-identified patent and that said Letters Patent is hereby corrected as shown below:

Column 11, line 10, change "or" to --of--.
Column 17, line 29, change "being-compression" to --being compression--.
Column 19, line 36, change "as-shown" to --as shown--.
Column 21, line 42, change "S12" to --SP12--.
Column 22, line 61, change "of of steps" to --of steps--.
Column 24, line 41, change "redtector" to --redetector--;
　　　　　　line 56, change "fist" to --first--.
Column 25, line 10, change "14" to --34--.
Column 27, line 55, change "butter" to --buffer--.
Column 35, line 48, change "SP14" to --SP34--.
Column 38, line 55, change "is-the" to --is the--.
Column 41, line 4, change "data-which" to --data which--.
Column 49, line 42, change "on step" to --on to step--.
Column 50, line 19, change "of-the" to --of the --.
Column 53, line 47, change "data the" to --data, the--.
Column 56, line 47, change "Assistance" to --Assistants--.
Column 60, line 47, change "seciuentially" to --sequentially--.

Signed and Sealed this

Tenth Day of July, 2007

JON W. DUDAS
*Director of the United States Patent and Trademark Office*